US011708997B2

(12) United States Patent
Jang et al.

(10) Patent No.: US 11,708,997 B2
(45) Date of Patent: Jul. 25, 2023

(54) AIR CONDITIONER

(71) Applicant: LG ELECTRONICS INC., Seoul (KR)

(72) Inventors: Hosik Jang, Seoul (KR); Seungho Baek, Seoul (KR); Haein Jung, Seoul (KR); Kibbum Park, Seoul (KR); Seokho Choi, Seoul (KR); Hyungho Park, Seoul (KR); Hoojin Kim, Seoul (KR); Inbeom Cheon, Seoul (KR); Jaehyuk Jung, Seoul (KR); Juhyun Kim, Seoul (KR); Yongmin Kim, Seoul (KR); Chiyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 178 days.

(21) Appl. No.: 17/335,856

(22) Filed: Jun. 1, 2021

(65) Prior Publication Data
US 2021/0372658 A1    Dec. 2, 2021

(30) Foreign Application Priority Data

Jun. 2, 2020    (KR) .................. 10-2020-0066278
Jun. 2, 2020    (KR) .................. 10-2020-0066279
(Continued)

(51) Int. Cl.
*F24F 13/20*    (2006.01)
*F24F 13/28*    (2006.01)

(52) U.S. Cl.
CPC .............. *F24F 13/20* (2013.01); *F24F 13/28* (2013.01); *F24F 2013/205* (2013.01)

(58) Field of Classification Search
CPC .. F24F 13/20; F24F 13/28; F24F 13/24; F24F 2013/205; F24F 2013/247; F24F 2221/28;
(Continued)

(56) References Cited

U.S. PATENT DOCUMENTS

2015/0273381 A1    10/2015    Stoner, Jr. et al.
2016/0238025 A1*    8/2016    Stewart ..................... F04F 5/16
2019/0168151 A1*    6/2019    Biltcliffe .................. F04F 5/16

FOREIGN PATENT DOCUMENTS

CN    206877265    1/2018
JP    2000-257904    9/2000
(Continued)

OTHER PUBLICATIONS

European Search Report issued in Application No. 21177210.8 dated Nov. 4, 2021.
(Continued)

*Primary Examiner* — Emmanuel E Duke
(74) *Attorney, Agent, or Firm* — Ked & Associates, LLP

(57) ABSTRACT

Embodiments disclosed herein may provide an air conditioner having a case and a cover coupled to the case. A cover separation unit may separate the cover from the case at upper and lower sides. The cover separation unit may include a lever that slides along an outer surface of the case and a
(Continued)

pusher rotatably coupled to the lever to rotate to push the cover. A guide may guide the pusher to rotate as the pusher is moved along an outer surface of the case.

20 Claims, 49 Drawing Sheets

(30) Foreign Application Priority Data

Jun. 2, 2020 (KR) .................. 10-2020-0066280
Jun. 15, 2020 (KR) .................. 10-2020-0072338
Sep. 23, 2020 (KR) .................. 10-2020-0123154

(58) Field of Classification Search
CPC ...... F24F 1/01; F24F 1/0022; B01D 2279/50; B01D 46/0005; B01D 46/24; F04D 29/403; F04D 29/524; F04D 29/626; F04D 29/703; F04D 29/281; F04D 29/30; F04D 29/4226; F04D 29/663; F04D 29/666; F04D 29/667; F04D 29/681; F04D 25/08; F04F 5/16; F04F 5/44; F04F 5/46; F04F 5/461; F04F 5/466
See application file for complete search history.

(56) References Cited

FOREIGN PATENT DOCUMENTS

| JP | 2019-107643 | | 7/2019 | |
|---|---|---|---|---|
| JP | 2019107643 A | * | 7/2019 | ......... B01D 46/0005 |
| KR | 10-2011-0099318 | | 9/2011 | |
| KR | 10-2013-0033435 | | 4/2013 | |
| KR | 10-2017-0141583 | | 12/2017 | |
| KR | 10-2018-0125425 | | 11/2018 | |
| KR | 10-2132397 | | 7/2020 | |

OTHER PUBLICATIONS

Korean Notice of Allowance dated Apr. 6, 2023 issued in Application No. 10-2020-0123154.
Korean Office Action dated Apr. 6, 2023 issued in Application No. 10-2020-0066278.
Korean Office Action dated Apr. 6, 2023 issued in Application No. 10-2020-0066279.
Korean Office Action dated Apr. 6, 2023 issued in Application No. 10-2020-0066280.
Korean Office Action dated Apr. 6, 2023 issued in Application No. 10-2020-0072338.

* cited by examiner

FIG. 49
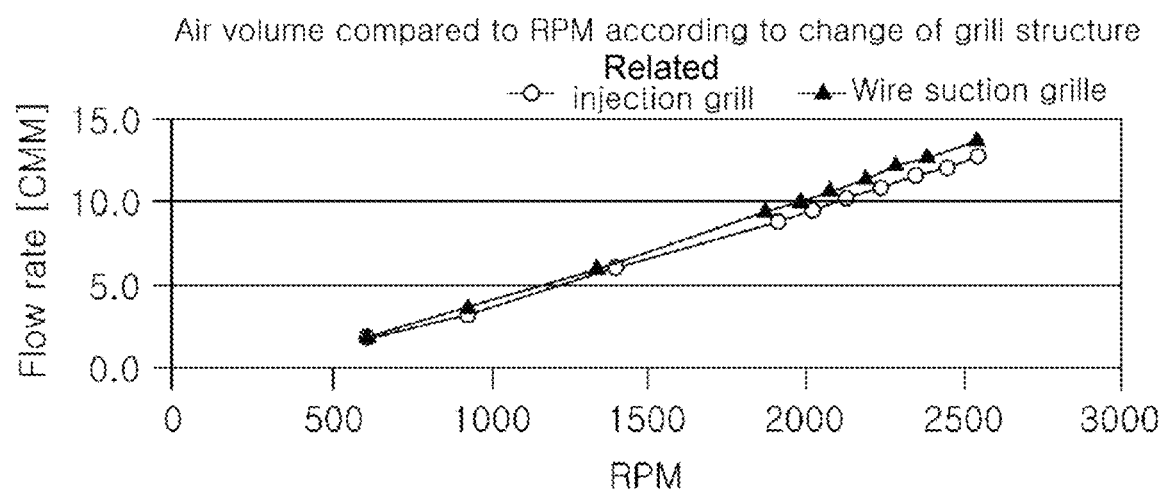
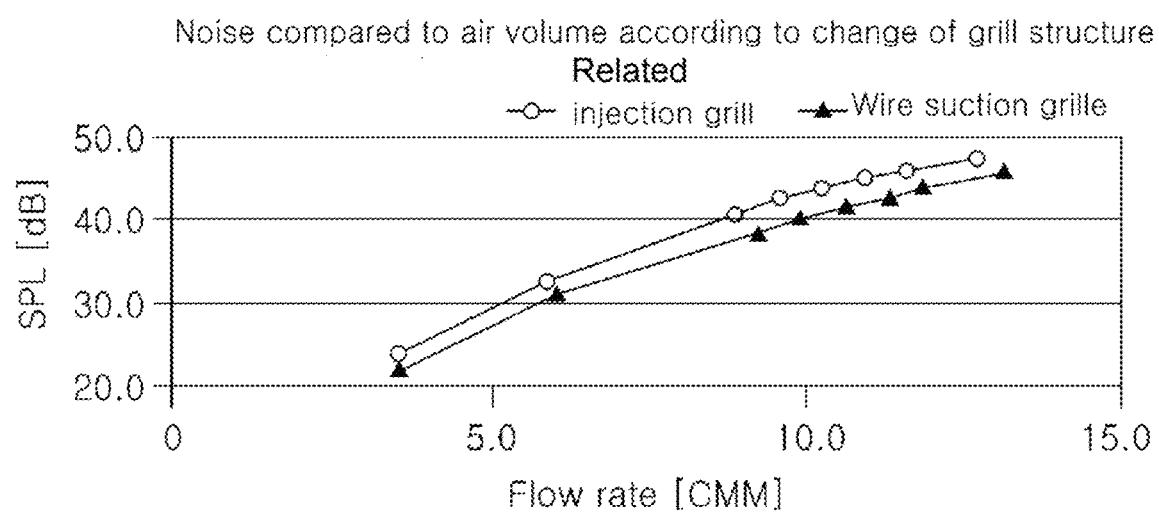

AIR CONDITIONER

CROSS-REFERENCE TO RELATED APPLICATIONS

This application claims priority under 35 U.S.C. § 119 to Korean Application Nos. 10-2020-0066278 filed on Jun. 2, 2020, 10-2020-0066279 filed on Jun. 2, 2020, 10-2020-0066280 filed on Jun. 2, 2020, 10-2020-0072338 filed on Jun. 15, 2020, and 10-2020-0123154 filed on Sep. 23, 2020, whose entire disclosures are hereby incorporated by reference.

BACKGROUND

1. Field

The present disclosure relates to an air conditioner.

2. Background

A blower is a mechanical device which drives a fan to cause a flow of air. The fan may rotate about a rotation axis, and a motor may rotate the fan to generate wind or air flow. An axial fan may have an advantage in providing wind in a wide range or region, but the axial fan may not be able to provide an intense or concentrated air flow in a narrow region.

Japanese Publication Patent No. 2019-107643 discloses a fan which provides air flow to a user using the Coanda effect. In addition, a fan may be configured to cause a predetermined air flow path of a certain size or less between the fan and an air discharge port, with a certain distance or more between the fan and the air discharge port. There is a problem in that an air flow path may not have an enough space to, for example, receive a heater to heat air.

In addition, when a cover is formed to cover a filter insertion port for insertion of a filter into a main body, to easily separate the cover and the main body, a gap between the cover and the main body may be increased. A space for a user's hand to enter is formed in the cover or main body, but the space may not aesthetically pleasing. In addition, since such a space may provide resistance to the air flowing into the filter, an overall efficiency may be lowered. When the cover and the main body are coupled with magnetic force or a hook without a gap to enhance aestheticism, there is a problem in that there may not be a space for user's hand, making it very difficult to separate the cover from the main body when there is no separate handle.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 49 is a view illustrating a graph for explaining a difference in effect between a suction grill according to the present disclosure and a related art.

DETAILED DESCRIPTION

Figure 1:
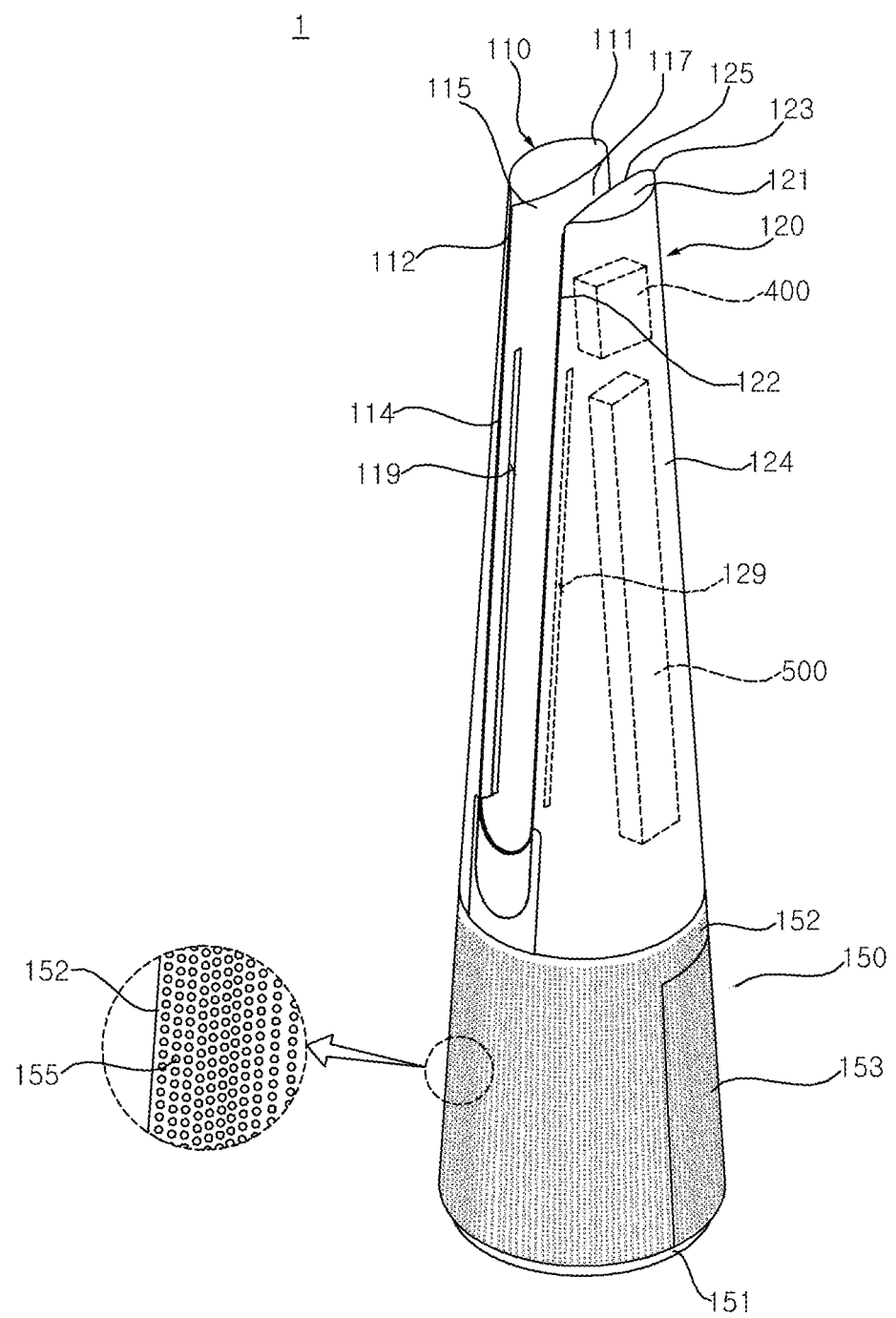
FIG. 1 is a perspective view of an air conditioner according to an embodiment.

Referring to FIGS. 1 to 4, an air conditioner or blower 1 according to an embodiment may include a case 100 providing an outer shape. The air conditioner 1 may alternatively be referred to as an air purifier. The case 100 may include a base or lower case 150 in which a filter 200 may be located or installed, and a tower or upper case 140 configured to discharge air through the Coanda effect. The base case 150 and tower case 140 may alternatively be referred to as first and second cases. The tower case 140 may include a first tower or extension 110 and a second tower or extension 120 which are divided and provided to appear similar to two columns. For convenience of description, the first tower 110 may be provided on a left side, and the second tower 120 may be provided on a right side. The first and second towers 110 and 120 may alternatively be referred to as left and right towers.

In this specification, an up-down or vertical direction may be defined as a direction parallel to a direction of a rotation axis of a fan 320. An upper direction refers to a direction from the base case 150 to the tower case 140. A lower direction refers to a direction in from the tower case 140 to the base case 150. The first and second towers 110 and 120 may be spaced apart from each other in a horizontal or left-right direction, while a direction substantially perpendicular to the left-right direction may be considered a horizontal or front-rear direction.

The first tower 110 and the second tower 120 may be spaced apart from each other in the left-right direction, and a blowing space 105 may be formed between the first tower 110 and the second tower 120 to extend in a front-rear direction. Front, rear and upper sides of the blowing space 105 may be open, and a left-right length of the blowing space 105 may be the same or similar at upper and lower ends of the blowing space 105. The tower case 140 as a whole, which includes the first tower 110, the second tower 120, and the blowing space 105, may be formed in a truncated cone shape.

Air may be discharged into the blowing space 105 through discharge ports 117 and 127 provided in the first tower 110 and the second tower 120, respectively. The discharge ports 117 and 127 may include a first discharge port 117 formed in the first tower 110 and a second discharge port 127 formed in the second tower 120.

The first discharge port 117 and the second discharge port 127 may extend along a height direction (which may be substantially similar to the vertical direction) of the first and second towers 110 and 120. A direction intersecting the blowing space 105 may be defined as an air discharge direction. The air discharge direction may be substantially similar to the front-rear direction in certain circumstances and/or a vertical direction in other circumstances.

For example, the air discharge direction intersecting the blowing space 105 may include a first air discharging direction S1 provided in a horizontal, front-rear direction and a second air discharging direction S2 provided in the vertical direction. Air flowing in the first air discharge direction S1 may be referred to as a horizontal airflow, and air flowing in the second air discharge direction S2 is referred to as an ascending airflow.

It should be understood that the horizontal airflow does not mean that the air flows only in the horizontal direction, but that a flow rate of air flowing in the horizontal direction is larger. Likewise, it should be understood that the ascending airflow does not mean that the air flows only upward or vertically, but that a flow rate of air flowing upward or vertically is larger.

As previously explained, an upper end gap or distance of the blowing space 105 (i.e., a distance between inner upper ends of the first and second towers 110 and 120) and a lower end gap or distance of the blowing space 105 (i.e., a distance between inner lower ends of the first and second towers 110 and 120) may be equal. Alternatively, the upper end gap of the blowing space 105 may be formed narrower or wider than the lower end gap thereof.

By forming a right-left width of the blowing space 105 to be constant, a flow of air flowing in front of the blowing space 105 may be more uniform. When the right-left width is not constant such that the upper end gap of the blowing space 105 is not the same as the lower end gap of the blowing space 105, a flow velocity of the wider portion of the blowing space 105 may be relatively lower than an air flow velocity of the narrower portion, and a deviation of air flow velocities may occur in the vertical direction. With such deviation, a distance that a concentrated air flow reaches before becoming negligeable may vary.

After the air discharged from the first discharge port 117 and the second discharge port 127 are joined with each other in the blowing space 105, the joined air may flow toward a user. Discharged air of the first discharge port 117 and discharge air of the second discharge port 127 may not individually flow as separate streams to the user, but the discharged air of the first discharge port 117 and the discharged air of the second discharge port 127 may be joined in the blowing space 105 and provided as a combined stream to the user.

The blowing space 105 may be used as a space where discharged air is joined and mixed. Ambient air behind the blowing space 105 may also flow into the blowing space 105 to mix with the air discharged to the blowing space 105.

Since the discharged air of the first discharge port 117 and the discharged air of the second discharge port 127 are joined, a straightness and/or concentration of the discharged air may be improved. By joining the air discharged from the first discharge port 117 and the second discharge port 127 in the blowing space, ambient air around the first tower 110 and second tower 120 may also be indirectly induced to flow in the air discharge direction.

The first air discharge direction S1 may be formed from the rear to the front (i.e., forward), and the second air discharge direction S2 may be formed from a lower side to an upper side (i.e., upward). An upper end 111 of the first tower 110 and an upper end 121 of the second tower 120 may be spaced apart from each other in the left-right direction to allow air to flow in the second air discharge direction S2. The air discharged in the second air discharge direction S2 may not be blocked or interfered with by the tower case 140, as an upper side of the blowing space 105 may be opened.

A front end 112 of the first tower 110 and a front end 122 of the second tower 120 may be spaced apart from each other in a left-right direction, and a rear end 113 of the first tower 110 and a rear end 123 of the second tower 120 may also be spaced apart from each other in a left-right direction. Such a configuration may allow airflow in the first air discharge direction S1. Positions of the first and second towers 110 and 120 may not interfere with or prevent airflow in the first air discharge direction S1. However, an airflow converter or guide later may selective block at least a portion of a front of the blowing space 105 to encourage air to flow in the second air flow direction S2.

In each of the first tower 110 and the second tower 120, a surface facing the blowing space 105 may be referred to as an inner surface, and a surface not facing the blowing space 105 may be referred to as an outer surface. A first outer wall 114 of the first tower 110 and a second outer wall 124 of the second tower 120 may face opposite directions, and a first inner wall 115 of the first tower 110 and a second inner wall 125 of the second tower 120 may face each other.

The first outer wall 114 may be formed on an outer side of the first inner wall 115. The first outer wall 114 and the first inner wall 115 may form a space (an inner space of the first tower 110) through which air flows. The second outer wall 124 may be formed on an outer side of the second inner wall 125. The first outer wall 124 and the first inner wall 125 form a space (an inner space of the second tower 120) through which air flows.

The first tower 110 and the second tower 120 may be formed in a streamlined shape with respect to the flow direction of air. Each of the first inner wall 115 and the first outer wall 114 may be formed in a streamlined shape in the front-rear direction, and each of the second inner wall 125 and the second outer wall 124 may be formed in a streamlined shape in the front-rear direction. A streamlined shape may mean a shape configured to reduce drag or air resistance, similar to an airplane wing.

The first discharge port 117 may be formed in the first inner wall 115, and the second discharge port 127 may be formed in the second inner wall 125. A central or short distance between the first inner wall 115 and the second inner wall 125 may be referred to as an initial distance B0. The initial distance B0 may be a shortest distance between the first and second inner walls 115 and 125 and may be provided at or around center portions. The discharge ports 117 and 127 may be located at a rear side of positions that define the initial distance B0.

A first or front distance between the front end 112 of the first tower 110 and the front end 122 of the second tower 120 may be referred to as a first separation distance B1. A second or rear distance between the rear end 113 of the first tower 110 and the rear end 123 of the second tower 120 may be referred to as a second separation distance B2.

The first and second separation distances B1 and B2 may be equal. Alternatively, the first and second separation distances B1 and B2 may not be equal such as one of the first and second separation distances B2 and B2 is longer than the other. The first and second separation distances B1 and B2 may be longer than the initial distance B0.

The first discharge port 117 and the second discharge port 127 may be positioned such that a distance between the first and second discharge ports 117 and 127, which face each other, is greater than the initial distance B0 but less than the second separation distance B2. The first and second discharge ports 117 and 127 may be positioned between centers of the first and second inner walls 115 and 125 and the rear ends 113 and 123 of the first and second towers 110 and 120.

As an example, the first discharge port 117 and the second discharge port 127 may be provided closer to the rear ends 113 and 123, respectively, than centers of the first and second inner walls 115 and 125. When the discharge ports 117 and 127 are provided closer to the rear ends 113 and 123, airflow may be easier controlled through the Coanda effect described later.

The inner wall 115 of the first tower 110 and the inner wall 125 of the second tower 120 may be configured to directly provide or induce a Coanda effect. The outer wall 114 of the first tower 110 and the outer wall 124 of the second tower 120 may be configured to indirectly provide or induce a Coanda effect.

The inner walls 115 and 125 may be configured to directly guide the air discharged from the discharge ports 117 and 127 toward the front ends 112 and 122 in the first discharge direction S1. Due to an air flow in the blowing space 105, an indirect air flow may occur at or around the outer walls 114 and 124 as well. The outer walls 114 and 124 may be configured to induce a Coanda effect with respect to an indirect air flow and guide the indirect air flow toward the front ends 112 and 122.

A left side of the blowing space may be blocked by the first inner wall 115, and a right side of the blowing space may be blocked by the second inner wall 125. An upper side of the blowing space 105 may be opened, along with front and rear sides.

An airflow converter or guide to be described later may convert a horizontal airflow in the first discharge direction S1 passing through the blowing space 105 into an ascending airflow in the second discharge direction S2, and the ascending airflow may flow to an open upper side of the blowing space 105. The ascending airflow may suppress a direct flow of discharged air to the user and may actively convect indoor air.

A width of a discharged air stream may be adjusted through a flow rate of air joined in the blowing space 105. By setting or prescribing a vertical length of the first discharge port 117 and the second discharge port 127 to be longer than the right-left length of the blowing space 105, the discharged air of the first discharge port 117 and the discharge air of the second discharge port 127 may be induced to be joined to each other in the blowing space 105.

Figure 2:
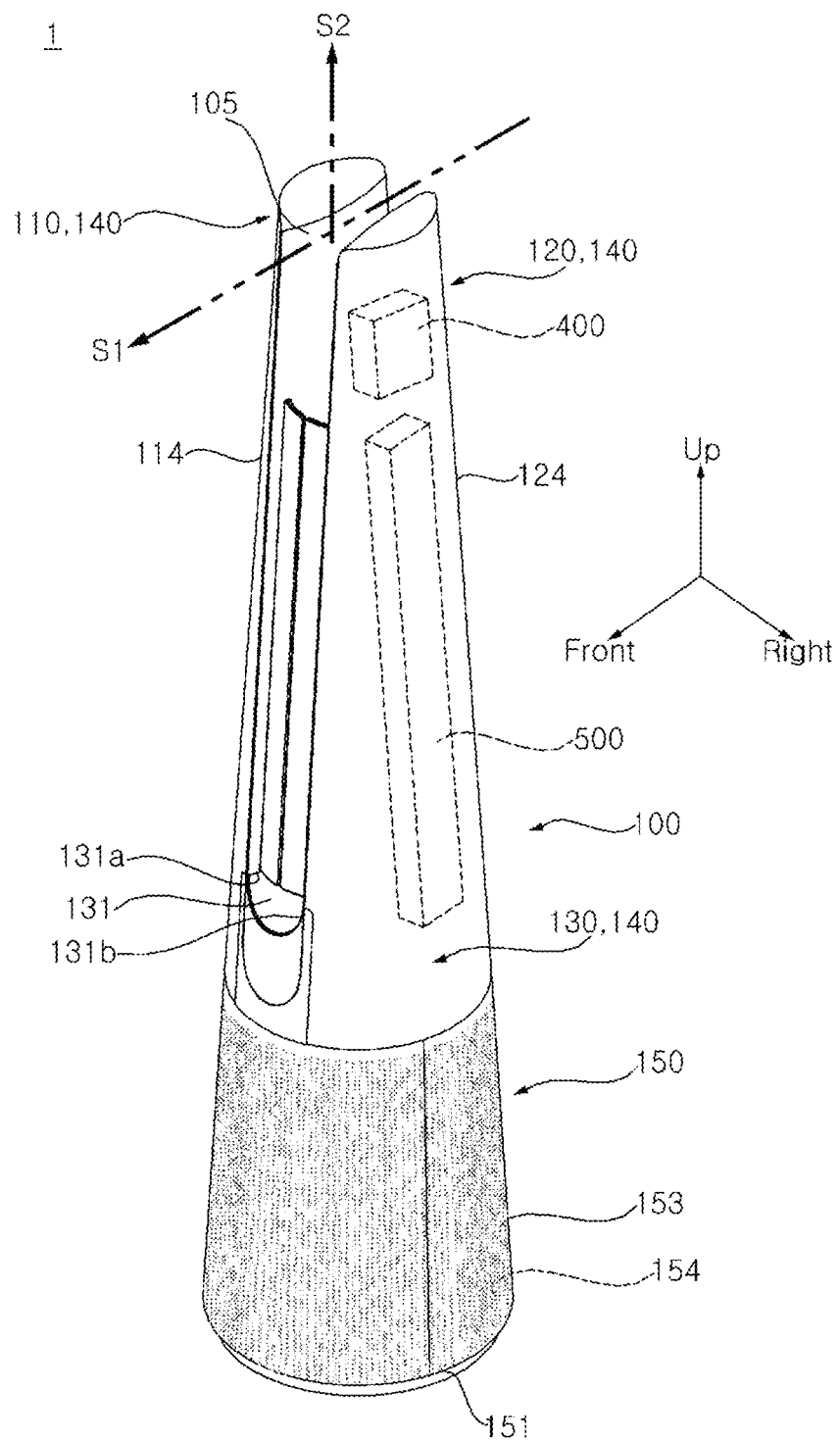
FIG. 2 is an exemplary operation view of FIG. 1.
Figure 3:
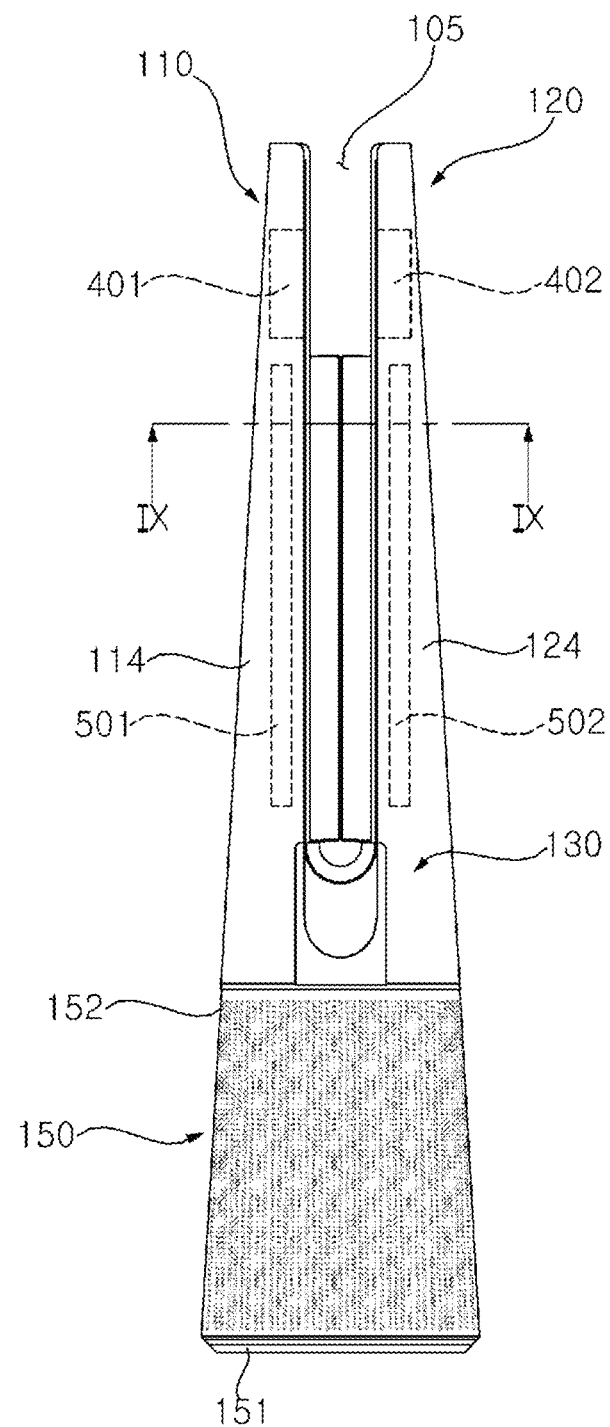
FIG. 3 is a front view of FIG. 2.

Referring to FIGS. 1 to 3, the filter 200 may be detachably installed inside of the base case 150. A tower base 130 may connect the first tower 110 and the second tower 120 to each other, and the tower base 130 may be coupled to the base case 150. The tower base 130 may be manufactured integrally with the first tower 110 and the second tower 120. Alternatively, the tower base 130 may be omitted, and the first tower 110 and the second tower 120 may be directly coupled to the base case 150 or may be manufactured integrally with the base case 150.

The fan assembly for the air conditioner 1 may suction ambient air through the base case 150 and discharge filtered air through the tower case 140. The tower case 140 may discharge air from a higher position than from where air is suctioned in the base case 150.

The air conditioner 1 may have a column shape where a diameter decreases in an upward direction. The overall shape or outer outline for the air conditioner 1 may have a cone or a truncated cone shape.

As an alternative, the air conditioner 1 may not necessarily include two towers 110 and 120, and an overall shape may not necessarily become narrower in the upward direction. However, such a configuration of the air conditioner 1 where a diameter recedes in the upward direction may lower a center of gravity and provide more stability against tipping over due to an external force.

For convenience of assembly, the base case 150 and the tower case 140 may be manufactured separately and later combined. Alternatively, the base case 150 and the tower case 140 may be manufactured integrally. For example, the base case 150 and tower case 140 may be manufactured in the form of a front case and a rear case which are integrally manufactured or separately manufactured and later combined.

The base case 150 may be formed to gradually decrease in diameter in an upward direction. The tower case 140 may also be formed to gradually decrease in diameter in the upward direction.

The outer surfaces of the base case 150 and the tower case 140 may be formed to appear continuous and/or seamless. A lower end of the tower base 130 and an upper end of the base case 150 may be in close contact, and outer surfaces of the tower base 130 and the base case 150 may form a continuous surface. A diameter of the lower end of the tower base 130 may be the same or slightly smaller than a diameter of the upper end of the base case 150.

The tower base 130 may distribute filtered air supplied from the base case 150 and provide the distributed air to the first tower 110 and the second tower 120. The tower base 130 may connect the first tower 110 and the second tower 120 to each other, and the blowing space 105 may be provided above the tower base 130. The first and second discharge ports 117 and 127 may be provided above the tower base 130, and ascending airflow and horizontal airflow may be formed above the tower base 130.

To minimize a friction or drag with air, an upper surface 131 of the tower base 130 may be formed to be concavely curved and extend in the front-rear direction. One or a first side 131a of the upper surface 131 may be connected to the first inner wall 115, and the other or a second side 131b of the upper surface 131 may be connected to the second inner wall 125.

Figure 4:
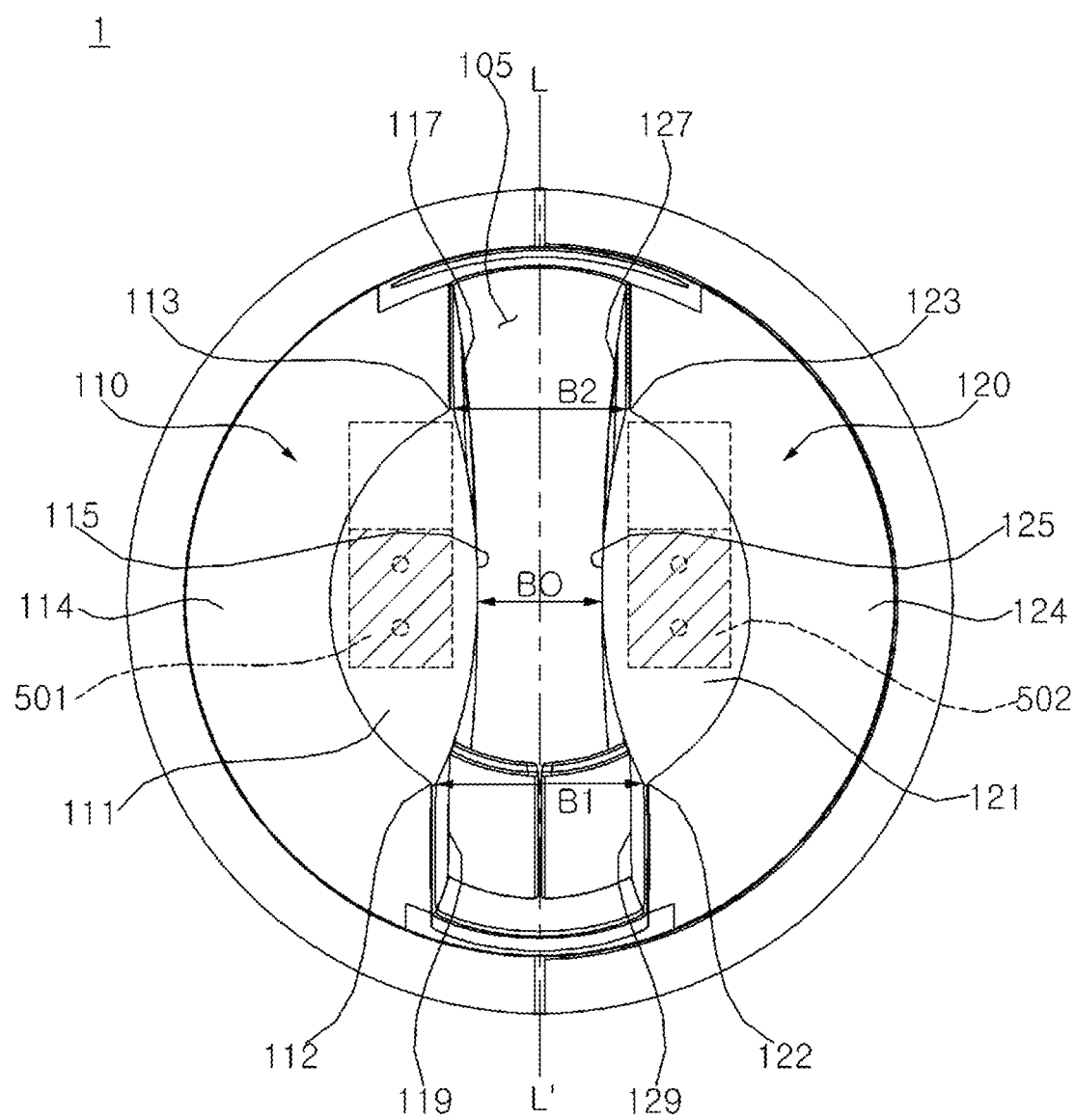
FIG. 4 is a plan view of FIG. 3.

Referring to FIG. 4, when viewed from a top view, the first tower 110 and the second tower 120 may be arranged symmetrically in the right-left direction with respect to a center line L-L'. The first discharge port 117 and the second discharge port 127 may be provided to be symmetrical across the center line L-L'.

The center line L-L' may be an imaginary line between the first tower 110 and the second tower 120 and may extend in a front-rear direction. The center line L-L' may pass through the upper surface 131. Alternatively, the first tower 110 and the second tower 120 may be formed to have asymmetric shapes with respect to each other. However, a control of horizontal airflow and ascending airflow may be easier when the first tower 110 and the second tower 120 are provided symmetrically with respect to the center line L-L'.

Figure 5:
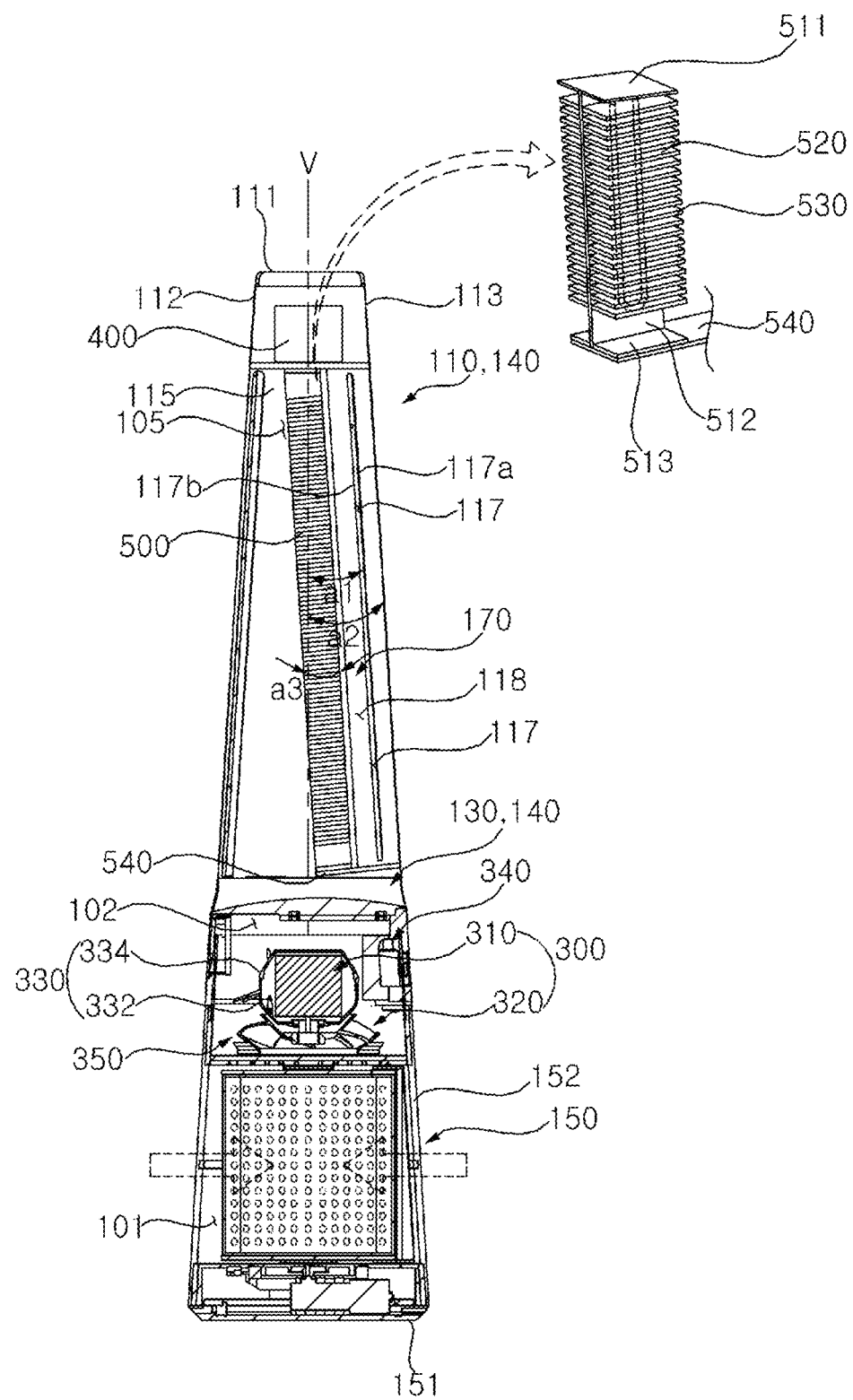
FIG. 5 is a right cross-sectional view of FIG. 2.
Figure 6:
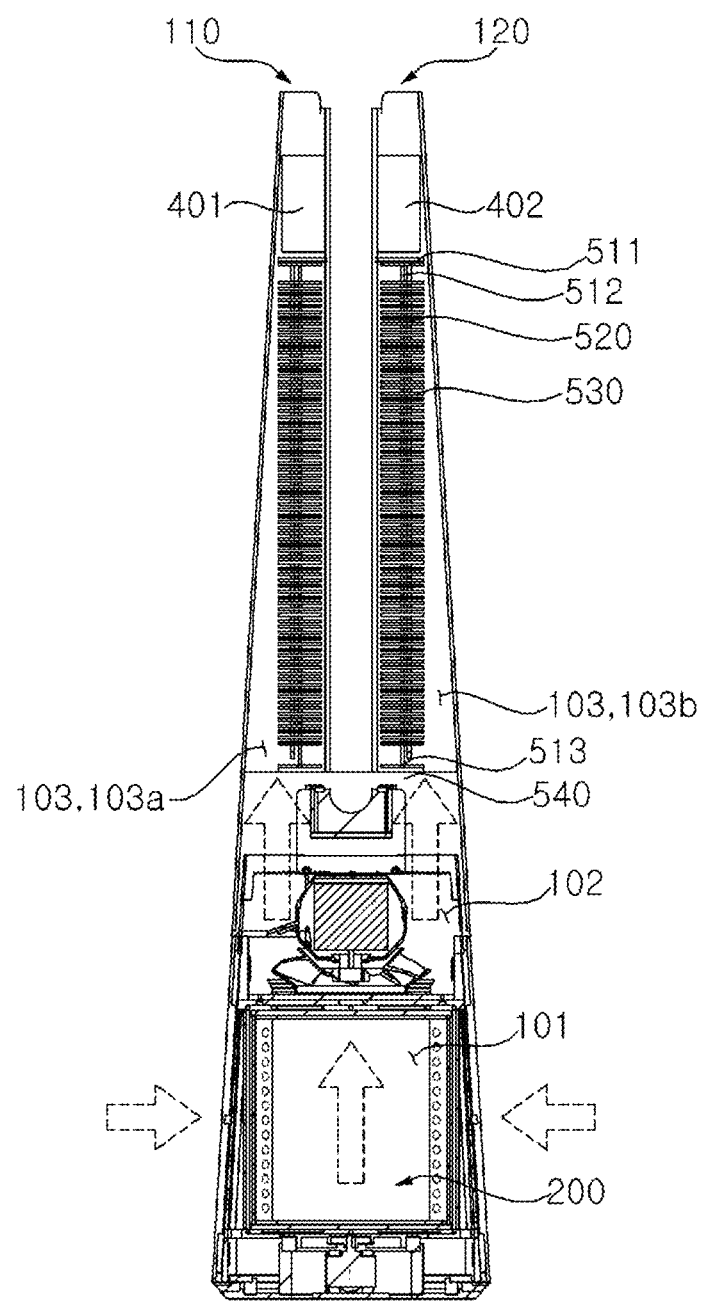
FIG. 6 is a front cross-sectional view of FIG. 2.

Referring to FIGS. 1, 5, and 6, the air conditioner 1 may include the filter 200 and a fan apparatus or assembly 300 provided inside the case 100. The fan assembly may cause air to flow to the discharge ports 117 and 127.

The filter 200 and the fan assembly 300 may be provided inside the base case 150. The base case 150 may be formed in a truncated cone shape having an upper opening.

The base case 150 includes a base or bottom 151 which is seated on the ground, and a base outer shell or wall 152 which is coupled to an upper side of the base 151 and includes a space formed therein and a suction port 155.

When viewed from a top view, the base 151 may be formed in a circular shape, but embodiments disclosed herein are not limited. The shape of the base 151 may be variously formed. For example, the shape of the base 151 may alternatively appear to be elliptical, oval, square, a vesica piscis or mandorla shape, etc.

The base outer wall 152 may be formed in a truncated cone shape having open upper and lower sides. A portion of a side surface of the base outer wall 152 may have an opening to form a filter insertion port 154 through which the filter 200 may be inserted into and withdrawn from.

The case 100 may include a cover or door 153 which shields the filter insertion port 154 and/or the suction port 155. The cover 153 may be detachably coupled to the base outer wall 152. The cover 153 may shield the filter insertion port 154 and at least a portion of the suction port 155.

The user may remove the cover 153 and take the filter 200 out of the case 100. A cover separation unit or assembly 600 may separate the cover 153 and will be described in detail in FIGS. 9 to 14.

Figure 10:
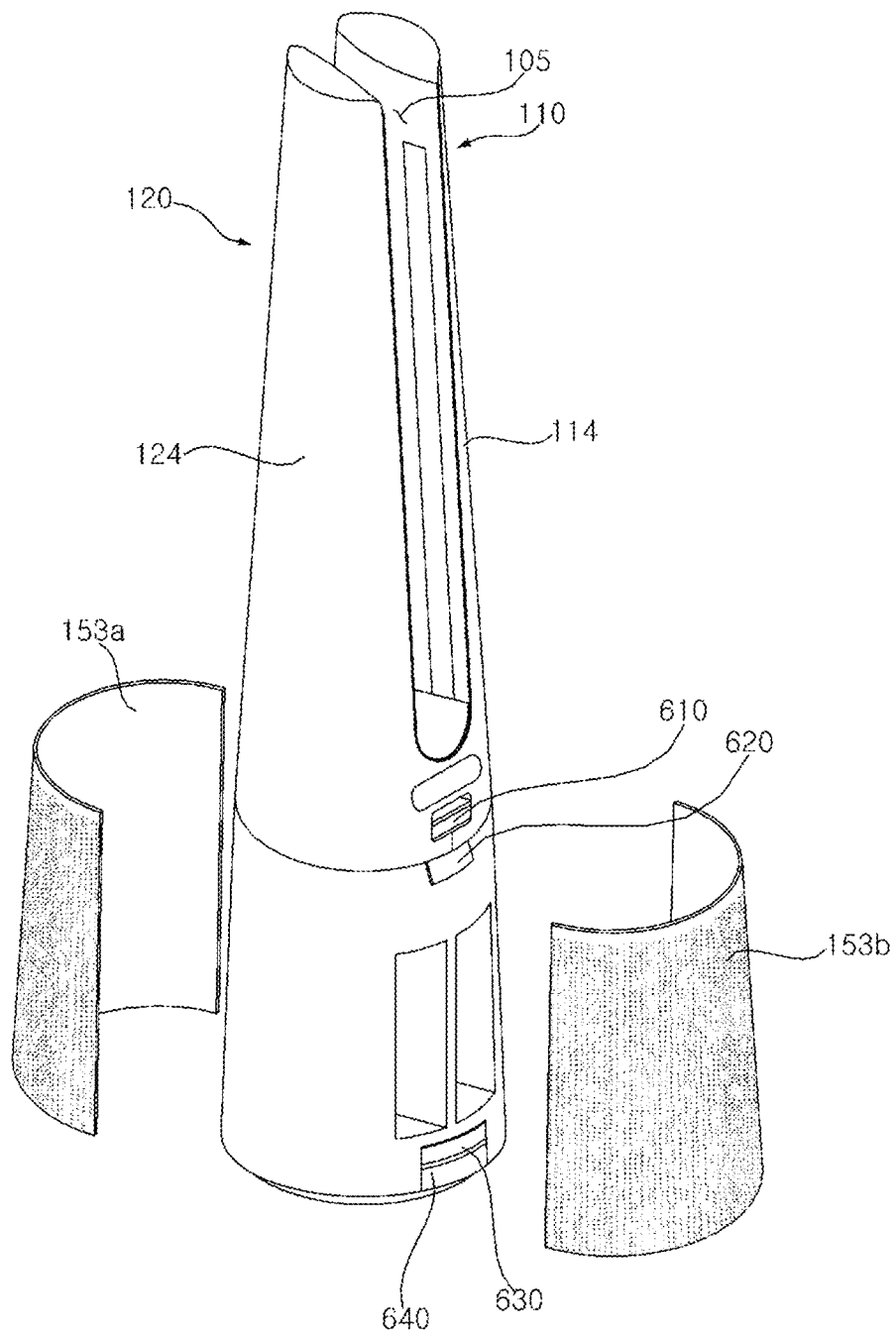
FIG. 10 is a perspective view illustrating a state where a filter is separated from a case of FIG. 9.
Figure 11:
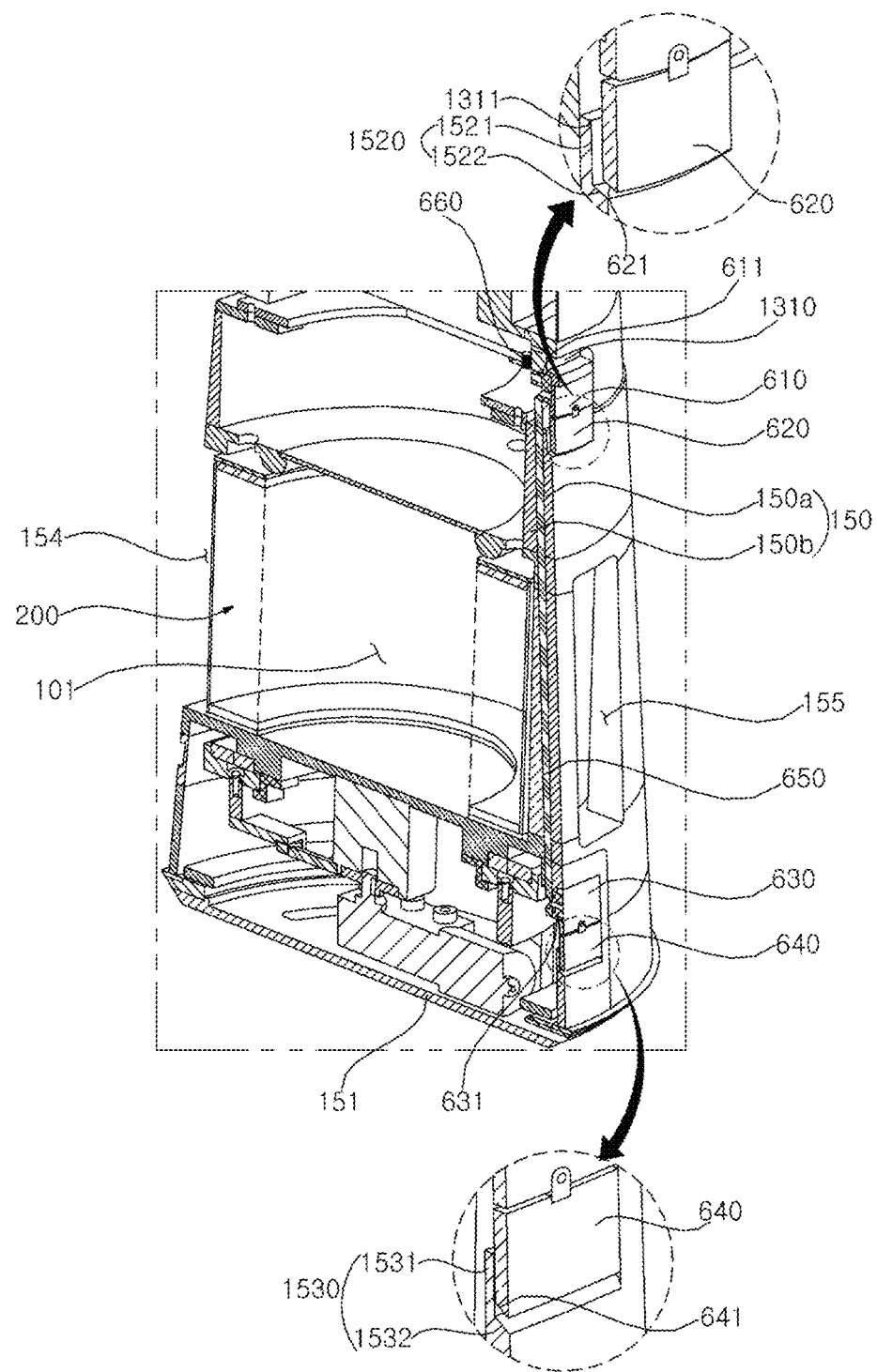
FIG. 11 is a cross-section perspective view taken along line A-A' of FIG. 9.

The suction port 155 may be formed in at least one of the base outer wall 152 and the cover 153. The drawings illustrate an example where the suction port 155 is formed in both the base outer wall 152 and the cover 153. The suction port 155 may include a plurality of holes or openings formed around an outer surface or circumference of the base outer wall 152 and cover 153 to suction air from all directions of (i.e., 360° around) the case 100. The holes or openings of the suction port 155 may be arranged in various shapes. As illustrated in FIGS. 10-11, the openings in the base outer wall 152 may be relatively large, while the holes in the cover 153 may be relatively small, but both openings and holes in the base outer wall 152 and cover 153 may be part of the suction port 155.

The filter 200 may be formed in a cylindrical shape having a hollow passage extending in the vertical direction. An outer surface of the filter 200 may face the suction port 155. Indoor and/or ambient air may pass through and flow from an outside of the filter 200 to an inside thereof, and in this process, foreign substances or harmful gases in the air may be removed.

The fan assembly 300 may be provided above the filter 200. The fan assembly 300 may cause air which has passed through the filter 200 to flow to the first tower 110 and the second tower 120. The fan assembly 300 may include a fan motor 310 and a fan 320 rotated by the fan motor 310. The fan assembly 400 may be provided inside the base case 150.

The fan motor 310 may be provided above the fan 320, and a motor shaft of the fan motor 310 may be coupled to the fan 320. A motor housing 330 in which the fan motor 310 is installed or located may be provided above the fan 320.

The motor housing 330 may have a shape surrounding an entire fan motor 310 to reduce a flow resistance with respect to the air flowing upward. Alternatively, the motor housing 330 may be formed to surround only a lower portion of the fan motor 310.

The motor housing 330 may include a lower motor housing 332 and an upper motor housing 334. At least one of the lower motor housing 332 and the upper motor housing 334 may be coupled to the case 100. As an example, the lower motor housing 332 may be coupled to the case 100. After the fan motor 310 is installed above the lower motor housing 332, the upper motor housing 334 may be covered so that the fan motor 310 may be covered and surrounded.

The motor shaft of the fan motor 310 may pass through the lower motor housing 332 to be assembled to the fan 320 provided at a lower side of the fan motor 310. The fan 320 may include a hub 328 (FIG. 30) to which the shaft of the fan motor 310 is coupled, a shroud 32 spaced apart from the hub, and a plurality of blades 325 connecting the hub and the shroud to each other.

The air which has passed through the filter 200 may be suctioned into the shroud 32 and then pressurized and discharged or guided by the rotating blades 325. The hub 328 may be provided above the blades 325, and the shroud 32 may be provided below the blades 325. The hub 328 may be formed in a bowl shape having a concave curvature, and a lower side of the lower motor housing 332 may be partially inserted into the hub 328.

The fan 320 may be a mixed flow fan. The mixed flow fan may suction air into an axial center and discharge air in a radial direction. The mixed flow fan may be formed and configured such that a direction of the discharged air may be inclined with respect to the axial direction of the fan.

Since air may flow upward, when air is discharged in the radial direction like a general centrifugal fan, a large flow loss due to a change in flow direction may occur. A screw flow fan may reduce or minimize air flow loss by discharging air upward in the radial direction.

A diffuser 340 may be further provided above the fan 320. The diffuser 340 may be configured to guide the flow of air caused by the fan 320 in the upward direction.

The diffuser 330 may further reduce a radial component in the air flow and reinforce an upward component in the air flow. The motor housing 330 may be provided between the diffuser 330 and the fan 320. To reduce or minimize an installation height of the motor housing 330, a lower end of the motor housing 330 may be inserted into the fan 320 to overlap in the vertical direction with the fan 320. An upper end of the motor housing 330 may be inserted into the diffuser 340 to overlap in the vertical direction with the diffuser 340. The lower end of the motor housing 330 may be higher than the lower end of the fan 320, and an upper end of the motor housing 330 may be provided lower than an upper end of the diffuser 340.

To configure or optimize an installation position of the motor housing 330, an upper side of the motor housing 330 may be provided inside the tower base 130, and a lower side of the motor housing 330 may be provided inside the base case 150. Alternatively, the motor housing 330 may be provided inside the tower base 130 or the base case 150. More details on the fan assembly 400 will be described beginning with FIG. 30.

A suction grill 350 may be provided inside the base case 150. The suction grill 350 may prevent a finger of the user from entering the fan 320 and protect the user and the fan 320 during removal or separation of the filter 200.

The filter 200 may be provided below the suction grill 350, and the fan 320 may be provided above the suction grill 350. The suction grill 350 may have a plurality of through holes through which air flowing upward may pass.

Inside the case 100, a space below the suction grill 350 may be defined as a filter installation space 101. A space between the suction grill 350 and the discharge ports 117 and 127 inside the case 100 may be defined as a blowing space 102. Inside the case 100, an inner space between the first tower 110 and the second tower 120 in which the discharge ports 117 and 127 are provided may be defined as a discharge space 103.

Figure 8:
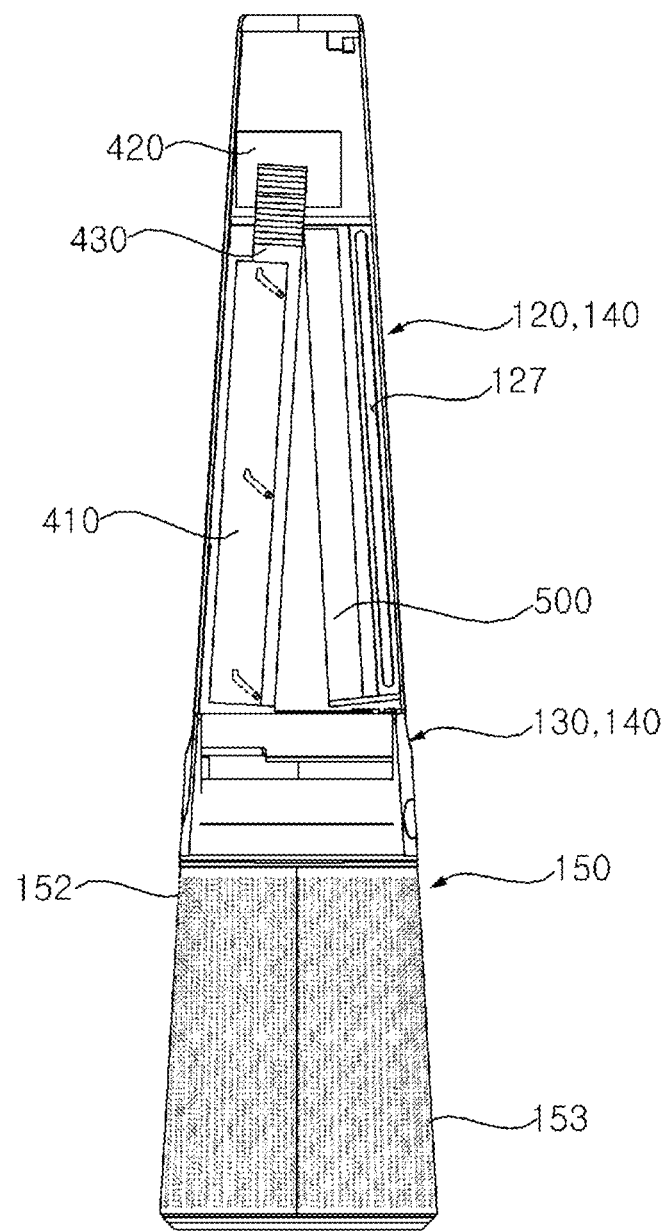
FIG. 8 is a right cross-sectional view of FIG. 7.

Indoor or ambient air may be introduced into the filter installation space 101 through the suction port 155 and then discharged to the discharge ports 117 and 127 through the blowing space 102 and the discharge space 103. Referring to FIGS. 5 and 8, the first discharge port 117 and the second discharge port 127 may be elongated in the vertical direction.

The first discharge port 117 may be provided between the front end 112 and the rear end 113 of the first tower 110 at a position closer to the rear end 113. Air discharged from the first discharge port 117 may flow along the first inner wall 115 and toward the front end 112 due to the Coanda effect.

The first discharge port 117 may include a first border 117a forming an edge (front edge) on an air discharge side (or front end or side), a second border 117b forming an edge (rear edge) on a side opposite to the air discharge side (or rear end or side), an upper border 117c forming an upper edge of the first discharge port 117, and a lower border 117d forming a lower edge of the first discharge port 117.

The first border 117a and the second border 117b may be parallel to each other. The upper border 117c and the lower border 117d may be parallel to each other.

The first border 117a and the second border 117b may be inclined with respect to the vertical direction, shown as V in FIG. 5. The rear end 113 of the first tower 110 may also be inclined with respect to the vertical direction V.

An extension of the discharge port 117 may not be perfectly parallel to the rear end 113 and/or the front end 112 of the first tower 110. An inclination a1 of the discharge port 117 may be larger than an inclination of an outer surface of the first tower 110. For example, an inclination a1 of each of the first border 117a and the second border 117b with respect to the vertical direction V may be 4°, and an inclination a2 of the rear end 113 may be 3°.

The second discharge port 127 may be symmetrical in the right-left direction with the first discharge port 117. The second discharge port 127 may include a first border 127a forming an edge (front edge) on an air discharge side (front end or side), a second border 127b forming an edge (rear edge) on a side opposite to the air discharge side (rear end or side), an upper border 127c forming an upper edge of the second discharge port 127, and a lower border 127d forming a lower edge of the second discharge port 127.

The first border 127a and the second border 127b may be inclined with respect to the vertical direction V, and the rear end 113 of the first tower 110 may also be inclined with respect to the vertical direction V. In addition, the inclination a1 of the discharge port 127 may be larger than the inclination a2 of the outer surface of the tower.

Figure 9:
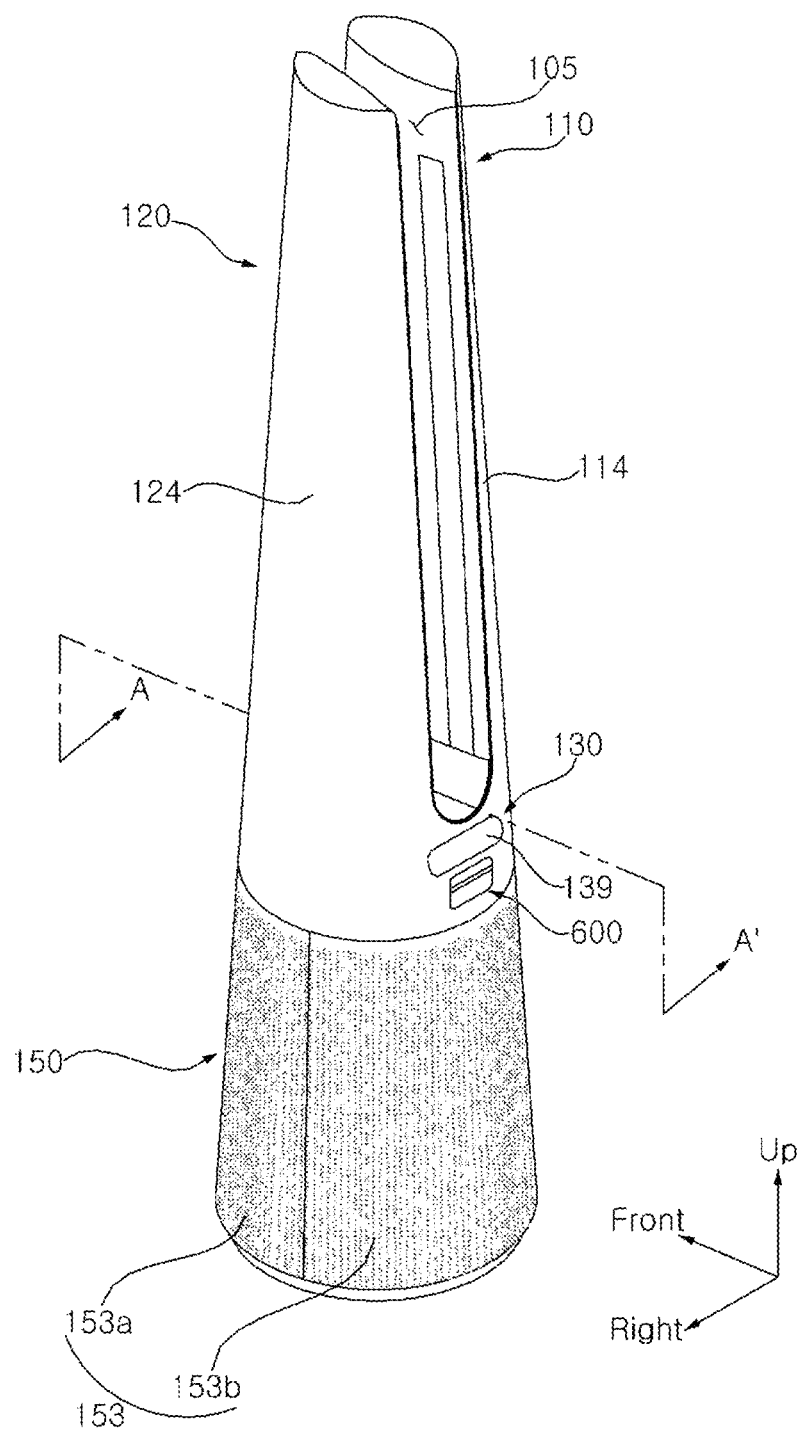
FIG. 9 is a perspective view when the air conditioner of FIG. 1 is viewed in another direction.

A cover separation unit 600 to separate the cover 153 from the base case 150 will be described in detail. Referring to FIGS. 9 and 10, the cover 153 may be coupled to the case 100 without a gap for an aesthetic appearance. The cover 153 may be magnetically coupled to the case 100, and a magnet may be installed or provided on the cover 153 and/or the case 100.

The cover 153 may have a shape configured to make up the entire outer or peripheral surface or wall 151 of the base case 150. The cover 153 may be formed in a cylindrical shape or truncated cone shape. The cover 153 may be formed as two pieces (e.g., two demi-cylindrical shells) configured to couple to each other for convenience of separation and to reduce a gap or seam during coupling.

The cover 153 may include a front cover 153a providing a front surface of the base case 150 and a rear cover 153b providing a remaining surface (e.g., rear surface) of the base case 150. Each of the front cover 153a and the rear cover 153b may have a semi-cylindrical (e.g., demi-cylindrical if the front and rear covers 153a and 153b are symmetrical) shape. The cover 153 may shield the filter insertion port 154 and provide the suction port 155 to enhance an aestheticism.

An outer surface of the cover 153 may coincide with the outer surface of the tower case 140. When the cover 153 is coupled to the base case 150, the cover 153 may provide a sense of unity with the tower case 140 without or with a reduced gap or seam. However, the smoother the transition between tower case 140 and base case 150, the more difficult it is to remove the cover 153, as there may be no space for the hand of the user to enter. Hence, a cover separation unit 600 may be provided so that the user may more easily separate the cover 153 from the base case 150.

The cover separation unit 600 may be installed or located in the case 100 to separate the cover 153 from the base case 150. For example, the cover separation unit 600 may include a lever 610 and an upper cover pusher 620. As another example, the cover separation unit 600 may include a lever 610, an upper cover pusher 620, a slider 630, and a lower cover pusher 640 to simultaneously separate the top and bottom of the cover 153.

Figure 12:
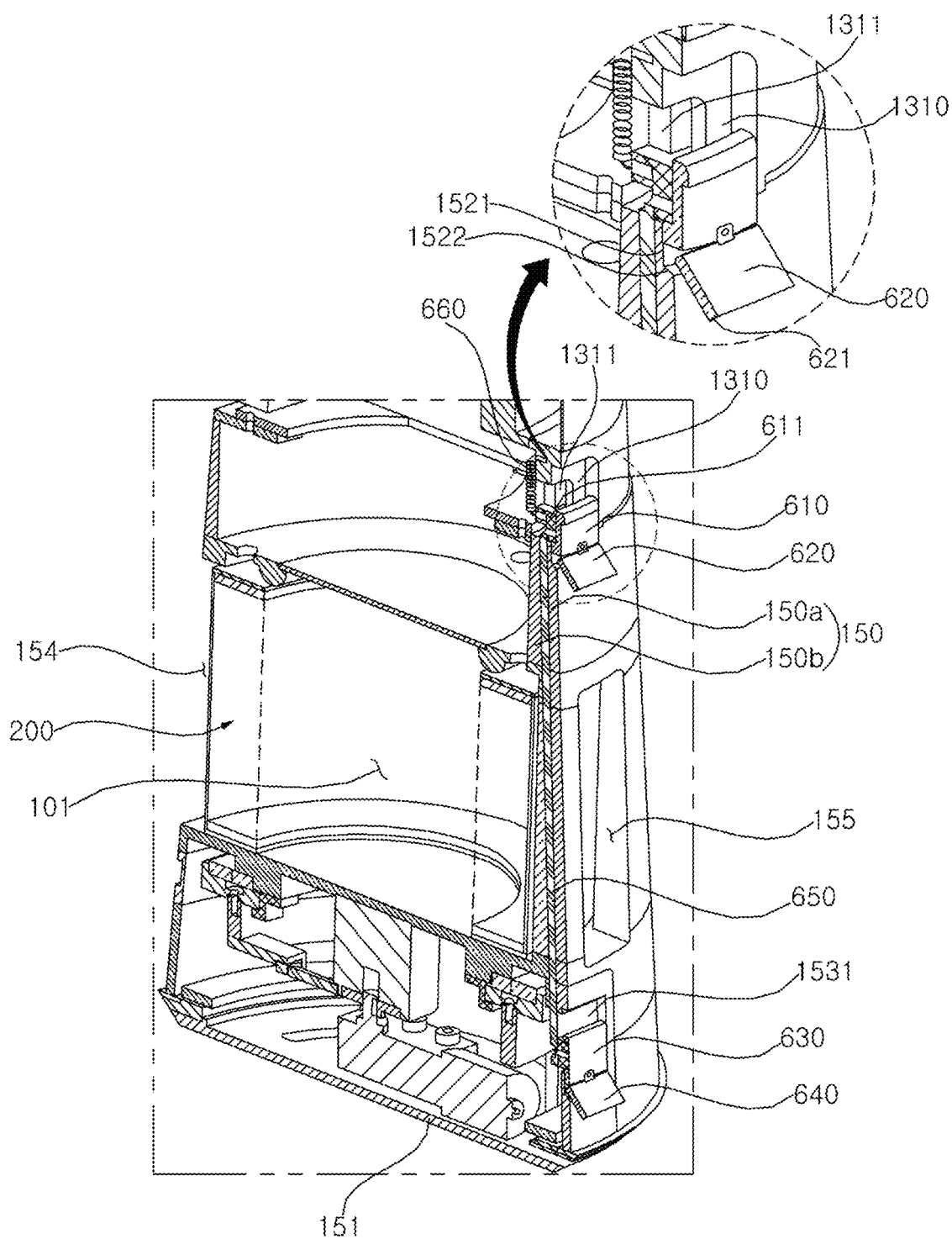
FIG. 12 is a view illustrating an operation state of FIG. 11.
Figure 13:
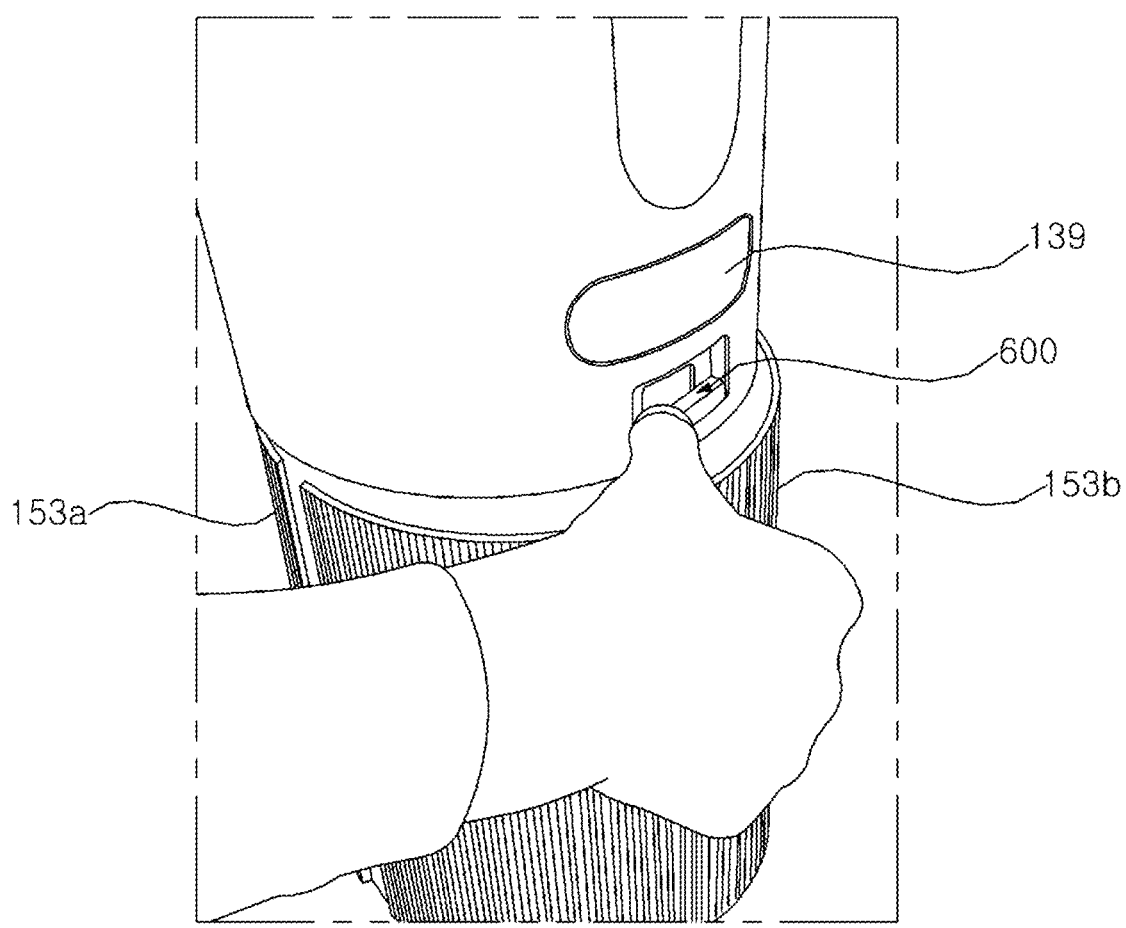
FIG. 13 is a view illustrating an operation of FIG. 9 in a state where the cover and the case are coupled to each other.

Referring to FIGS. 11 and 12, the lever 610 may be installed or located in the case 100 and be configured to slide along the outer surface of the case 100. The lever 610 may be installed or located in the base case 150 or the tower case 140. For example, the cover 153 may provide an entire outer surface of the base case 150, and the lever 610 may be installed or located in the tower case 140 and configured to slide along the outer surface of the tower case 140.

The lever 610 may transmit an external force to the upper cover pusher 620 or/and the lower cover pusher 640. At least a portion of the lever 610 may be exposed to an outer side through the outer surface of the case 100 and/or the outer surface of the tower case 140. The lever 610 may be provided above the cover 153.

The lever 610 may be exposed through a surface of the tower case 140 and configured to be moved up and down by an external force. The user may operate the lever 610 without excessively bending over. The lever 610 may move along the outer surface of the case 100. When the lever 610 moves, the lever 610 may not protrude outward of the case 100, reducing a risk of damage to the lever 610.

The lever 610 may be provided in a lever receiving groove 1310 formed in the case 100. The lever receiving groove 1310 may be formed in the tower case 140 or may be formed in the base case 150.

An outer peripheral surface of the tower case 140 may be to form the lever receiving groove 1310. The lever receiving groove 1310 may communicate with a pusher receiving groove 1521 to be described later. A lower portion of the lever receiving groove 1310 may be open to communicate with the pusher receiving groove 1521. The lever receiving groove 1310 may receive the lever 610 and provide a space in which the lever 610 moves.

A guide slit 1311 may be formed in the lever receiving groove 1310. The guide slit 1311 may guide the lever 610 and prevent the lever 610 from being separated from the case 100. The lever 610 may further include a holder 611.

One or a first end of the holder 611 may be connected to the lever 610 through the guide slit 1311, and the other or a second end of the holder 611 may be provided inside the tower case 140 and have a width wider than a width of the guide slit 1311. Even if the lever 610 is moved up and down, the lever 610 may be prevented from being separated from the case 100.

The cover separation unit 600 may further include a return spring 660 configured to provide an upward restoring force to the lever 610. One or a first end of the return spring 660 may be connected to an inner surface of the tower case 140, and the other or a second end of the return spring 660 may be connected to the holder 611 of the lever 610.

The upper cover pusher 620 may be rotatably coupled to the lever 610 and guided to the outer surface of the case 100 to push the cover 153. When an external force is applied to the lever 610, the cover 153 may be separated from the case 100 by the upper cover pusher 620.

The upper cover pusher 620 may be rotatably coupled (e.g., hinged, bendably or flexibly coupled, etc.) to the lever 610. As an example, the upper cover pusher 620 may be formed of a flexible material, and one end of the upper cover pusher 620 may swing or rotate while the upper cover pusher 620 is being bent. In the illustrated example, the upper cover pusher 620 of the cover 153 is hinge-coupled to a lower end of the lever 610.

The upper cover pusher 620 may be provided in a coupling region in which the cover 153 is coupled to the base case 150. Here, the coupling region may mean an area at a position horizontally overlapping with the cover 153 in the base case 150. The coupling region may be a portion of the base case 150 or may be the entire base case 150.

The upper cover pusher 620 may be located between the cover 153 and the base case 150. When the cover 153 is coupled to the base case 150, the upper cover pusher 620 may not be exposed to the outside via the cover 153. The upper cover pusher 620 may be located in the pusher receiving groove 1521 described later.

When the cover 153 is coupled to the base case 150, the upper cover pusher 620 may be covered by the cover 153, improving aestheticism and a sense of unity. Since there is no need for a separate space for the upper cover pusher 620 to rotate, the air conditioner 1 may have a slim appearance.

An upper rotation guide 1520 may guide the upper cover pusher 620 so that the upper cover pusher 620 rotates when the upper cover pusher 620 is moved along the outer surface of the base case 150. The upper rotation guide 1520 may receive the upper cover pusher 620.

The upper rotation guide 1520 may include an upper guide surface 1522 which extends in a direction intersecting the outer surface of the base case 150 and guides the upper cover pusher 620. The upper guide surface 1522 may extend in a direction intersecting the vertical direction of the outer surface of the base case 150. The upper guide surface 1522 may have an inclination angle greater than 0° with respect to the outer surface of the base case 150. The upper guide surface 1522 may be inclined downward from an inside of the base case 150 toward an outside thereof.

A lower surface of the upper cover pusher 620 may be inclined downward in an outward direction to correspond to the upper guide surface 1522. The lower surface of the upper cover pusher 620 may have a constant inclination angle in the vertical direction. When the upper cover pusher 620 moves downward due to interference between the lower surface of the upper cover pusher 620 and the upper guide surface 1522, the lower end of the upper cover pusher 620 may protrude outward.

At least a portion of the upper guide surface 1522 may vertically overlap with the upper end of the upper cover pusher 620 when the filter 200 is coupled.

The upper rotation guide 1520 may be provided in a region horizontally overlapping the cover 153 in the base case 150. When the cover 153 is coupled to the base case 150, the upper rotation guide 1520 may not be exposed to the outside via the cover 153.

The base case 150 may include an inner base case 150a and an outer base case 150b surrounding at least a portion of the inner base case 150a. The upper guide surface 1522 may be formed on an outer surface of the outer base case 150b.

The upper pusher receiving groove 1521 may receive the upper cover pusher 620. The upper pusher receiving groove 1521 may receive a portion of the lever 610 when the lever 610 moves downward.

The upper pusher receiving groove 1521 may receive the upper cover pusher 620 when the lever 610 is not operated and guide a movement of the upper cover pusher 620 when the lever 610 moves downward. The upper pusher receiving groove 1521 may be formed by the outer peripheral surface of the outer base case 150b being recessed inward. The upper pusher receiving groove 1521 may be open outward in the outer base case 150b. The upper pusher receiving groove 1521 may be open at an upper side and communicate with the lower portion of the lever receiving groove 1310 so as to receive and guide the lever 610 when the lever 610 moves downward. The upper pusher receiving groove 1521 and the lever receiving groove 1310 may be located so that at least a portion thereof overlap each other vertically.

The upper guide surface 1522 may be formed on one surface of the upper pusher receiving groove 1521. The upper guide surface 1522 may be formed on a lower surface of the upper pusher receiving groove 1521. The upper cover pusher 620 may be guided along the upper guide surface 1522, and the upper cover pusher 620 may be separated from the pusher receiving groove 1521 to the outside.

The slider 630 may be spaced apart from the upper cover pusher 620 and installed to be slid on the case 100, and may be connected to the lever 610. The slider 630 may be moved while being constrained by the lever 610. The slider 630 may be installed to be slid on the base case 150. The slider 630 may transmit the external force transmitted from the lever 610 to the lower cover pusher 640.

The slider 630 may be received in a lower rotation guide 1530 formed in the case 100. As the slider 630 moves within the lower rotation guide 1530, a movement direction of the slider 630 may be guided by the lower rotation guide 1530.

The slider 630 may be located below the upper cover pusher 620. The slider 630 may be located between the base case 150 and the cover 153. The slider 630 may not be visible from the outside when the cover 153 is coupled to the case 100.

A slide slit 1534 may be formed in the lower rotation guide 1530. The slide slit 1534 may guide the slider 630 and prevent the slider 630 from being separated from the case 100.

The slider 630 may further include a slide holder 631. One or a first end of the slide holder 631 may be connected to the slider 630 through the slide slit 1534, and the other or a second end of the slide holder 631 may be located inside the base case 150 and have a width wider than a width of the slide slit 1534. Even when the slider 630 is moved up and down, the slider 630 may be prevented from being separated from the case 100.

The slider 630 and the lever 610 may be connected to each other by a connection link 650. One or a first end of the connection link 650 may be connected to the holder 611, and the other or a second end of the connection link 650 may be connected to the slide holder 631. The connection link 650 may be constrained by the movement of the lever 610 and move together with the lever 610. The connection link 650 may be located inside the case 100 in a space between the inner base case 150a and the outer base case 150b, and may be guided by the inner base case 150a and the outer base case 150b.

The lower cover pusher 640 may be rotatably coupled to the slider 630 and guided to the outer surface of the case 100 to push the cover 153. When an external force is applied to the slider 630, the cover 153 may be separated from the case 100 by the lower cover pusher 640.

The lower cover pusher 640 may be hinged to the slider 630 to be rotated. Alternatively or in addition thereto, the lower cover pusher 640 may be connected to one end of the slider 630 in a bendable manner to be rotated. For example, the lower cover pusher 640 may be formed of a flexible material. One end of the lower cover pusher 640 may be swing or rotated as the lower cover pusher 640 is bent. In the illustrated example, the pusher of the cover 153 is hinge-coupled to a lower end of the slider 630.

The lower cover pusher 640 may be provided in a coupling region of the base case 150 in which the cover 153 is coupled to the base case 150. The coupling region may mean a position horizontally overlapping with the cover 153 in the base case 150. The coupling region may be a portion of the base case 150 or may be the entire base case 150.

The lower cover pusher 640 may be located between the cover 153 and the base case 150. When the cover 153 is coupled to the base case 150, the lower cover pusher 640 may not be exposed to the outside by the cover 153. The lower cover pusher 640 may be located in a lower pusher receiving groove 1531 formed in the base case 150 to be described later.

When the cover 153 is coupled with the base case 150, the lower cover pusher 640 may be covered with the cover 153, improving aestheticism. Since a separate space for a rotation of the lower cover pusher 640 is not required, the air conditioner 1 may be more compact and slim.

The lower cover pusher 640 may be located below the upper cover pusher 620. When the lever 610 is operated, the upper and lower portions of the cover 153 may be simultaneously separated by the upper cover pusher 620 and the lower cover pusher 640, and the cover 153 is stably separated.

The lower rotation guide 1530 may guide the lower cover pusher 640 so that the lower cover pusher 640 may rotate when the lower cover pusher 640 is moved along the outer surface of the base case 150. The lower rotation guide 1530 may receive the lower cover pusher 640.

The lower rotation guide 1530 may include a lower guide surface 1532 which has an inclination with respect to the outer surface (outer peripheral surface) of the base case 150 and guides the lower cover pusher 640.

The lower guide surface 1532 may extend in a direction intersecting the vertical direction of the outer peripheral surface of the base case 150. The lower guide surface 1532 may have an inclination which is not parallel to the outer surface of the base case 150. The lower guide surface 1532 may be inclined downward from the inside of the base case 150 toward the outside of the base case 150.

A lower surface 641 of the lower cover pusher 640 may be inclined downward from the inside to the outside to correspond to the lower guide surface 1532. When the lower cover pusher 640 moves downward due to interference between the lower surface of the lower cover pusher 640 and the lower guide surface 1532, the lower end of the lower cover pusher 640 may protrude outward.

At least a portion of the lower guide surface 1532 may vertically overlap with the upper end of the lower cover pusher 640. At least a portion of the lower guide surface 1532 may vertically overlap with the upper end of the lower cover pusher 640 in a state where the cover 153 is coupled.

The lower rotation guide 1530 may be provided in a region of the base case 150 that horizontally overlaps with the cover 153. When the cover 153 is coupled to the base case 150, the lower rotation guide 1530 may not be exposed to the outside by the cover 153.

The base case 150 may include the inner base case 150*a* and the outer base case 150*b* provided to surround at least a portion of the inner base case 150*a*, and the lower guide surface 1532 may be formed on the outer surface of the outer base case 150*b*. The lower rotation guide 1530 may further include a lower pusher receiving groove 1531 receiving the lower cover pusher 640. The lower pusher receiving groove 1531 may receive a portion of the slider 630 when the slider 630 moves downward. The lower pusher receiving groove 1531 may receive the lower cover pusher 640 and the slider 630 when the slider 630 is not operated, and guide movements of the lower cover pusher 640 and the slider 630 when the slider 630 moves downward.

The lower pusher receiving groove 1531 may be formed by recessing the outer peripheral surface of the outer base case 150*b* in an inner direction. The lower pusher receiving groove 1531 may be open outward in the outer base case 150*b*. The lower pusher receiving groove 1531 may be open at a lower side and communicate with a lower portion of a slider receiving groove so as to receive and guide the slider 630 when the lever 610 moves downward. The lower pusher receiving groove 1531 and the slider receiving groove may be located so that at least a portion thereof overlaps each other vertically.

The lower guide surface 1532 may be formed on a lower side of the lower pusher receiving groove 1531. The lower cover pusher 640 may be guided along the lower guide surface 1532, and the lower cover pusher 640 may be separated from the pusher receiving groove 1521.

The location of the cover separation unit 600 is not limited. Since it is common for the user to place a rear of the air conditioner 1 near a wall, the cover separation unit 600 may be provided at the rear of the air conditioner 1.

The cover separation unit 600 may be provided at a position where the cover separation unit 600 overlaps at least a portion of the blowing space 105 vertically. The lever 610 may be located to vertically overlap at least a portion of the blowing space 105. The lever 610 may be provided below the blowing space 105. The upper cover pusher 620, the lower cover 153 pusher, and the slider 630 may be provided at positions vertically overlapping the blowing space 105.

Figure 14:
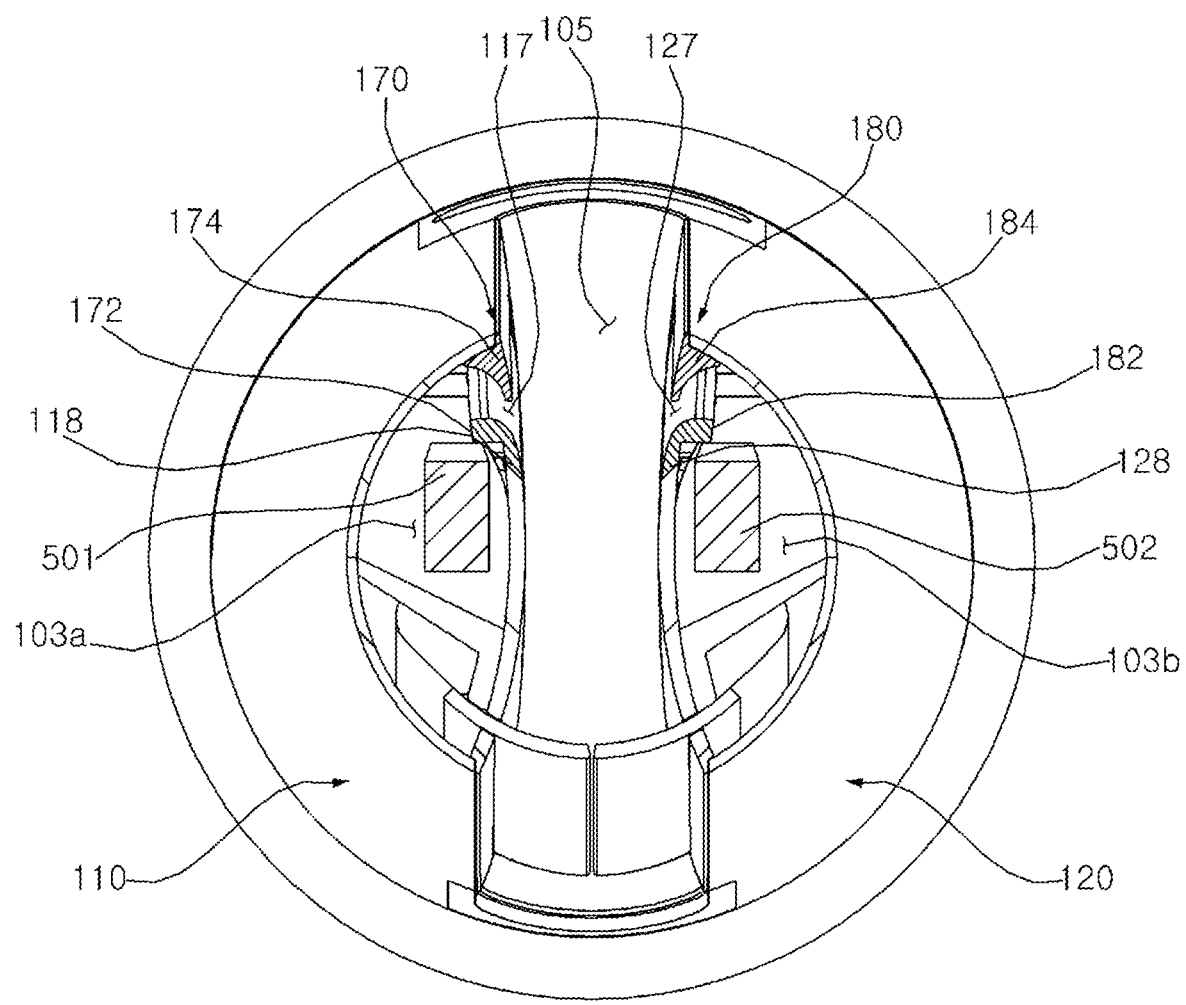
FIG. 14 is a plan cross-sectional view taken along line IX-IX of FIG. 3.
Figure 15:
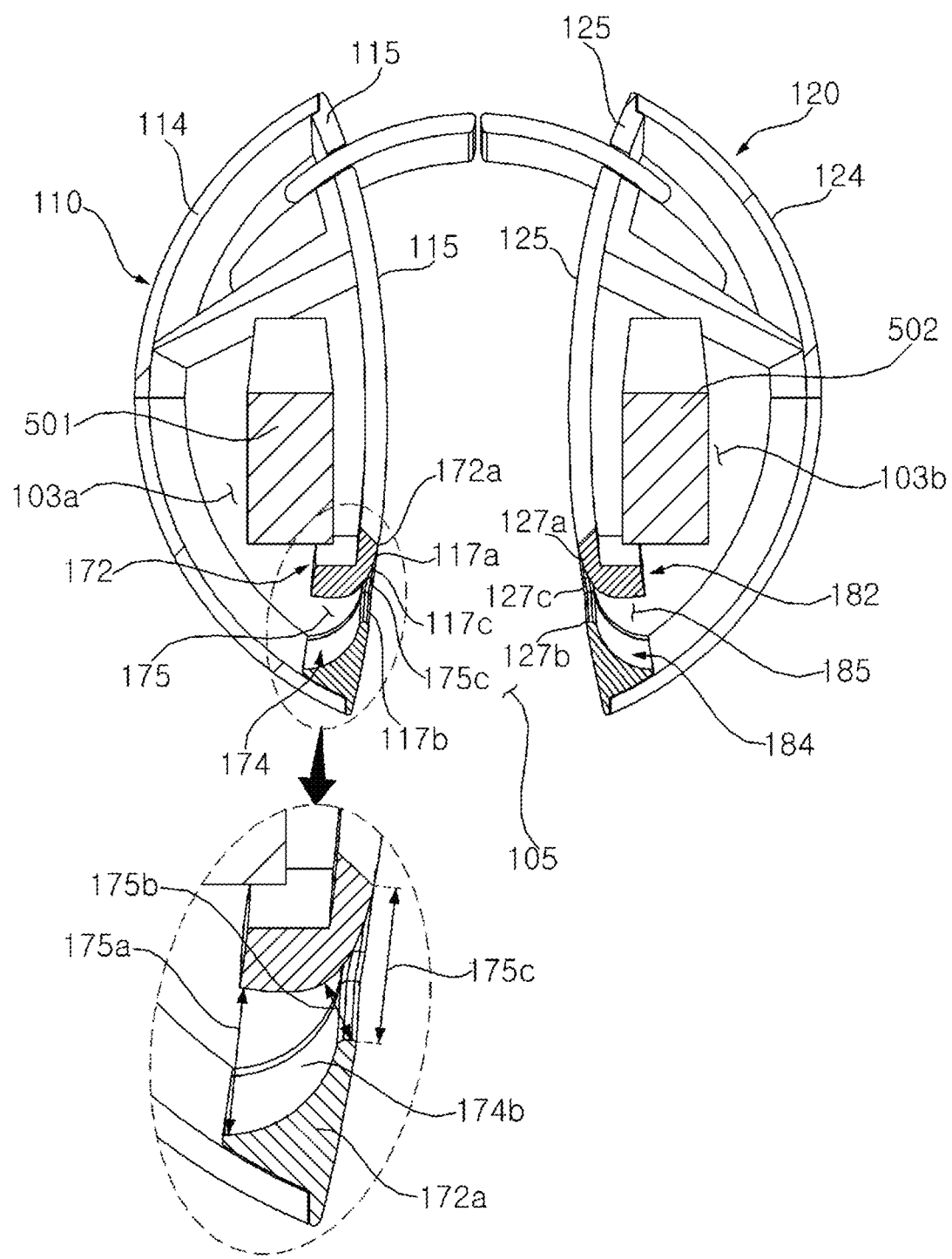
FIG. 15 is a bottom cross-sectional view taken along line IX-IX of FIG. 3.

Referring to FIGS. 5, 14, and 15, the first discharge port 117 of the first tower 110 may face the second tower 120, and the second discharge port 127 of the second tower 120 may face the first tower 110. The air discharged from the first discharge port 117 may flow along the inner wall 115 of the first tower 110 through the Coanda effect. The air discharged from the second discharge port 127 may flow along the inner wall 125 of the second tower 120 through the Coanda effect.

The present embodiment further includes a first discharge case 170 and a second discharge case 180. The first discharge port 117 may be formed in the first discharge case 170, and the first discharge case 170 may be assembled or coupled to the first tower 110. The second discharge port 127 may be formed in the second discharge case 180, and the second discharge case 180 may be assembled or coupled to the second tower 120.

The first discharge case 170 may be installed to penetrate the inner wall 115 of the first tower 110, and the second discharge case 180 may be installed to penetrate the inner wall 125 of the second tower 120. A first discharge opening 118 in which the first discharge case 170 may be installed or located may be formed in the first tower 110, and a second discharge opening 128 in which the second discharge case 180 may be installed or located may be formed in the second tower 120.

The first discharge case 170 may form the first discharge port 117. The first discharge case 170 may include a first discharge guide 172 provided on an air discharge side of the first discharge port 117 and a second discharge guide 174 provided on a side opposite to the air discharge side of the first discharge port 117. The first and second discharge guides 172 and 174 may form the first discharge port 117.

Outer surfaces 172*a* and 174*a* of the first discharge guide 172 and the second discharge guide 174 may provide a portion of the inner wall 115 of the first tower 110. An inside of the first discharge guide 172 may face toward the first discharge space 103*a*, and an outside thereof may be face toward the blowing space 105. An inside of the second discharge guide 174 may face toward the first discharge space 103*a*, and an outside thereof may face toward the blowing space 105.

The outer surface 172*a* may form a curved surface continuous with the outer surface of the first inner wall 115. The outer surface 174*a* of the second discharge guide 174 may provide a surface continuous with the first inner wall 115. The inner surface 174*b* may form a curved surface continuous with the inner surface of the first outer wall 115, and the air in the first discharge space 103*a* may be guided to the first discharge guide 172 side.

The first discharge port 117 may be formed between the first discharge guide 172 and the second discharge guide 174, and air in the first discharge space 103*a* may be discharged to the blowing space 105 blown through the first discharge port 117. Air in the first discharge space 103*a* may be discharged between the outer surface 172*a* of the first discharge guide 172 and the inner surface 174*b* of the second discharge guide 174. A gap between the outer surface 172*a* of the first discharge guide 172 and the inner surface 174*b* of the second discharge guide 174 may be defined as a discharge gap 175. The discharge gap 175 may form a predetermined channel.

The discharge gap 175 may be formed so that a width at an intermediate portion 175*b* may be narrower than widths at an inlet 175*a* and an outlet 175*c*. The intermediate portion 175*b* may be defined as the shortest distance between the second border 117*b* and the outer surface 172*a*.

A cross-sectional area may gradually narrow from the inlet of the discharge gap 175 to the intermediate portion 175*b*, and the cross-sectional area may increase again from the intermediate portion 175*b* to the outlet 175*c*. The intermediate portion 175*b* may be located inside the first tower 110. When viewed from the outside, the outlet 175*c* of the discharge gap 175 may be viewed as the discharge port 117.

In order to induce the Coanda effect, a curvature radius of the inner surface 174*b* of the second discharge guide 174 may be larger than a curvature radius of the outer surface 172*a* of the first discharge guide 172. A center of curvature of the outer surface 172*a* of the first discharge guide 172 may be located in front of the outer surface 172*a* and may be formed inside the first discharge space 103*a*. A center of curvature of the inner surface 174*b* of the second discharge guide 174 may be located on the side of the first discharge guide 172 and may be formed inside the first discharge space 103*a*.

The second discharge case 180 may form the second discharge port 127 and may include a first discharge guide 182 provided on an air discharge side of the second discharge port 127 and a second discharge guide 184 provided on a side opposite to the air discharge of the second discharge port 127. The first and second discharge guides 182 and 184 may form the second discharge port 127.

A discharge gap 185 may be formed between the first discharge guide 182 and the second discharge guide 184. Since the second discharge case 180 may be symmetrical to the first discharge case 170, a detailed description thereof will be omitted.

The air conditioner 1 may further include an airflow guide or converter 400 configured to change the air flow direction in the blowing space 105. The airflow converter 400 may include a component which protrudes to the blowing space 105 and changes the direction of air flowing through the blowing space 105. The airflow converter 400 may convert the horizontal airflow flowing through the blowing space 105 into an ascending airflow. The air flow converter 400 may serve as a damper.

Figure 16:
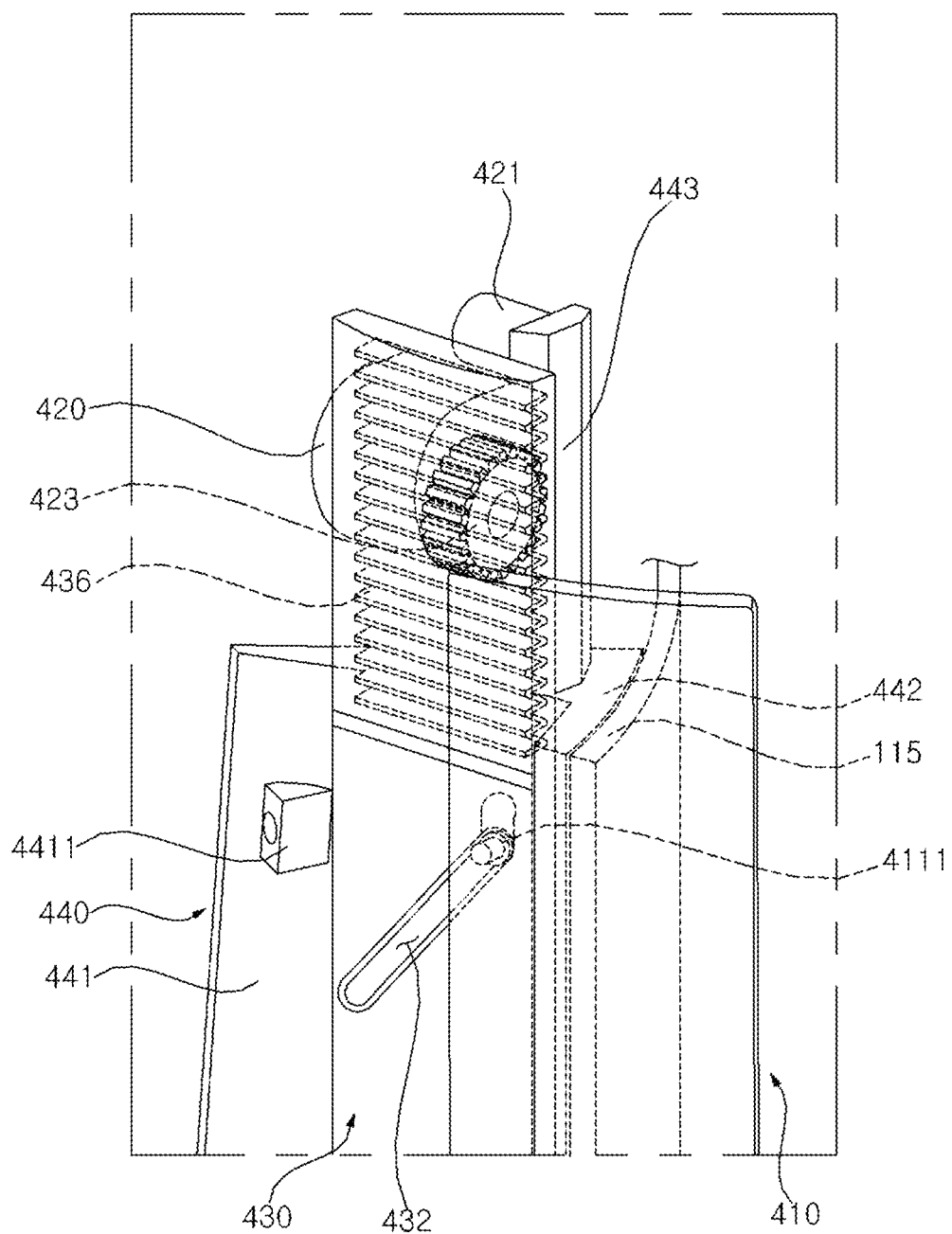
FIG. 16 is a perspective view illustrating a second position of an airflow converter or air guide.
Figure 17:
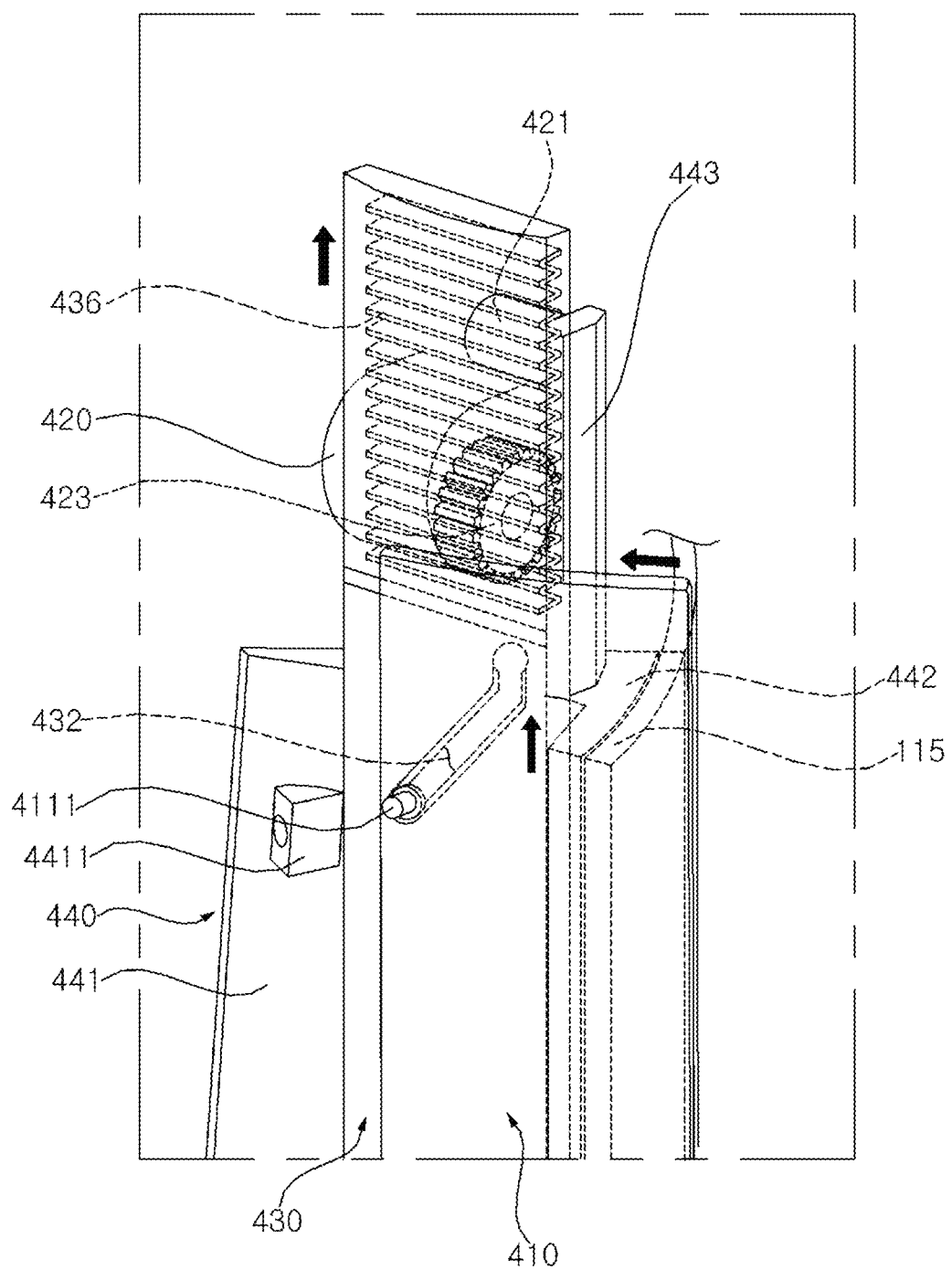
FIG. 17 is a perspective view illustrating a first position of the airflow converter.

FIG. 16 illustrates an airflow converter 400 implementing an ascending airflow by blocking the front of the blowing space 105, and FIG. 17 illustrates an airflow converter 400 implementing a front discharge airflow by opening the front of the blowing space 105. In FIGS. 1 to 6, the airflow converter 400 may be illustrated as a box, and the airflow converter 400 may be provided at an upper side of the first tower 110 or the second tower 120.

Figure 7:
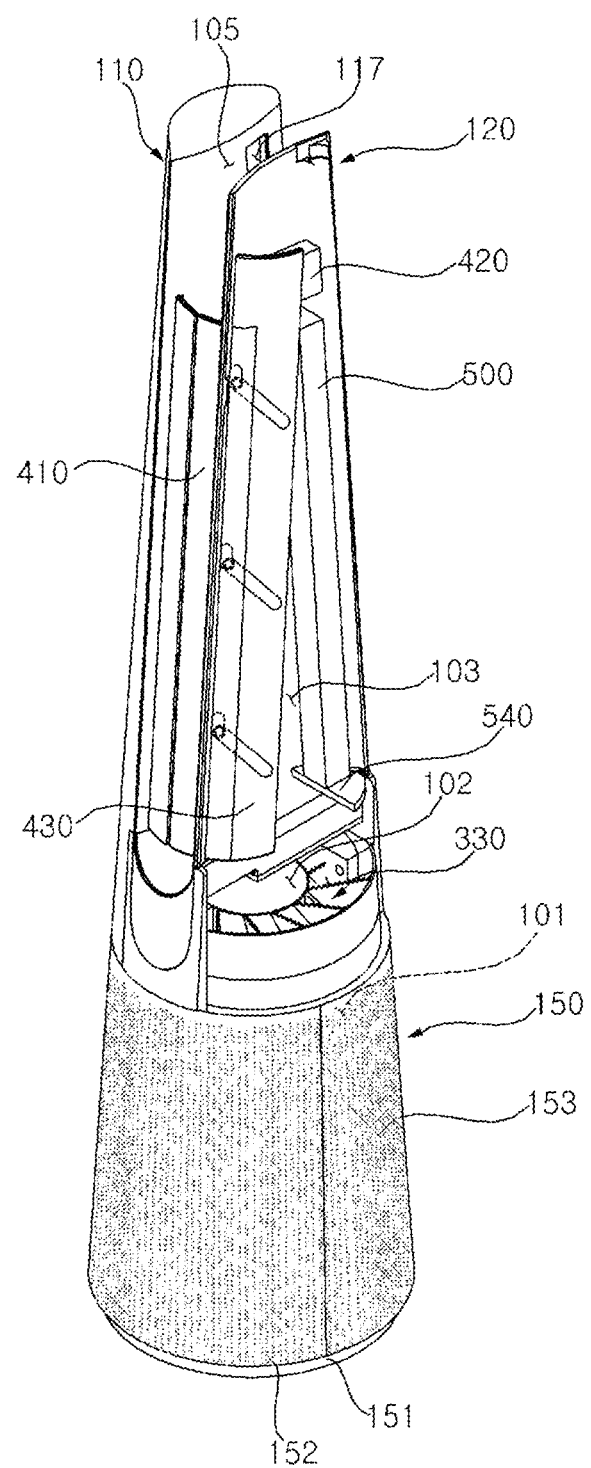
FIG. 7 is a partially exploded perspective view illustrating an inside of a second tower of FIG. 2.

Referring to FIG. 7, the airflow converter 400 may include a first airflow converter 401 provided in the first tower 110 and a second airflow converter 402 provided in the second tower 120. The first airflow converter 401 and the second airflow converter 402 may be symmetrical with respect to the left-right direction and have a same or similar configuration.

The air flow converter 400 may include a guide board or air flow gate 410 which may be provided in at least one of the first or second towers 110 and 120 and be configured to protrude to the blowing space 105. The air flow gate 410 may be a vertically oriented board or louver, and may be referred to simply as a gate. The air flow converter 400 may also include a guide motor 420 which provides a driving force for the movement of the gate 410, and a board or gate guider 430 which may be provided inside the first and/or second tower 110 and/or 120 to guide the movement of the gate 410.

The gate 410 may be a component that may be provided in at least one of the first tower 110 or the second tower 120, protrudes into the blowing space 105, and selectively changes the discharge area in front of the blowing space 105. The gate 410 may protrude into the front of the blowing space 105 through the board or gate slits 119 and 129. The gate 410 may be concealed inside the tower 110 and/or 120, and may protrude into the blowing space 105 when the guide motor 420 may be operated.

The gate 410 may include a first gate 411 provided in the first tower 110 and a second gate 412 provided in the second tower 120. The board slit 119 may penetrate the inner wall 115 of the first tower 110, and the board slit 129 may penetrate the inner wall 125 of the second tower 120. The board slit 119 formed in the first tower 110 may be referred to as a first board slit 119, and the board slit formed in the second tower 120 may be referred to as a second board slit 129.

The first board slit 119 and the second board slit 129 may be arranged symmetrically in the right-left direction. The first board slit 119 and the second board slit 129 may be extended in the vertical direction. The first board slit 119 and the second board slit 129 may be provided to be inclined with respect to the vertical direction V.

As an example, the front end 112 of the first tower 110 may be formed to have an inclination of 3 degrees, and the first board slit 119 may be formed to have an inclination of 4 degrees. The front end 122 of the second tower 120 may be formed to have an inclination of 3 degrees, and the second board slit 129 may be formed to have an inclination of 4 degrees.

The gate 410 may be formed in a flat or curved plate shape. The gate 410 may be extended in the vertical direction and may be provided in the front of the blowing space 105. The gate 410 may include a curved portion which may be convex with respect to the radial direction. The gate 410 may block the horizontal airflow flowing into the blowing space 105 and change the direction to the upward direction.

Referring to FIGS. 7 and 16-21, an inner end 411*a* of the first gate 411 and an inner end 412*a* of the second gate 412 may abut each other or may be close to each other to form an ascending airflow. Alternatively, one gate 410 may be in close contact with the opposite tower 110 or 120 to close a front of the blowing space 105 and facilitate the ascending airflow.

When the airflow converter 400 is not operated or in an open state, the inner end 411*a* of the first gate 411 may close the first board slit 119, and the inner end 412*a* of the second gate 412 may close the second board slit 129. When the airflow converter 400 may be operated or moved to a closed state, the inner end 411*a* of the first gate 411 may pass through the first board slit 119 and protrude into the blowing space 105, and the inner end 412*a* of the second gate 412 may pass through the second board slit 129 and protrude into the blowing space 105.

The first gate 411 and the second gate 412 may protrude into the blowing space 105 by a rotating operation. Alternatively, at least one of the first gate 411 and the second gate 412 may be linearly moved in a slide manner and exposed to the blowing space 105.

When viewed from a top view, each of the first gate 411 and the second gate 412 may be formed in an arc shape. Each of the first gate 411 and the second gate 412 may have a predetermined curvature radius, and a center of curvature thereof may be located in the blowing space 105. When the gate 410 is concealed inside the tower case 140, a volume inside the gate 410 in the radial direction may be larger than a volume outside the radial direction.

The gate 410 may be formed of a transparent material. A light emitting member such as a light emitting diode (LED) may be provided in the gate 410, and the entire gate 410 may emit light through light generated from the light emitting member. The gate 410 may serve as a light guide. The light emitting member may be provided in the discharge space 103 inside the tower case 140 and may be provided in the outer end of the gate 410.

The guide motor 420 may be configured to provide a driving force to the gate 410. The guide motor 420 may be provided in at least one of the first tower 110 or the second tower 120. The guide motor 420 may be provided above the gate 410.

The guide motor 420 may include a first guide motor configured to provide a rotational force to the first gate 411 and a second guide motor configured to a rotational force to the second gate 412. The first guide motor may be provided in each of an upper side and a lower side, and if necessary, may be divided into or provided as an upper first guide motor and a lower first guide motor. The second guide motor may also be provided in each of an upper side and a lower side, and if necessary, may be divided into or provided as an upper second guide motor and a lower second guide motor.

The guide motor 420 may be fastened to an air flow converter cover 440. The guide motor 420 may be coupled to a motor support plate 443 of the air flow converter cover 440. The motor support plate 443 may be provided in the upper end of the air flow converter cover 440. The motor support plate 443 may protrude upward from the upper end of the air flow converter cover 440.

The guide motor 420 may be fastened to the airflow converter cover 440 by a motor support member 421. The motor support member 421 may be formed to protrude from one side of the guide motor 420. A fastener may be laterally formed in a motor support plate 443 to support the guide motor 420, and the motor support member 421 may be fastened to the fastener. A plurality of fasteners may be formed. The motor support member 421 may protrude upward from the upper end of the guide motor 420 and may protrude downward from the lower end of the guide motor 420.

The guide motor 420 may include a shaft 422 provided horizontally. The shaft 422 of the guide motor 420 may be vertically provided from the first board slit 119 or the second board slit 129.

The guide motor 420 may include a pinion 423. The pinion 423 may be coupled to the shaft 422. When the guide motor 420 is operated, the pinion 423 may rotate. The pinion may be vertically provided. The pinion 423 may be provided horizontally with respect to the first board slit 119 or the second board slit 129.

The board guider 430 may be configured to transmit the driving force of the guide motor 420 to the gate 410. The board guider 430 may be provided in front of the guide motor 420 and provided behind the gate 410. The board guider 430 may be connected to the gate 410 and moves in a direction intersecting the protruding direction of the gate 410. The board guider 430 provided in the first tower 110 may be defined as a first board guider, and the board guider 430 provided in the second tower 120 may be defined as a second board guider.

The board guider 430 may be provided horizontally with respect to the gate 410. The board guider 430 may be provided in parallel with the first board slit 119 or the second board slit 129.

A front surface of the board guider 430 may be formed in a curved surface. The front surface of the board guider 430 may be adjacent to a rear surface of the gate 410. When the rear surface of the gate 410 may be formed in an arc shape, the front surface of the board guider 430 may be formed in a curved surface so that the gate 410 may slide along the front surface of the board guider 430.

The rear surface of the board guider 430 may be formed in a flat surface. The rear surface of the board guider 430 may be adjacent to the front surface of a first cover 441 of the airflow converter cover 440. The board guider 430 may slide along the first cover 441.

The upper end of the board guider 430 may be provided above the gate 410. When a plate shielding the guide motor 420 from the discharge spaces 103a and 103b may be formed, the upper end of the gate 410 may be provided lower than the motor support plate 443, and the upper end of the board guider 430 may be provided above the motor support plate 443.

The board guider 430 may have a first slit 432. A first protrusion 4111 of the gate 410 may be inserted into the first slit 432 and move the gate 410 when the board guider 430 moves. The board guider 430 may have a second slit 434. A second protrusion 444 of the airflow converter cover 440 may be inserted into the second slit 434, and the board guider 430 may slide along the second protrusion 444.

The board guider 430 may have a rack 436. The rack 436 may be mechanically connected to the guide motor 420 and move the board guider 430 when the guide motor 420 is operated.

A driving mechanism of the gate 410 will be described with reference to FIGS. 16 to 23. Referring to FIGS. 16-23, the pinion 423 may be coupled to the shaft 422 of the guide motor. The rack 436 may be connected to the pinion 423 and raise the gate 410 when the guide motor 420 is operated. When the guide motor 420 is operated, the pinion 423 may rotate, and the rack 436 connected to the pinion 423 may perform a translational motion.

The shaft 422 of the guide motor 420 may be provided horizontally. When the pinion 423 coupled to the shaft 422 rotates, the rack 436 connected to the pinion 423 may move upward and downward. For example, when viewed from the left side, when the first guide motor of the guide motor 420 is operated in a clockwise direction, the first board guider 430 may move downward. When the first guide motor of the guide motor 420 is operated in a counterclockwise direction, the first board guider 430 may move upward. When viewed from the right side, when the second guide motor of the guide motor 420 is operated counterclockwise, the second board guider 430 may move downward. When the second guide motor of the guide motor 420 is operated in a clockwise direction, the second board guider 430 may move upward.

The rack 436 may be provided above the first slit 432. The board guider 430 may be provided in front of the guide motor 420, and the rack 436 may be formed on the rear surface of the board guider 430. The board guider 430 may penetrate a plate separating the guide motor 420 from the discharge spaces 103a and b and further protrude upward. The pinion 423 may mesh with the rack 436 formed on the rear side of the board guider 430.

The board guider 430 may move in a first direction that intersects with the air discharge direction when the guide motor 420 is operated. The gate 410 may protrudes in a second direction that intersects with both the air discharge direction and the movement direction of the board guider 430 when the board guider 430 moves.

The air discharged from the first discharge port 117 or the second discharge port may flow forward. The board guider 430 may move upward or downward to intersect with this horizontal or forward air discharge direction. When the board guider 430 may be provided parallel to the first board slit 119 or the second board slit 129, the board guider 430 may move upward or downward along a length direction of the first board slit 119.

When the board guider 430 moves, the gate 410 may move laterally so as to intersect with both the air discharge direction and the moving direction of the board guider 430 and protrudes to the outside of the tower case 140 through the first board slit 119 or the second board slit 129. When the gate 410 is provided parallel to the first board slit 119 or the second board slit 129, the gate 410 may traverse vertically with respect to the length direction of the second board slit 129. When the gate 410 protrudes to the outside of the tower case 140, the gate 410 may protrude while moving upward, and when the gate 410 is introduced into the tower case 140, the gate 410 may be introduced while moving downward.

The first tower 110, the second tower 120, and the blowing space 105 may be entirely formed in a truncated cone shape. The gate 410 may move in a circumferential direction of the truncated cone shape provided by the first tower 110, the second tower 120, and the blowing space 105. The outer wall 114 of the first tower 110 and the outer wall 124 of the second tower 120 may be formed in a truncated cone shape. The first gate 411 may move in a circumferential direction along the inner surface of the outer wall 114 of the first tower 110, and the second gate 412 may move in a circumferential direction along the inner surface of the outer wall 124 of the second tower 120.

The gate 410 may be provided parallel to the board slit 119 and 129 and perpendicular to the ground. When the gate 410 is provided parallel to the board slit 119 and 129, the gate 410 may protrude while moving upward from the ground when protruding. The gate 410 may protrude while moving downward from the ground when being introduced. When the board slit 119 and 129 may be formed with an inclination of 4 degrees from the ground, the gate 410 may be also provided to have an inclination of 4 degrees from the ground.

The board guider 430 may be provided parallel to the board slit 119 or 129 and perpendicular to the ground. When the gate 410 is parallel to the board slit 119 or 129, the gate 410 may prevent a gap from occurring when the gate 410 protrudes, so that the gate 410 and the board slit 119 and 129 may be more closely connected. When the board slits 119 and 129 are formed with an inclination of 4 degrees from the ground, the board guider 430 may be also provided to have an inclination of 4 degrees from the ground.

The gate 410 may include a curved surface that may be convex in the radial direction. The gate 410 may be formed in an arc shape such that a center of curvature may be provided inside. The outer wall 114 of the first tower 110 or the inner surface of the inner wall 125 of the second tower 120 may include a curved surface. The gate 410 may form a curved surface that may be convex in the radial direction to correspond to the curved surface of the outer wall 114 or the inner wall 125. The front surface of the board guider 430 may form a curved surface to correspond to a curved surface of the rear surface of the gate 410.

Figure 24:
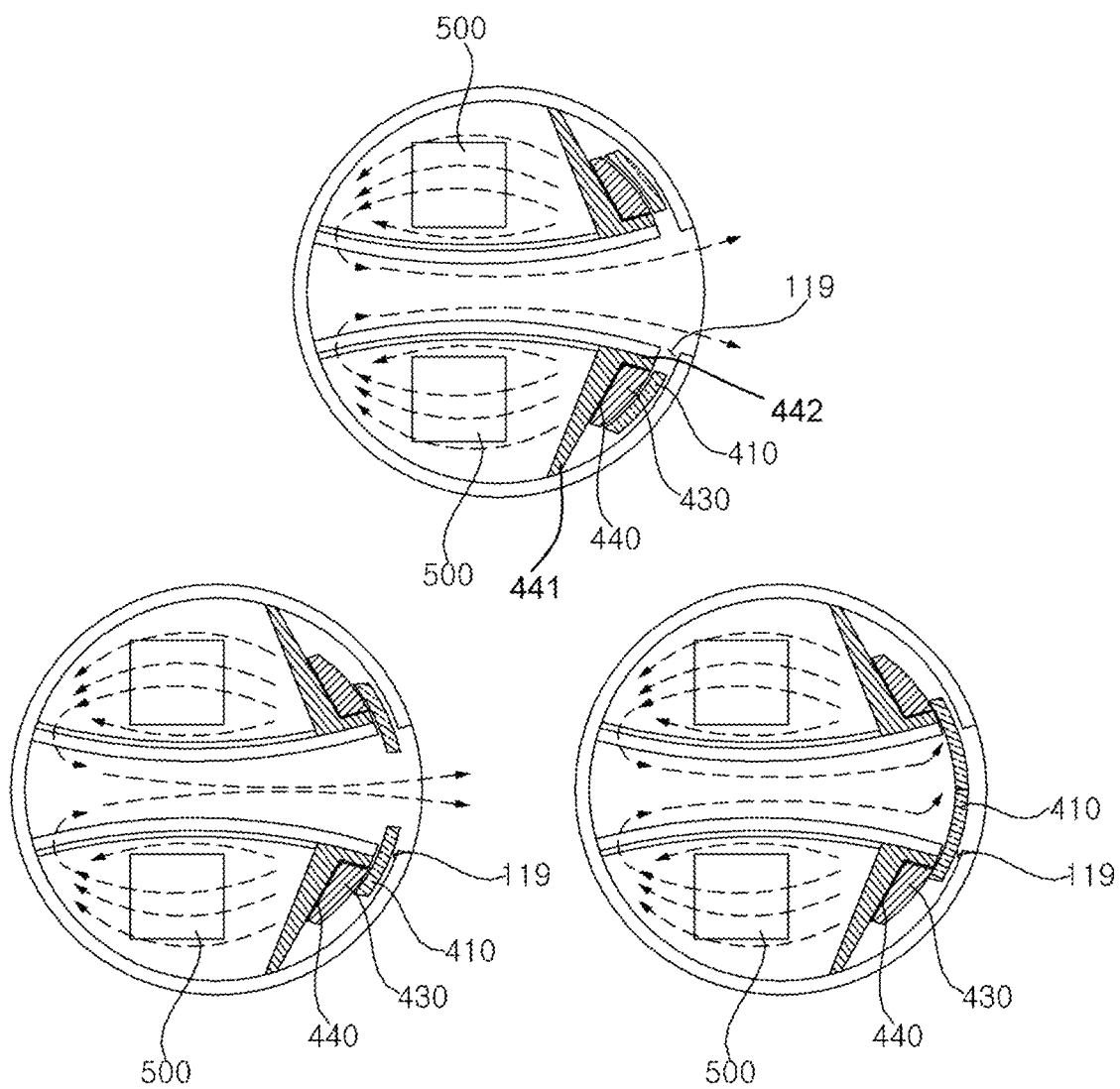
FIG. 24 is a plan cross-sectional view schematically illustrating a flow direction of air according to a position of the guide board.

The curved front surface of the board guider 430 may be formed to be symmetrical in the left-right direction as shown in FIG. 16. As shown in FIG. 24, one side of the board guider 420 may form a curved surface which is thicker than the other side. An inside of the front end of the board guider 430, a front end of a second cover 442 of the air flow converter cover 440, and a rear end of the first slit 432 may be provided along a same extension line. The inside of the front end of the board guider 430, the front end of the second cover 442, and the rear end of the first slit 432 may come in contact with the rear surface of the gate 410 at a same time. The protruding gate 410 may be stably guided.

The first slit 432 may be formed to penetrate through one side of the board guider 430 and guide the movement of the gate 410. The first protrusion 4111 may be formed to protrude from one side of the gate 410, and at least a part of the first protrusion 4111 may be inserted into the first slit 432 and slide along the first slit 432.

The first slit 432 may be formed in the board guider 430. The left end of the first slit 432 may be provided close to the left end of the board guider 430, and the right end of the first slit 432 may be provided in the right end of the board guider 430.

The lower end of the first slit 432 may be provided at an inner side, or alternatively an outer side, of an upper end of the first slit 432. For example, referring to FIG. 16, the lower end of the first slit 432 formed in the first board guider 430 may be provided at a left side of the upper end of the first slit 432. Similarly, although not shown, the lower end of the second slit 434 formed in the second board guider 430 may be provided at a right side of the upper end of the second slit 434.

The first slit 432 may include an inclined portion 4321 in which one end of the gate 410 in the protruding direction may be formed higher than the other end. The inclined portion 4321 may include an inclined surface that may be inclined inwardly upward. For example, referring to FIG. 16, the lower end of the first slit 432 formed in the first board guider 430 may be provided at a left side of the board guider 430 to correspond to the other end of the gate 410 in the protruding direction. The upper end of the first slit 432 formed in the first board guider 430 may be provided at a right side of the board guider 430 to correspond to one end of the gate 410 in the protruding direction.

Similarly, although not shown, the lower end of the first slit 432 formed in the second board guider 430 may be provided at the right side of the board guider 430 to correspond to the other end of the gate 410 in the protruding direction. The upper end of the first slit 432 formed in the second board guider 430 may be provided at the left side of the board guider 430 to correspond to one end of the gate 410 in the protruding direction.

A vertical position of the inclined portion 4321 may change as the board guider 430 moves upward and downward. When the board guider 430 moves upward, the first protrusion 4111 may protrude from a lower end of the inclined portion 4321. When the board guider 430 moves downward, the first protrusion 4111 may protrude from the upper end of the inclined portion 4321.

Figure 21:
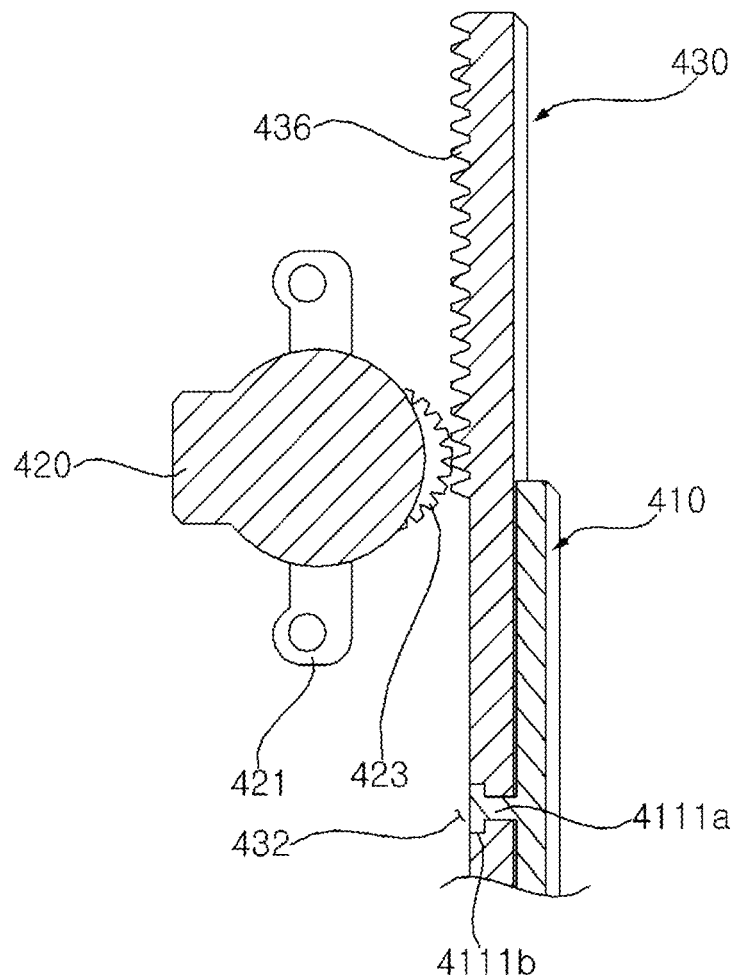
FIG. 21 is a side cross-sectional view of the airflow converter.

Referring to FIGS. 16 and 21, the inclined portion 4321 may form a projection. The inclined portion 4321 may have a front width smaller than a rear width. The first protrusion 4111 may form a locking projection 4111*b* so as to correspond to the projection of the inclined portion 4321. The locking projection 4111*b* of the first protrusion 4111 may be provided in the rear end of the inclined portion 4321. The first protrusion 4111 may be not separated from the inclined portion 4321 of the first slit.

The first slit 432 may include a vertical portion 4322 which has a lower end provided at the upper end of the inclined portion 4321 and extends vertically upward. A bent portion may be formed between the lower end of the vertical portion 4322 of the first slit and the upper end of the inclined portion 4321.

The vertical portion 4322 may serve as a stopper. The first protrusion 4111 may have a maximum upward movement distance that ranges up to the upper end of the inclined portion 4321 and does not slide along the vertical portion 4322.

Referring to FIGS. 16 and 21, the vertical portion 4322 may form a projection. The vertical portion 4322 may have a front width smaller than a rear width. The first protrusion 4111 may form the locking projection 4111*b* to correspond to the projection of the vertical portion 4322. The locking projection 4111*b* of the first protrusion 4111 may be provided in the rear end of the vertical portion 4322. The first protrusion 4111 may be not separated from the inclined portion 4321 of the first slit. The first protrusion 4111 may also have an initial protrusion or stem 4111*a* connected to the locking projection 4111*b*.

The first slit 431 may include a first protrusion insertion part or end 4323 which may be provided in the upper end of the vertical portion 4322 and in which the first protrusion 4111 is inserted into the first slit 432. The first protrusion insertion part 4323 may be formed in a shape corresponding to the cross-sectional shape of the first protrusion 4111.

A diameter of the first protrusion insertion part 4323 may be formed larger than a diameter of the locking projection 4111b of the first protrusion. The first protrusion 4111 may be inserted into the first protrusion insertion part 4323. The first protrusion 4111 may move downward along the vertical portion 4322 so that the gate 410 may be fastened to the board guider 430. The first protrusion 4111 may slide down or slide upward along the inclined portion 4321 and the gate 410 may move.

Figure 18:
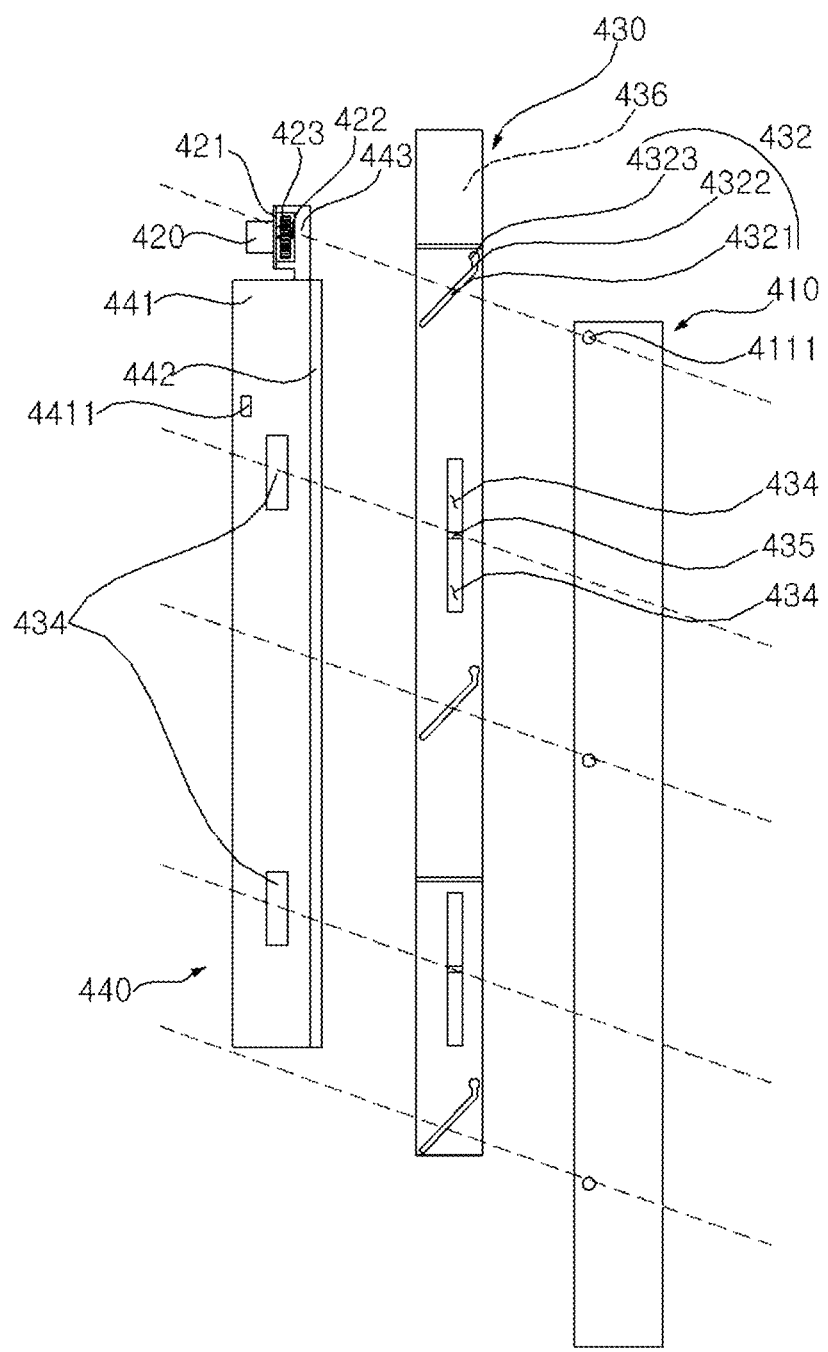
FIG. 18 is an exploded perspective view of the airflow converter.

Referring to FIG. 18, a plurality of slits (e.g., three) may be formed in the board guider 430. A second slit 434 may be formed between two first slits 432. The number of the first slits 432 may be not limited to the number shown in FIG. 18, and may be changed within a range that can be easily adopted by a person skilled in the art.

The first protrusion 4111 may be formed in the left side of the gate 410. However, the present disclosure may be not limited to such an arrangement, and a position of the first protrusion 4111 may be changed within a range that can be easily adopted by a person skilled in the art.

Referring to FIG. 21, the locking projection 4111b of the first protrusion may be formed to protrude radially outward from the end of the first protrusion 4111. The locking projection 4111b may be caught by the projection (or difference in front and rear width) of the inclined portion 4321 or the vertical portion 4322 and may be not separated.

When the board guider 430 and the first slit 432 move upward or downward, the first protrusion 4111 and the gate 410 may be introduced or protrude. When the board guider 430 moves upward, the first protrusion 4111 may be located in the lower end of the inclined portion 4321. When the first protrusion 4111 is located in the lower end of the inclined portion 4321, the gate 410 may move in a circumferential direction and may be introduced into the tower case 140 through the first board slit 119. When the board guider 430 moves downward, the first protrusion 4111 may be located in the upper end of the inclined portion 4321. When the first protrusion 4111 is located in the upper end of the inclined portion 4321, the gate 410 may move in the circumferential direction and protrude to the outside of the tower case 140 through the first board slit 119.

The board guider 430 may include a second slit 434 formed to penetrate through one side. The airflow converter cover 440 may include the second protrusion 444, which may be formed to protrude from one side and may be at least partially inserted into the second slit 434.

The second slit 434 may be formed in the board guider 430. The second slit 434 may extend in the length direction of the first tower 110 or the second tower 120. The second slit 434 may extend in the vertical direction.

Referring to FIG. 18, the second slit 434 may be provided between one first slit 432 and another first slit 432. The second slit 434 and the first slit 432 may be provided to intersect with each other to disperse a force and reduce or counteract a bending stress of the board guider 430.

The board guider 430 may slide along the second protrusion 444. The inner surface of the second slit 434 and the outer surface of the second protrusion 444 may be in contact with each other, and when the board guider 430 moves upward or downward, the board guider 430 may slide along the outer surface of the second protrusion 444.

Figure 23:
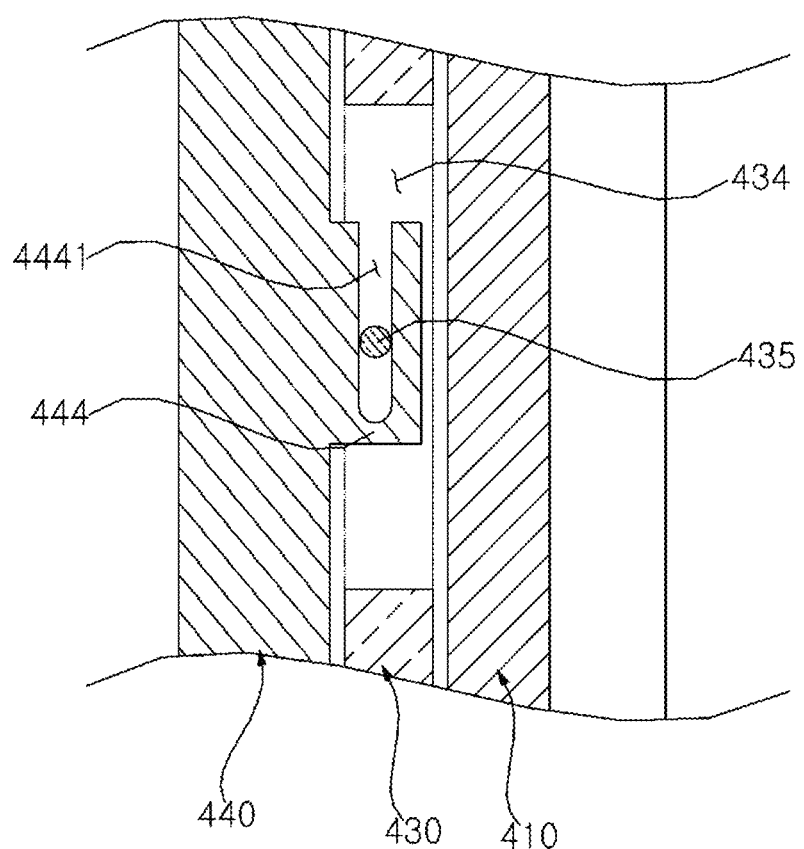
FIG. 23 is a cross-sectional view illustrating the airflow converter in a state where a second protrusion is inserted into a second slit.

Referring to FIGS. 18 and 23, a second slit bar 435 may be formed in the second slit 434. The second slit bar 435 may be provided between the inner side surfaces of the second slit 434. The second slit bar 435 may extend to one sidewall and the other sidewall of the second slit 434. The second slit bar 435 may be formed to extend horizontally from the middle of the second slit 434. The second slit bar 435 may be inserted into a second protrusion groove 4441. The second slit bar 435 may slide along the second protrusion groove 4441, and the inner surface of the second slit 434 may slide along the outer surface of the second protrusion 444 so that the board guider 430 may move upward and downward more stably by the second protrusion 444.

The second protrusion 444 may be formed on the front surface of the first cover 441 and be formed to protrude from the front surface of the first cover 441. A side surface of the second protrusion 444 may extend in the length direction of the first tower 110 or the second tower 120. Referring to FIG. 18, the second protrusion 444 may extend in the vertical direction.

Referring to FIG. 23, the second protrusion 444 may be inserted into the second slit 434. A vertical length of the second protrusion 444 may be shorter than a distance between the second slit bar 435 and the lower end of the second slit 434. A protrusion length of the second protrusion 444 may be shorter than a width of the second slit 434. A front end of the second protrusion 444 may be provided behind the front end of the board guider 430.

Figure 22:
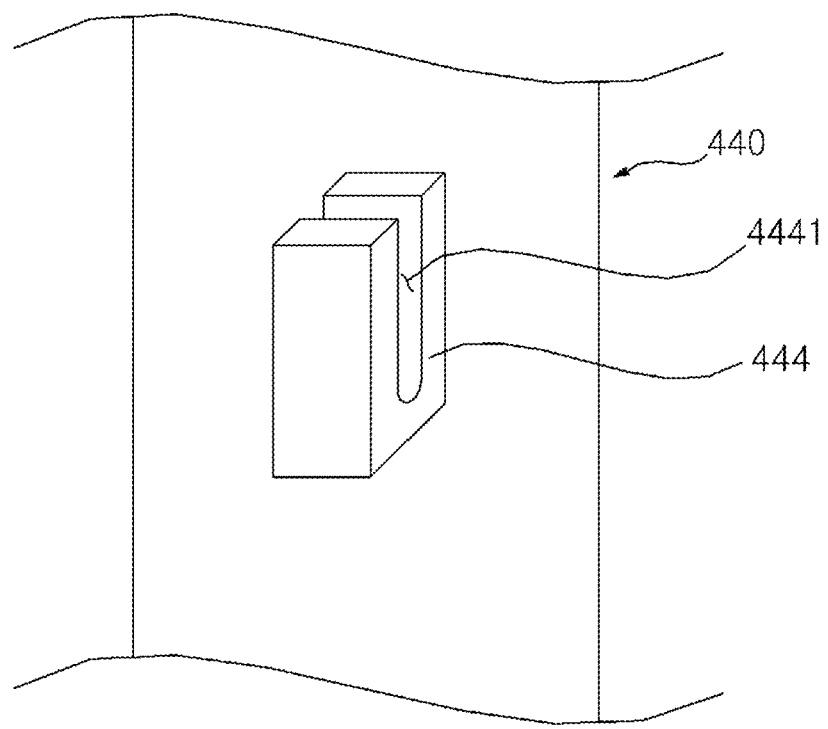
FIG. 22 is an enlarged view illustrating a second protrusion in the airflow converter.

Referring to FIG. 22, the second protrusion groove 4441 may be recessed so that at least a part of the outer circumferential surface of the second slit bar 435 may be inserted. The second protrusion groove 4441 may have an upper opening and may be recessed downward. The second protrusion groove 4441 may be formed in a U-shape. The second protrusion groove 4441 may have an open upper portion and be open at both sides. A recessed depth of the second protrusion groove 4441 may be shorter than a distance between the second slit bar 435 and the upper end of the second slit 434. The second slit bar 435 may move downward to the lower end of the second protrusion groove 4441, which may be a maximum or lowermost position to which the board guider 430 moves downward. The second protrusion groove 4441 may serve as a stopper.

Referring to FIG. 16, the airflow converter cover 440 may be provided behind the board guider 430. The airflow converter cover 440 may include the first cover 441, the second cover 442, and the motor support plate 443. Hereinafter, the airflow converter cover 440 provided in the first tower 110 will be described with reference to FIG. 16, and a same description may be applied to the airflow converter 400 provided in the second tower 120.

The first cover 441 may support the rear surface of the board guider 430 and guide the sliding of the board guider 430. A left or outer end of the first cover 441 may be provided in the outer wall of the first tower 110. The right or inner end of the first cover 441 may be provided in the inner wall of the first tower 110.

Referring to FIG. 24, the thickness of the outer end of the first cover 441 may be formed to be narrower than the thickness of the inner end of the first cover 441. The outer end of the first cover 441 may be provided behind the inner end of the first cover 441.

The second cover 442 may support one side of the board guider 430 and guide the sliding of the board guider 430. The second cover 442 may be provided inside the front surface of the first cover 441. The second cover 442 may be formed to protrude forward from the inner end of the first cover 441. The second cover 442 may extend along the first outer wall 114 of the first tower 110 or the inner surface of the second inner wall 125 of the second tower 120.

Figure 20:
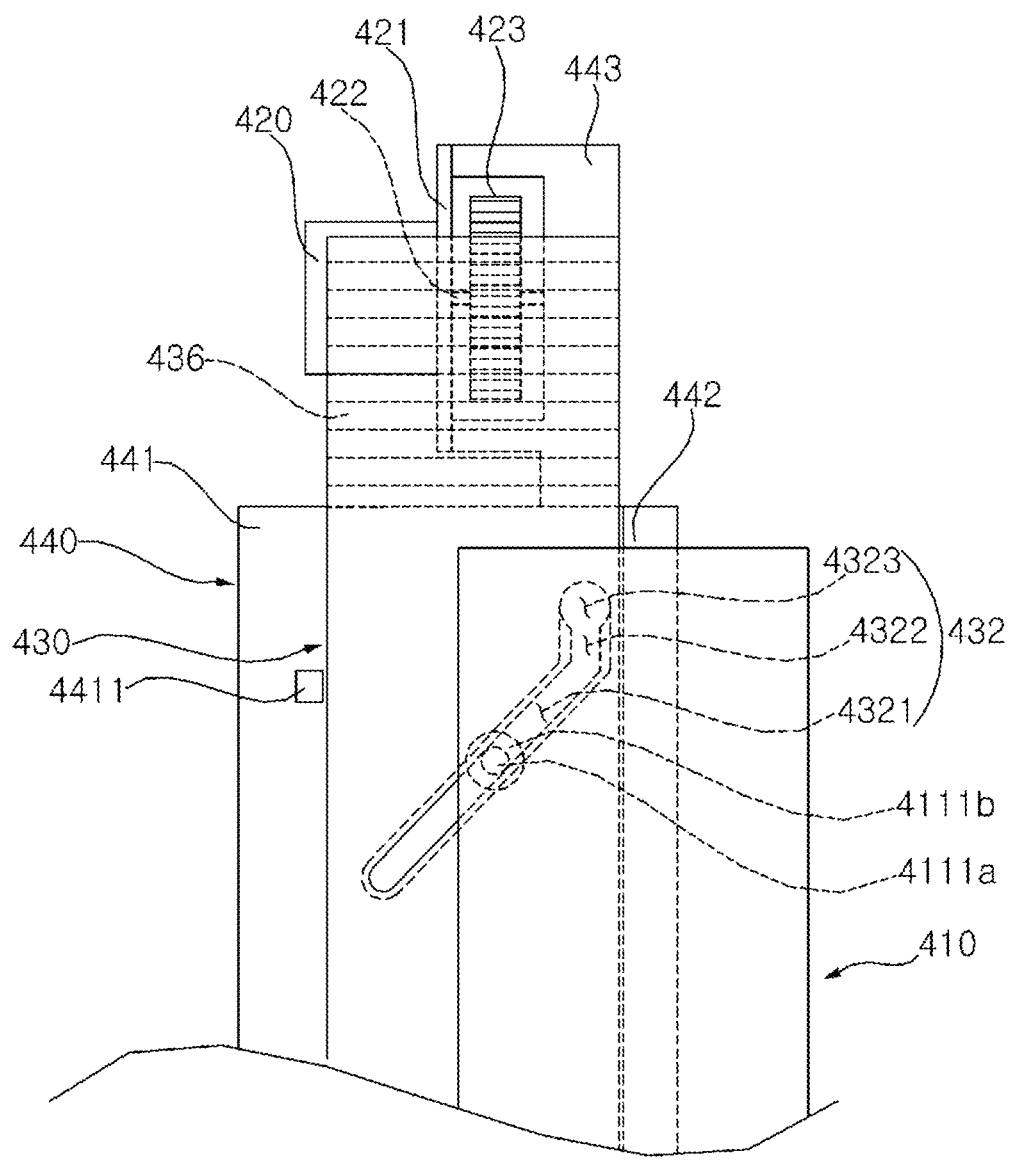
FIG. 20 is a front view illustrating a state where the guide board is installed in FIG. 19.

Referring to FIGS. 18, 20, and 24, the front end of the second cover 442 may coincide with the rear end of the first board slit 119 or the second board slit 129. The rear surface of the gate 410 may be in contact with the front end of the second cover 442 and the rear ends of the first and second board slits 119 and 129. The second cover 442 may guide the gate 410 together with the board slits 119 and 129.

The inner end of the second cover 442 may be in contact with the inner surface of the first inner wall 115 or the inner surface of the second inner wall 125. The outer end of the second cover 442 may be in contact with the inner surface of the board guider 430. The board guider 430 may slide along the outer surface of the second cover 442. A third protrusion 4411 may be in contact with the outer surface of the board guider 430 opposite to the outer end of the second cover 442.

The motor support plate 443 may be provided in the upper end of the first cover 441. One or a first surface of the motor support plate 443 may support the guide motor 420, and the other or a second surface may support the board guider 430. The motor support plate 443 may be formed to protrude upward from the upper end of the first cover 441. The motor support plate 443 may be provided outside the second cover 442. An upper end of the motor support plate 443 may be provided above the pinion 423.

The first surface of the motor support plate 443 supporting the guide motor 420 may be formed such that a coupling portion to which the guide motor 420 is coupled may be protruded. The motor support member 421 of the guide motor 420 may be coupled to the coupling portion.

The second surface of the motor support plate 443 supporting the board guider 430 may be provided along a same line as the front surface of the first cover 441. The rear surface of the board guider 430 may be in contact with the front surface of the first cover 441 and the second surface of the motor support plate 443 at the same time. The upper portion of the board guider 430 may be supported by the second surface of the motor support plate 443 and mesh with the pinion 423.

A third protrusion 4411 may be formed on the first cover 441. The third protrusion 4411 may be provided outside the first cover 441. A side surface of the third protrusion 4411 and the outside of the board guider 430 may face each other. The board guider 430 may slide along the third protrusion 4411. A coupling hole to fasten to the first outer wall 114 or the second outer wall 124 may be formed on the front surface of the third protrusion 4411.

The rear surface of the board guider 430 may be supported by the first cover 441 and the motor support plate 443. A first side surface of the board guider 430 may be supported by the second cover 442. A second side surface of the board guider 430 may be supported by the third protrusion 4411 formed in the first cover 441. Since the board guider 430 may be supported by three surfaces, the board guider 430 may move upward and downward stably.

The airflow converter 400 may be provided in front of the first discharge port 117 or the second discharge port based on the air discharge direction. Air may be discharged forward from the first discharge port 117 or the second discharge port. As air passes through the first inner wall 115 or the second inner wall 125, the Coanda effect occurs. The airflow converter 400 may be provided in the first inner wall 115 or the second inner wall 125 to selectively change the direction of air flow. The airflow converter 400 may generate wide-area wind or air flow, concentrated wind or air flow, or ascending wind or airflow according to a degree of protrusion.

A driving method of the airflow converter 400 will be described as follows. Referring to FIGS. 16 and 17, when the guide motor 420 is operated, the pinion 423 may rotate, the rack 436 meshing with the pinion 423 may move, and the board guider 430 may move upward and downward. Referring to FIG. 21, when the guide motor 420 is operated in a clockwise direction, the board guider 430 may move downward, and when the guide motor 420 is operated in a counterclockwise direction, the board guider 430 may move upward.

FIGS. 16 and 20 illustrate that the gate 410 protrudes. In FIG. 21, when the guide motor 420 is operated in a clockwise direction, the board guider 430 may move downward. When the board guider 430 moves downward, the positions of the first slit 432 and the second slit 434 may be also lowered. The second slit 434 may slide down along the second protrusion 444, and the second slit bar 435 may slide down along the second protrusion groove 4441. As the position of the first slit 432 may be lowered, the first protrusion 4111 may gradually move to the right, and the gate 410 may pass through the board slit and protrudes into the blowing space 105.

Figure 19:
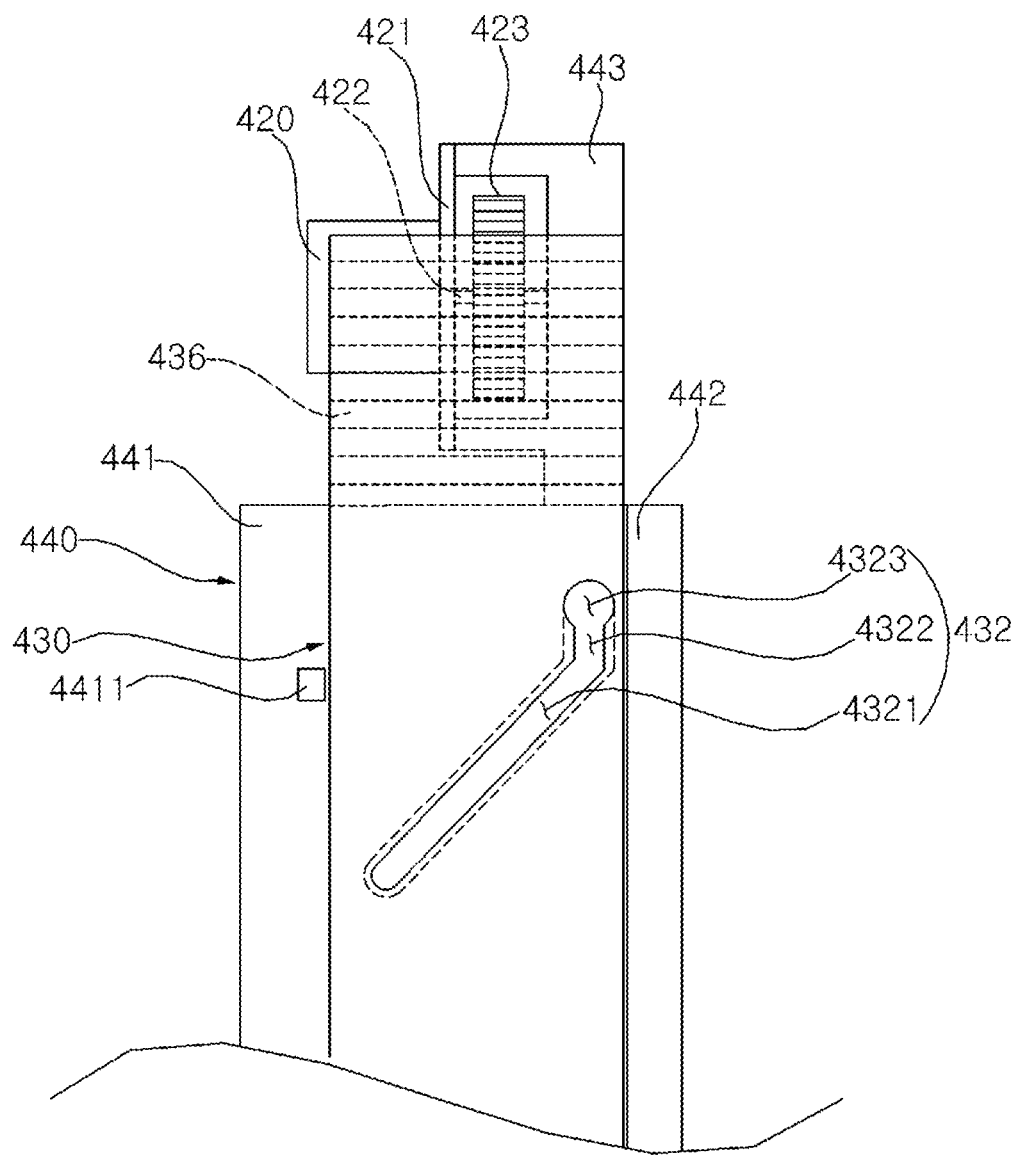
FIG. 19 is a front view illustrating a state where a guide board or gate is removed from the airflow converter.

FIGS. 17 and 19 illustrate that the gate 410 may be introduced. In FIG. 21, when the guide motor 420 may be operated counterclockwise, the board guider 430 may move upward. When the board guider 430 moves upward, the positions of the first slit 432 and the second slit 434 may be also raised. The second slit 434 may slide to move upward along the second protrusion 444, and the second slit bar 435 may slide to move upward along the groove 4441 of the second protrusion. As the position of the first slit 432 is raised, the first protrusion 4111 may gradually move to the left, and the gate 410 may be introduced into the inside the tower case 140 through the board slit.

Hereinafter, a heater 500 installed in the air conditioner will be described.

The heater 500 may be provided in the first discharge space 103a or the second discharge space 103b to heat flowing air. The heater 500 may heat the flowing air and discharges the heated air to an outside of the fan apparatus for air conditioner.

Referring to FIGS. 1 and 2, the heater 500 may be provided in the first tower 110 or the second tower 120 of the air conditioner 1.

The heater 500 may be extended in the vertical direction. The heater 500 may be provided in a length direction of the first tower 110 or the second tower 120. The heater 500 may be provided below the airflow converter 400.

Referring to FIG. 3, the heater 500 may include a first heater 501 provided in the first tower 110 and a second heater 502 provided in the second tower 120. The first tower 110 and the second tower 120 may be formed symmetrically with respect to a central axis, and the first tower 110 and the second tower 120 may be provided symmetrically with respect to the central axis.

An upper end of the heater 500 may be provided below an upper end of the gate 410. A lower end of the heater 500 may be provided above a lower end of the gate 410.

Referring to FIG. 4, when viewed from the top, upper ends of the first and second heaters 501 and 502 may be provided at centers of the first and second towers 110 and 120, respectively, in the front-rear direction. Referring to FIG. 5, the upper end of the heater 500 (e.g., first heater 501 and/or second heater 502) may be provided in front of a lower end of the heater 500. The heater 500 may be inclined so that the lower end may be provided behind the upper end.

The heater 500 may be provided inside the tower case 140 and may be provided upstream, with respect to the air flow direction, of the first discharge port 117 or the second discharge port 127. As shown in FIG. 5, the heater 500 may be provided in front of the first discharge port 117 or the second discharge port.

The heater 500 may include a heating tube 520 that emits heat and a fin 530 that transfers heat from the heating tube 520. The heating tube 520 may be configured to receive energy and convert the received energy into thermal energy to generate heat. The heating tube 520 may be connected to an electric device to receive electrical energy and may be configured of a resistor to convert electrical energy into thermal energy. Alternatively, the heating tube 520 may be formed as a pipe through which refrigerant flows and heat the air by exchanging heat between the refrigerant flowing inside the heating tube 520 and the air flowing outside the heating tube 520. The heating tube 520 may include any type of heating element having a configuration that can be easily changed based on a person skilled in the art.

The heating tube 520 may be formed to have an inclination. An upper end of the heating tube 520 may be provided in front of the lower end. The heating tube 520 may be formed in a U-shape. The fin 530 may be connected to the heating tube 520 and transfer heat from the heating tube 520. Since the fin 530 may have a relatively large surface area, the heat transferred from the heating tube 520 may be effectively transferred to the flowing air.

The fin 530 may change the air flow direction and guide air to the first discharge port 117 or the second discharge port. Referring to FIG. 5, the suction port 155 may be provided at a lower side, and the first discharge port 117 and the second discharge port 127 may be provided at an upper side. Inside the first tower 110 and the second tower 120, air may form a flow or stream that rises upward. The fin 530 may convert the rising flow into a flow moving from a front to a rear toward the first and second discharge ports 117 and 127.

The heater 500 may include a support member 510. The support member 510 may support the heating tube 520 and the heater 500. The support member 510 may include an upper horizontal plate 511, a vertical plate 512, and a lower horizontal plate 513. The vertical plate 512 may extend vertically.

A plurality of fins 530 may be fixed to the vertical plate 512. The plurality of fins 530 may extend in a direction intersecting the vertical direction (e.g., in the front-rear and/or left-right direction).

The heating tube 520 may be provided to extend along an extension direction of the vertical plate 512. The heating tube 520 may be provided parallel to the vertical plate 512. Alternatively or in addition thereto, the heating tube 520 may come in contact with the vertical plate 512.

The vertical plate 512 may be formed to have an inclination. An upper end of the vertical plate 512 may be provided in front of a lower end of the vertical plate 512.

The upper horizontal plate 511 may be provided at the upper end of the vertical plate 512. A plate shielding the guide motor 420 may be formed above the first tower 110 and the second tower 120, and the upper horizontal plate 511 may be fixed to the plate to support the heater 500. The upper horizontal plate 511 may be provided parallel to the ground like a plate, and the plate shielding the guide motor 420 may be horizontal to the ground. Referring to FIG. 5, when viewed from the side, the upper horizontal plate 511 may be not perpendicular to the vertical plate 512 and be slightly inclined. Referring to FIG. 6, when viewed from the front or rear, the upper horizontal plate 511 may appear to be perpendicular to the vertical plate 512.

The lower horizontal plate 513 may be provided at the lower end of the vertical plate 512. A vertical plate 512 may be connected to an upper surface of the lower horizontal plate 513, and a flow path shielding member 540 may be provided on the lower surface of the lower horizontal plate 513. Unlike the upper horizontal plate 511, the lower horizontal plate 513 may be perpendicular to the vertical plate 512. Referring to FIG. 5, when viewed from the side, the lower horizontal plate 513 may be perpendicular to the vertical plate 512 and may be provided not to be horizontal with respect to the ground. Referring to FIG. 6, the lower horizontal plate 513 may be perpendicular to the vertical plate 512 even when viewed from the front.

Referring to FIG. 5, the plurality of fins 530 may be provided along the length direction of the first discharge port 117 or the second discharge port so that air may be evenly discharged to the first discharge port 117 and the second discharge port 127. The fin 530 may extend in a direction intersecting the length direction of the first discharge port 117 or the second discharge port 127.

The first discharge port 117 and the second discharge port 127 may extend from an upper center to a lower right. The plurality of fins 530 may extend from the center to the upper right. The length directions of the first discharge port 117 and the second discharge port 127 and the extension direction of the plurality of fins 530 may intersect with each other. The fins 530 may extend perpendicular to the length direction of the first discharge port 117 or the second discharge port 127. The flow direction of the air may be changed toward the first discharge port 117 and the second discharge port 127 according to a guide of the fin 530, and the air may be distributed and flow with an equal amount to the first discharge port 117 and the second discharge port 127.

The heating tube 520 may extend along the length directions of the first discharge port 117 and/or the second discharge port 127, and the fins 530 may extend vertically in the extension direction of the heating tube 520. The heating tube 520 may be provided in an upper portion of the heater 500. The heating tube 520 may extend downward from the upper portion of the heater 500. The heating tube 520 may be provided in parallel with and spaced apart from the vertical plate 512 and/or may extend while being in contact with the vertical plate 512. The heating tube 520 may extend along the length direction of the first discharge port 117 and the second discharge port 127.

The fins 530 may extend perpendicular to the extension direction of the heating tube 520. For example, when the heating tube 520 forms an angle of about 4 degrees with respect to the vertical axis V, each fin among the plurality of fins 530 may form an angle of about 4 degrees with respect to the ground.

When viewed from the side, the heating tube 520 may be provided to be inclined with a prescribed inclination with respect to the vertical axis. The vertical plate 512 may be also provided to be inclined with the prescribed inclination with respect to the vertical axis. The heating tube 520 and the vertical plate 512 may be provided in parallel. The upper horizontal plate 511 may be provided parallel to a horizontal plane. The lower horizontal plate 513 may be provided to be inclined with a prescribed inclination with respect to the horizontal plane. The fins 530 may be provided to be inclined with a prescribed inclination with respect to the horizontal plane and provided parallel to a lower horizontal plane.

The heater 500 may be provided to be inclined with respect to the vertical direction and parallel to the first discharge port 117 or the second discharge port 127. The heater 500 may be provided to be inclined to have an inclination angle of a3 with respect to the vertical direction. For example, the heater 500 may be provided to be inclined within a certain error range based on an angle of 4 degrees with respect to the vertical direction.

The second discharge port 127 may be provided to be inclined to have an inclination of a1 with respect to the vertical direction. For example, the second discharge port may be provided to be inclined within a certain error range based on an angle of 4 degrees with respect to the vertical direction. Although not shown in FIG. 5, the first discharge port 117 may also be provided to be inclined to have an inclination of a1 with respect to the vertical direction. The inclination a3 of the heater 500 with respect to the ground and the vertical axis V may correspond or be set in consideration of the inclinations of the vertical plate 512, the heating tube 520, the upper horizontal plate 511, the fin 530, and the lower horizontal plate 513.

The heater 500 may be provided parallel to the first discharge port 117 or the second discharge port 127 with respect to the vertical direction. The inclination a3 of the heater 500 in the vertical direction and the inclination a1 of the first discharge port 117 and second discharge port 127 in the vertical direction may be the same. An equal amount of air guided by the fins 530 may flow to the first discharge port 117 or the second discharge port 127.

Referring to FIGS. 14 and 15, the first and second heaters 501 and 502 may be provided to be spaced apart from inner surfaces of the first and second inner walls 115 and 125, respectively. A space through which air may flow may be formed between the first and second heaters 501 and 502 and the first and second inner walls 115 and 125, and air flowing through the space may form a wall or stream of air. Heat emitted from the first and second heaters 501 and 502 may not convectively flow to the first and second inner walls 115 and 125, and the first and second inner walls 115 and 125 may be prevented from being overheated.

The first and second heaters 501 and 502 may be provided to be spaced apart from the inner surfaces of the first and second outer walls 114 and wall 124. Similarly, a space through which air may flow may be formed between the first and second heaters 501 and 502 and the first and second outer walls 114 and 124, and air flowing in the space may form a wall or stream of air. Heat emitted from the first and second heaters 501 and 502 may not convectively flow to the first and second outer walls 114 and 124, and the first and second outer walls 114 and 124 may be prevented from being overheated.

The first heater 501 may be provided closer to the first inner wall 115 than to the first outer wall 114, and the second heater 502 may be provided closer to the second inner wall 125 than to the second outer wall 124. The air discharged from the first discharge port 117 may flow at a high speed along the first inner wall 115, and the air discharged from the second discharge port 127 may flow at a high speed along the second inner wall 125. Since air may flow at a high speed along the first inner wall 115 and the second inner wall 125, forced convection may occur, thereby cooling the first inner wall 115 and the second inner wall 125 more quickly. However, air may flow along the first outer wall 114 and the second outer wall 124 at a slower speed due to an indirect Coanda effect. A cooling rate of the first outer wall 114 may be slower than that of the first inner wall 115, and a cooling rate of the second outer wall 124 may be slower than that of the second inner wall 125. By providing the first and second heaters 501 and 502 closer to the first and second inner walls 115 and 124, overheating of the tower case 140 may be more efficiently prevented or reduced.

Referring to FIG. 5, the lower end of the heater 500 may be provided closer to a rear lower end of the first tower 110 or the second tower 120 than a front lower end. A cross-sectional area of the discharge space 103 may be larger in a lower portion than in an upper portion.

An amount of air flowing in the lower end or portion of the tower case 140 may be larger or maximal, and as the air rises, the air may pass through the heater 500 and may be discharged to the blowing space 105. An amount of air flowing in the upper end or portion of the tower case 140 may be lower or minimal. The lower end of the heater 500 may be provided closer to the rear lower end than the front lower end of the tower case 140 to form a discharge space 103 suitable for a prescribed or certain air flow rate, reducing or preventing pressure loss and improving efficiency by compensating a pressure difference.

The heater 500 further may include a flow path shielding member 540 that shields air from flowing between the fin 530 and the first discharge port 117 or the second discharge port 127. The flow path shielding member 540 may be provided in the lower end of the heater 500 and extend toward the lower end of the first discharge port 117 or the second discharge port 127.

The flow path shielding member 540 may be provided inside the tower case 140. The lower end of the flow path shielding member 540 may be provided above the suction grill 350. The flow path shielding member 540 may have an inclination so that the rear end may be provided above the front end.

The flow path shielding member 540 may extend to the rear end of the first tower 110 or the second tower 120. The lower end of the first discharge port 117 or the second discharge port may be provided above the flow path shielding member 540.

As shown in FIG. 7, the flow path shielding member 540 may extend to the left or right from the front end of the lower horizontal plate 513, and extend to the rear of the tower case 140. The flow path shielding member 540 may be formed in a semicircular shape. Alternatively, the flow path shielding member 540 may be formed to have a same width as that of the lower horizontal plate 513, as shown in FIG. 5, and may extend to the rear end of the tower case 140.

The flow path shielding member 540 may prevent the air flowing through the first discharge space 103a or the second discharge space 103b from being directly discharged to the first discharge port 117 or the second discharge port 127 without passing through the heater 500. The flow path shielding member 540 may shield the right and/or left lower end of the heater 500 and the inner surface of the first tower 110, and shields the right and/or left lower end of the heater 500 and the inner surface of the second tower 120. The flow path shielding member 540 may block a bypass path through which air discharged out of the suction grill 350 may avoid the heater 500 while flowing to the first and second discharge ports 117 and 127, thereby improving efficiency.

Figure 25:
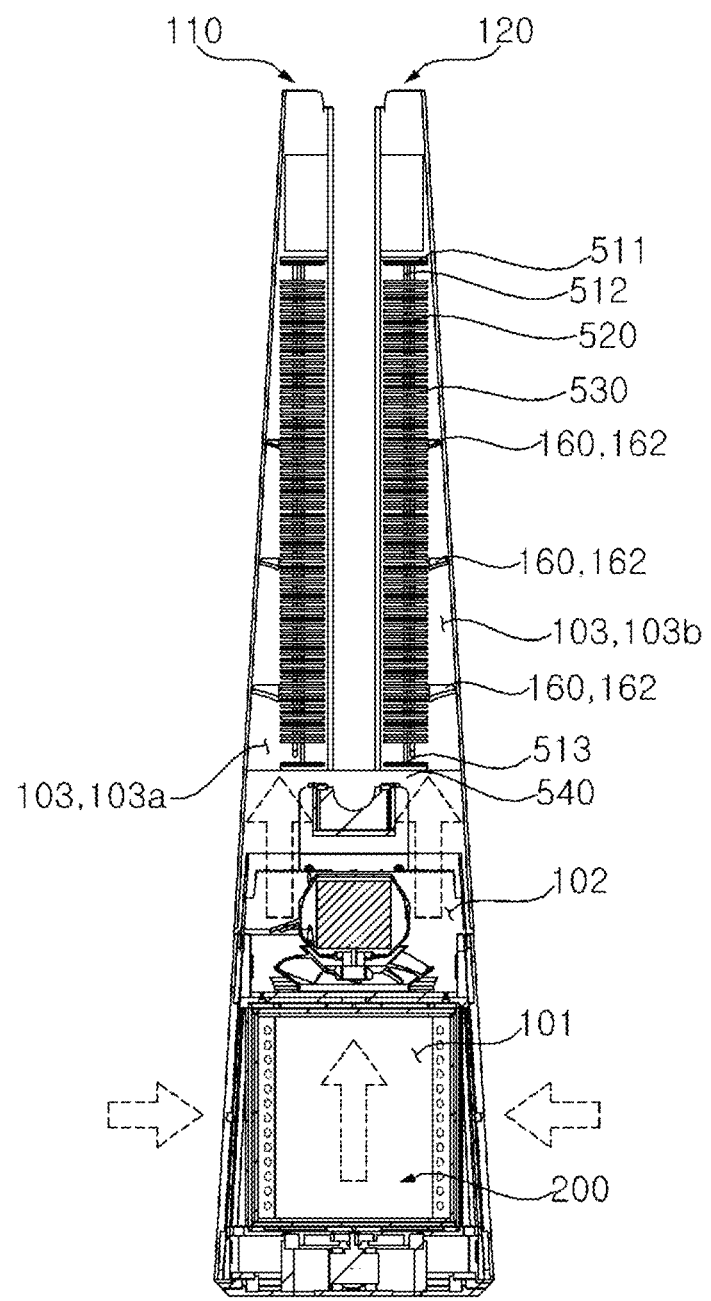
FIG. 25 is a front view of FIG. 2 according to another embodiment of the present disclosure.
Figure 26:
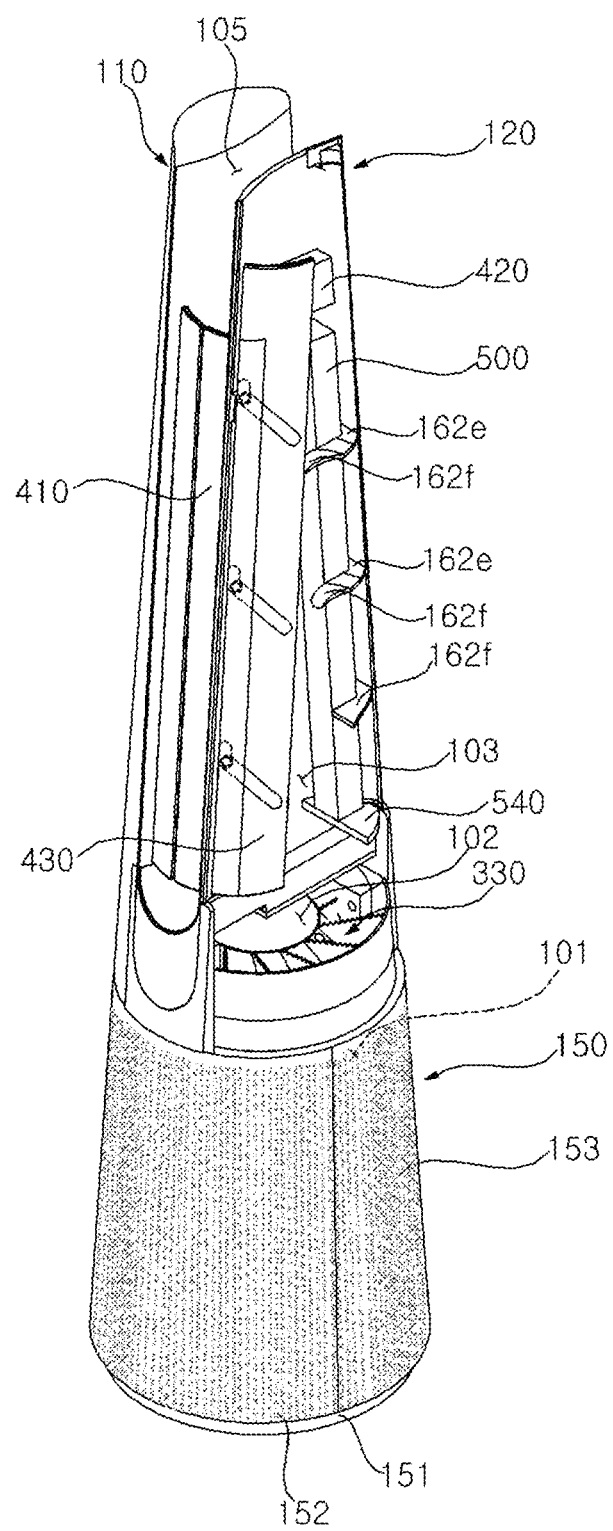
FIG. 26 is a partially exploded perspective view illustrating an inside of a second tower of FIG. 25.
Figure 27:
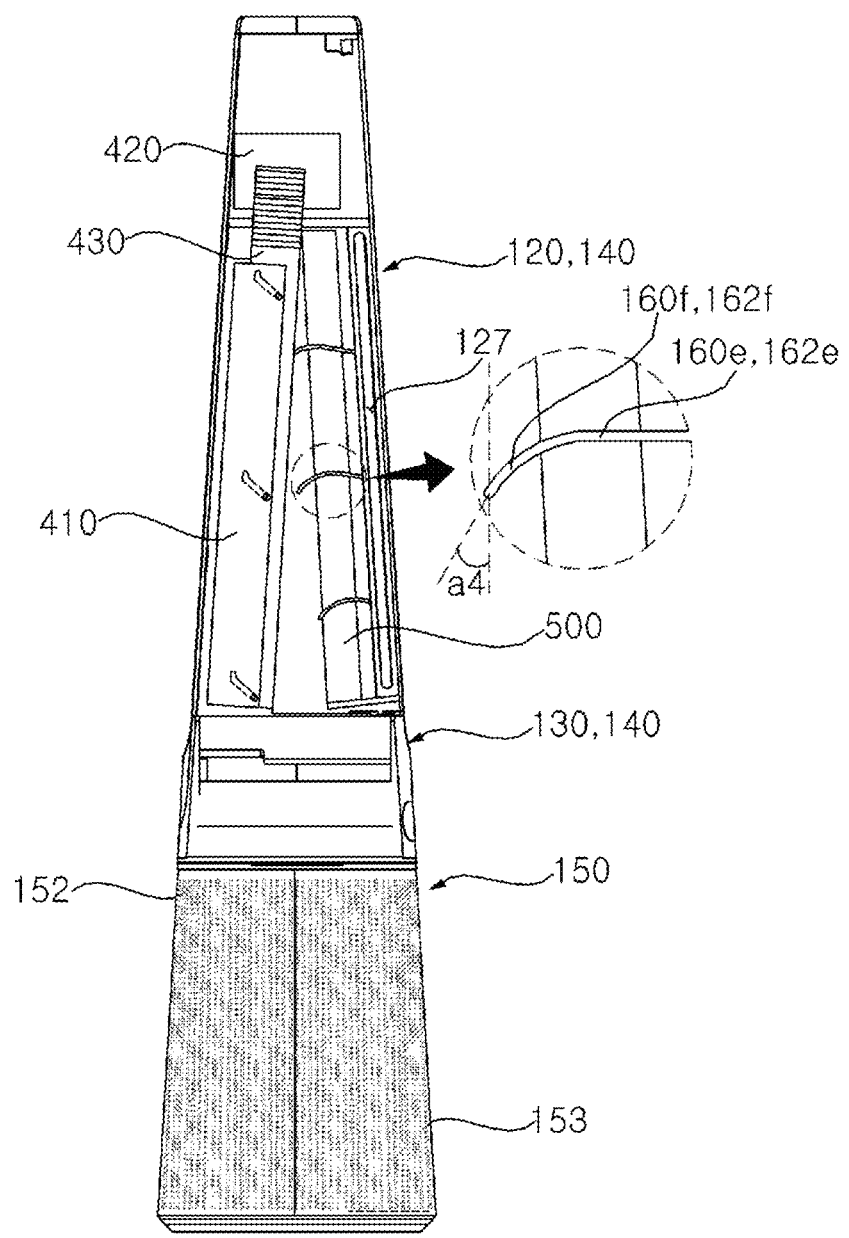
FIG. 27 is a right cross-sectional view of FIG. 26.

Referring to FIGS. 25 to 27, an air conditioner according to another embodiment may further include an air guide 160 that guides the air whose direction has been changed to the first discharge port 117 or the second discharge port, in addition to the heater 500. The air guide 160 may be configured to convert a flow direction of rising air into a horizontal direction in the discharge space 103 toward the first and second discharge ports 117 and 127. A plurality of air guides 160 may be provided.

The air guide 160 may include a first air guide 161 provided in the first tower 110 and a second air guide 162 provided inside the second tower 120. The first and second air guides 161 and 162 may alternatively be referred to as vanes or dampers.

An outer end of the first air guide 161 may be coupled to the outer wall 114 of the first tower 110. An inner end of the first air guide may be adjacent to the first heater 501.

The first air guide 161 may have a front end adjacent to the first discharge port 117. The front end of the first air guide 161 may be coupled to an inner wall adjacent to the first discharge port 117. A rear end of the first air guide 161 may be spaced apart from the rear end of the first tower 110.

To guide the air flowing from the lower side to the first discharge port 117, the first air guide 161 may have a convex surface curved from the lower side to the upper side, and the rear end may be provided lower than the front end. The first air guide 161 may have a curved portion 161$f$ and a flat portion 161$e$.

A rear end of the flat portion 161$e$ of the first air guide 161 may be adjacent to a first discharge guide 172 described later. The flat portion 160$e$ of the first air guide 161 may extend forward and horizontally with respect to the ground.

A rear end of the curved portion 161$f$ of the first air guide 161 may be provided in the flat portion 161$e$ of the first air guide 161. The curved portion 160$f$ of the first air guide 161 may extend to a front lower side while forming a curved surface. A front end of the curved portion 160$f$ of the first air guide 161 may be provided lower than a rear end. The front and rear ends of the curved portion 160$f$ of the first air guide 161 may have a horizontal distance ranging from 10 mm to 20 mm from the ground. The horizontal distance between the front and rear ends of the curved portion 160$f$ of the first air guide 161 from the ground may be defined as a curvature length. The curvature length of the curved portion 161$f$ of the first air guide 161 may be formed between 10 mm and 20 mm.

An entrance angle a4 of the front end of the curved portion 160$f$ of the first air guide 161 may be formed to be 10 degrees. The entrance angle a4 may be defined as the angle between the vertical line with respect to the ground and a tangent line of the front end of the curved portion 160$f$ of the first air guide 161.

At least portion of the right end of the first air guide 161 may be adjacent to an outside of the heater 500, and a remaining portion may be coupled to the inner wall 115 of the first tower 110. The left end of the first air guide 161 may be in close contact with or coupled to the outer wall 114 of the first tower 110.

Air moving upward along the discharge space 103 may flow from the rear end of the first air guide 161 to the front end. Air that has passed through the fan assembly 300 may rise and flow to the rear of the discharge space 103 by being guided by the first air guide 161.

The second air guide 162 may be symmetrical with the first air guide 161 in the right-left direction. An outer end of the second air guide 162 may be coupled to the outer wall 124 of the second tower 120. An inner end of the second air guide 162 may be adjacent to the second heater 502.

The second air guide 162 may have a front end adjacent to the second discharge port 127. The front end of the second air guide 162 may be coupled to an inner wall adjacent to the second discharge port 127. The rear end of the second air guide 162 may be spaced apart from the rear end of the second tower 120.

To guide the air flowing from the lower side to the second discharge port 127, the second air guide 162 may have a convex surface curved from the lower side to the upper side, and the rear end of the second air guide 162 may be provided lower than the front end of the second air guide 162.

The second air guide 162 may have a curved portion 162$f$ and a flat portion 162$e$. A rear end of the flat portion 162$e$ may be adjacent to the second discharge guide 127. The flat portion 162$e$ may extend forward and horizontal with respect to the ground.

A rear end of the curved portion 162$f$ may be provided in the front end of the flat portion 162$e$. The curved portion 162$f$ may extend to the front lower side of the discharge space 103 while forming a curved surface. The front end of the curved portion 162$f$ may be provided lower than the rear end of the curved portion 162$f$. The front and rear ends of the curved portion 162$f$ may have a horizontal distance ranging from 10 mm to 20 mm from the ground. The horizontal distance between the front and rear ends of the curved portion 162$f$ from the ground may be defined as a curvature length. The curvature length of the curved portion 162$f$ may be between 10 mm and 20 mm.

An entrance angle a4 of the front end of the curved portion 162$f$ may be formed to be 10 degrees. The entrance angle a4 may be defined as an angle between the vertical line with respect to the ground and a tangent line of the front end of the curved portion 162$f$.

At least a part of the left end of the second air guide 162 may be adjacent to an outside of the second heater 502, and a remaining part may be coupled to the inner wall 125 of the second tower 120. The right end of the second air guide 162 may be in close contact with or coupled to the outer wall 124 of the second tower 120.

The air moving upward along the discharge space 103 may flow from the rear end of the second air guide 162 to the front end of the second air guide 162. Air that has passed through the fan assembly 300 may rise and flow to the rear by being guided by the second air guide 162.

When the air guide 160 is installed, the direction of air rising in the vertical direction may be changed into the horizontal direction. Discharged air having a uniform flow rate and a horizontal direction may be discharged from the first and second discharge ports 117 and 127, which extend vertically.

When the entrance angle a4 of the air guide 160 is relatively large or the curvature length is relatively long, the air guide 160 may resist the air rising in the vertical direction, thereby increasing noise. When a curvature length of the air guide 160 is relatively short, air may not be efficiently guided in a horizontal direction. When the entrance angle a4 and/or curvature length is formed according to the present disclosure, air volume may be increased, and noise may be reduced.

Referring back to FIGS. 5-10, the airflow converter 400 may be provided above the heater 500. The gate 410 and the board guider 430 may be provided in front of the heater 500, but the guide motor 420 may be provided above the heater 500. A space inside the tower case 140 may be efficiently utilized, and the guide motor 420 may be prevented from interfering with the air flow inside the discharge space 103.

The guide motor 420 may be emit heat and may be vulnerable to heat. The guide motor 420 may be provided above the heater 500 so that the guide motor 420 may be not provided in an air flow path and so that the heat of the heater 500 may be prevented from convectively flowing to the guide motor 420.

Hereinafter, the air flow flowing around the heater 500 as viewed from above will be described with reference to FIG. 24. Referring to FIG. 24, the air that has passed through the fan assembly 300 rises in front of the heater 500. An upward flow direction of air rising from the front of the heater 500 may be changed to flow rearward. Most of the air may be heated through the heater 500, and warm air may be discharged to the blowing space 105.

Some air may flow through the space between the heater 500 and the outer walls 114 and 124. This air may form an air curtain between the heater 500 and the outer walls 114 and 124 to prevent the heat of the heater 500 from convectively flowing to the outer wall 114 and 124. Some other air may flow into the space between the heater 500 and the inner walls 114 and 124. This air may also form an air curtain between the heater 500 and the inner wall 114 and 124 to prevent the heat of the heater 500 from convectively flowing to the inner walls 114 and 124.

Figure 28:
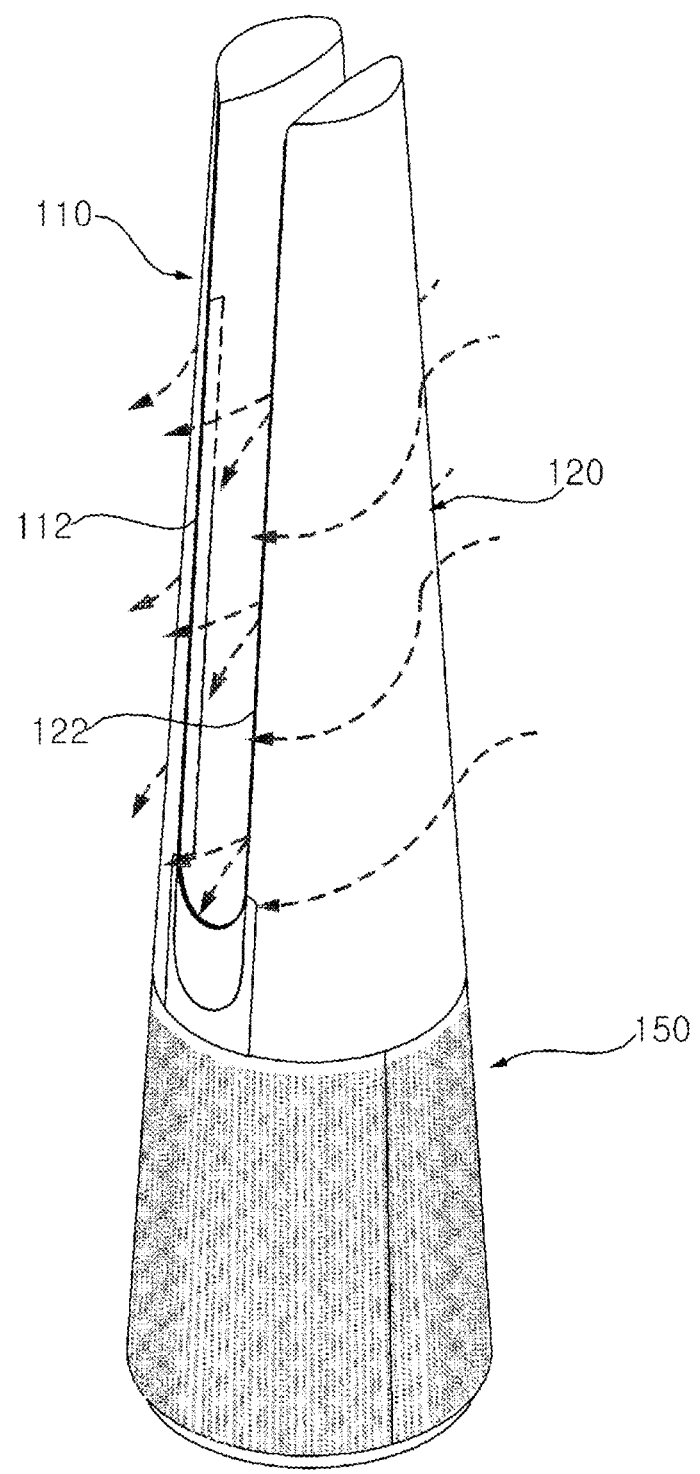
FIG. 28 is an exemplary view illustrating a horizontal airflow of the air conditioner.

Referring to FIG. 28, to facilitate a horizontal airflow, the first gate 411 may be concealed inside the first tower 110, and the second gate 412 may be concealed inside the second tower 120. The front of the blowing space 105 may be opened to allow air to pass therethrough.

The discharged air of the first discharge port 117 and the second discharge port 127 may be joined in the blowing space 105 and may pass through the front ends 112 and 122 to flow forward. Ambient air behind the blowing space 105 may be guided into the blowing space 105 and then flow forward. Ambient air around the first tower 110 may flow forward along the first outer wall 114, and ambient air around the second tower 120 may flow forward along the second outer wall 124.

Since the first discharge port 117 and the second discharge port 127 may be formed to extend in the vertical direction and be provided symmetrically in the right-left direction, the air flowing from the upper side of the first discharge port 117 and the second discharge port 127 and the air flowing from the lower side may be formed more uniformly. The air discharged from the first discharge port 117 and the second discharge port 127 may be joined to each other in the blowing space 105, thereby improving a straightness or concentration of the discharged air and allowing the air to flow to a farther place.

Figure 29:
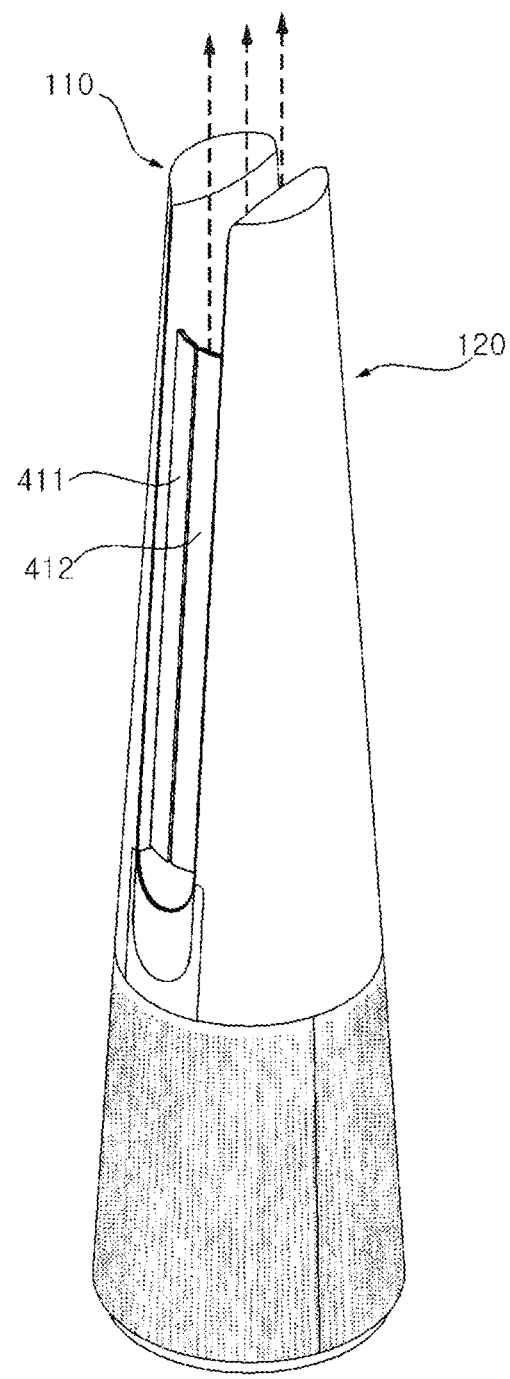
FIG. 29 is an exemplary view illustrating an ascending airflow of the air conditioner.

Referring to FIG. 29, to facilitate an ascending airflow, the first gate 411 and the second gate 412 may protrude into the blowing space 105 to at least partially close or block the front of the blowing space 105. The air discharged from the discharge ports 117 and 127 may rise along rear surfaces of the first gate 411 and the second gate 412, and may be discharged to the upper side of the blowing space 105.

By forming an ascending airflow for air conditioner 1, it may be possible to suppress discharged air from flowing directly to a user. To circulate indoor air, the air conditioner 1 and/or the fan assembly 300 may be operated in an ascending airflow mode where the first and second gates 411 and 412 are moved to protrude into the blowing space 105. The ascending airflow mode may promote convection of indoor air, and the indoor air can be cooled or heated more quickly.

Figure 30:
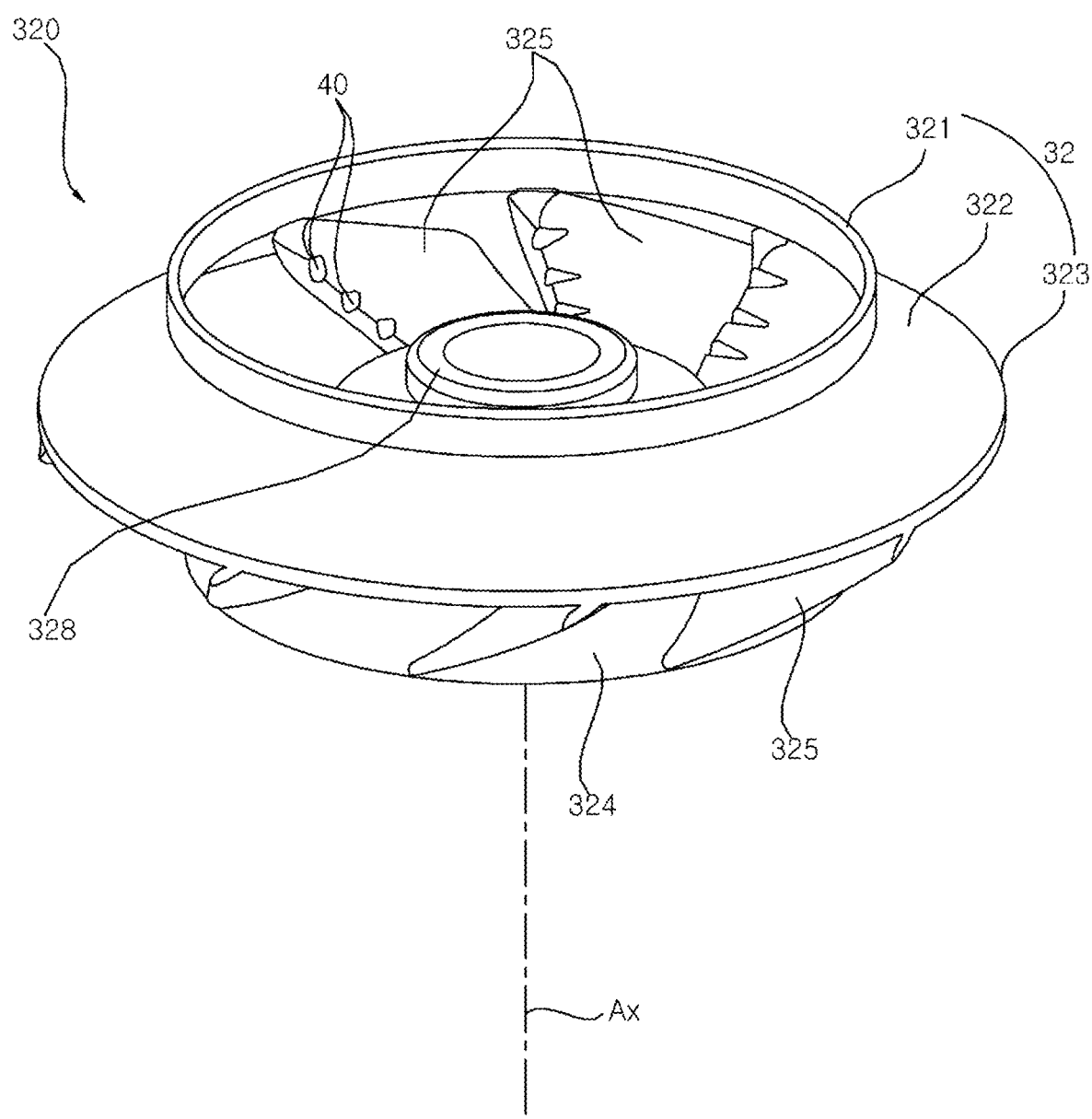
FIG. 30 is a perspective view illustrating a fan.

Referring to FIG. 30, the fan 320 may include a hub 328 connected to a rotation axis Ax, a plurality of blades 325 installed or located at a given interval on the outer circumferential surface of the hub 328, and a shroud 32 which may be spaced apart from the hub 328 and provided to surround the hub 328 and connected to one end of the plurality of blades 325.

The fan 320 may further include a back plate 324 provided with the hub 328 for coupling. In some embodiments, the back plate 324 and the shroud 32 may be omitted. The hub 328 may have a cylindrical shape whose outer circumferential surface may be parallel to the rotation axis Ax.

The plurality of blades 325 may extend from the back plate 324. The blades 325 may extend so that an outline of each blade among the plurality of blades 325 forms a curved line.

Each blade 325 may constitute a rotating blade of the fan 320 and serve to transfer kinetic energy of the fan 320 to a fluid (e.g., air). A plurality of blades 325 may be provided at given intervals and may be provided in a radial shape on the back plate 324. One or a first end of each of the plurality of blades 325 may be connected to the outer circumferential surface of the hub 328.

The shroud 32 may be connected to another or a second end of the blade 325. The shroud 32 may be formed at a position facing the back plate 324 and may be formed in a circular ring shape. The shroud 32 and the hub 328 may share the rotation axis Ax as a center.

The shroud 32 may have a suction end 321 through which a fluid may be introduced and a discharge end 323 through which the fluid may be discharged. The shroud 32 may be formed to be curved so that a diameter decreases from the discharge end 323 toward the suction end 321.

The should 32 may include a connection part 322 that connects the suction end 321 and the discharge end 323. The connection part 322 may be rounded with a curvature so that an inner cross-sectional area of the shroud 32 may be widened.

The shroud 32 may form a movement passage for fluid together with the back plate 324 and the blade 325. Regarding the moving direction of the fluid, the fluid introduced in the central axis direction may flow in the circumferential direction of the fan 320 by rotation of the blade 325. The fan 320 may discharge the fluid in the radial direction of the fan 320 by increasing a flow velocity by centrifugal force.

The shroud 32 may be formed to be spaced apart from the back plate 324 by a certain distance. The shroud 32 may be provided to have a surface facing parallel to the back plate 324.

Figure 31:
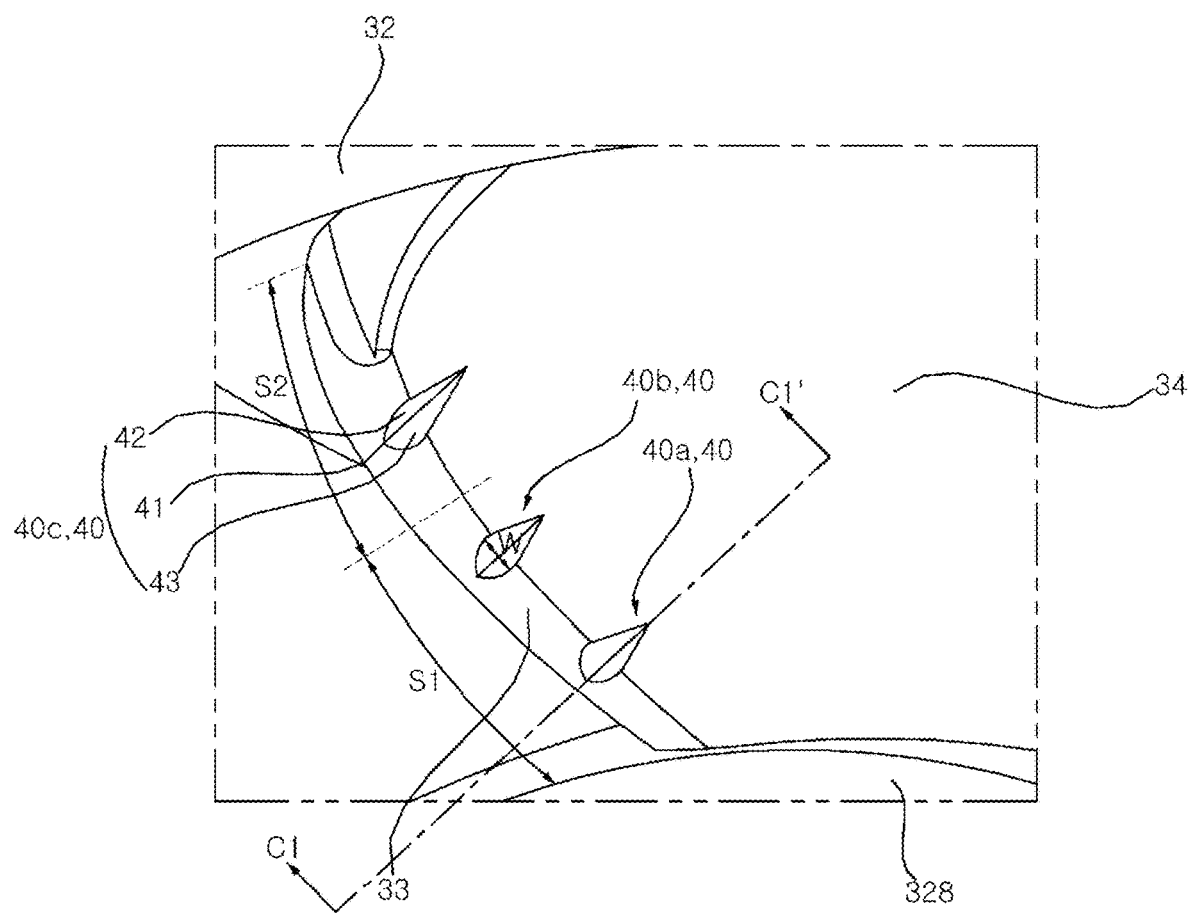
FIG. 31 is an enlarged view illustrating a portion of a leading edge of FIG. 30.
Figure 32:
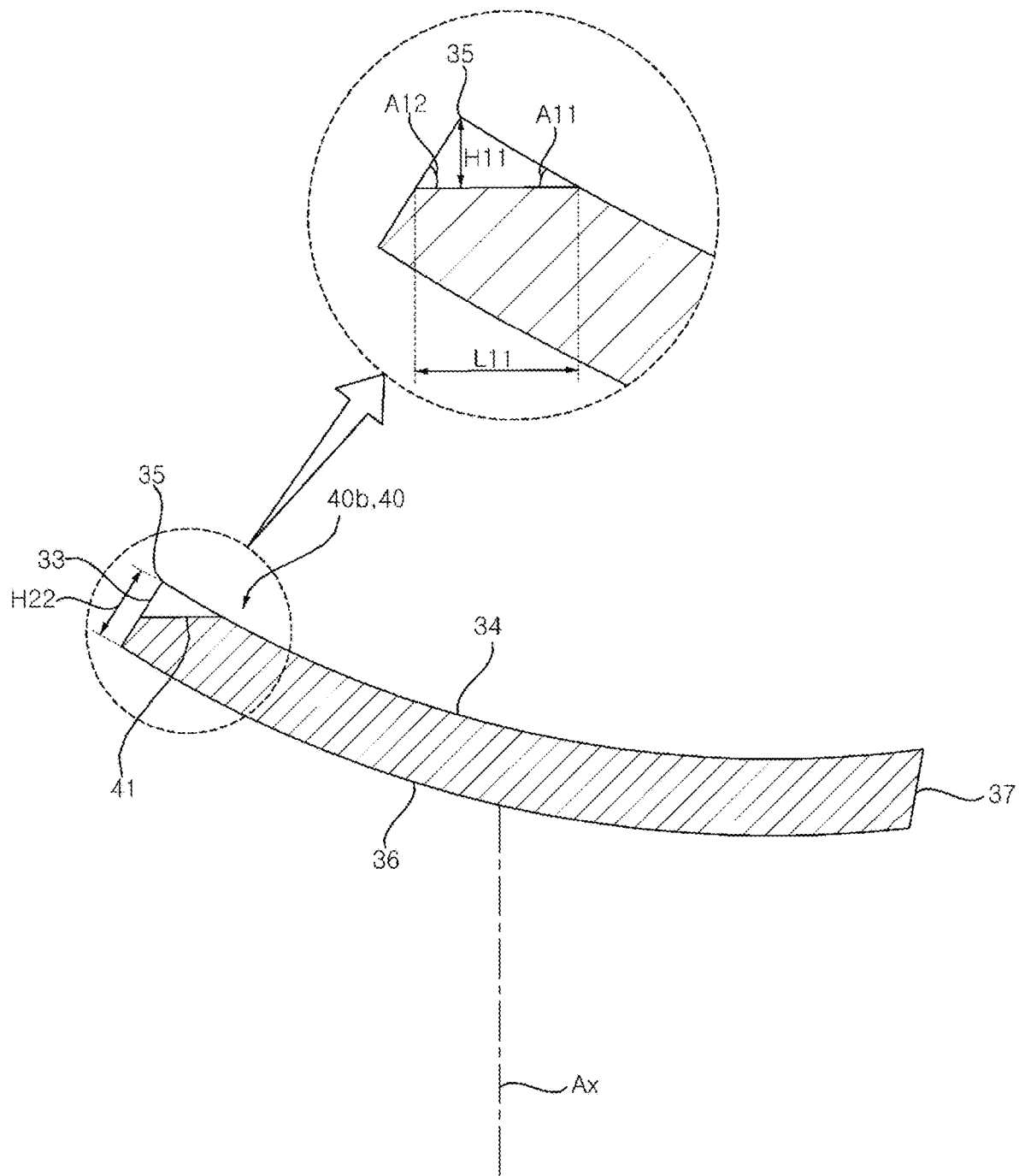
FIG. 32 is a cross-sectional view taken along line C1-C1' of FIG. 31.

Hereinafter, the blade 325 and a notch 40 formed in the blade 325 will be described in detail. Referring to FIGS. 31 and 32, each blade 325 may include a leading edge 33 defining one or a first surface in the direction in which the hub 328 may be rotated, a trailing edge 37 defining another or a second surface in the direction opposite to the leading edge 33, a negative pressure surface 34 which connects an upper end of the leading edge 33 and an upper end of the trailing edge 37 and has a larger area than the leading edge 33 and the trailing edge 37, and a pressure surface 36 which connects a lower end of the leading edge 33 and a lower end of the trailing edge 37 and faces the negative pressure surface 34.

In each blade 325, the negative pressure surface 34 and the pressure surface 36 may define a widest upper and lower surface of the blade 325 in the shape of a plate or curved plate. Ends in a length direction form both side surfaces of the blade 325, and ends in a width direction (left-right direction in FIG. 32) intersecting the length direction may form the leading edge 33 and the trailing edge 37. An area of the trailing edge 37 and the leading edge 33 may be smaller than that of the negative pressure surface 34 and the pressure surface 36. The leading edge 33 may be located above the trailing edge 37.

Each blade 325 may be formed with a plurality of notches 40 to reduce noise generated in the fan assembly 300 and a sharpness of the noise. Each notch 40 may be formed over a portion of the leading edge 33 and a portion of the negative pressure surface 34. Each notch 40 may be formed in such a manner that a corner 35 where the leading edge 33 and the negative pressure surface 34 meet with each other may be depressed downward. Each notch 40 may be formed over an upper middle portion of the leading edge 33 and a portion of the negative pressure surface 34 adjacent to the leading edge 33.

A cross-sectional shape of the notch 40 may be not limited and may have various shapes. However, to reduce noise of the fan while maintaining efficiency, the cross-sectional shape of the notch 40 may have a U-shape or a V-shape. The shape of the notch 40 will be described later.

A width W of the notch 40 may be expanded from a lower portion of the notch 40 toward an upper portion of the notch 40. The width W of the notch 40 may be expanded gradually or expanded in a stepwise manner toward the upper portion of the notch 40.

An extension or length direction of the notch 40 may be a tangential direction of an arbitrary circumference centered on the rotation axis Ax. Here, the extension direction of the notch 40 may mean a direction of a length L11 of the notch 40. A same cross-sectional shape of the notch 40 extends in the tangential direction.

The notch 40 may be formed along an arc of an arbitrary circumference centered on the rotation axis Ax of the fan 320. The notch 40 may have a curved shape. A same cross-sectional shape of the notch 40 may be formed along the circumference.

The depth H11 of the notch 40 may become smaller as the distance from the point where the leading edge 33 and the negative pressure surface 34 meet increases. The depth H11 of the notch 40 may be high in a center and decrease toward both ends in the extension direction.

The cross-sectional shape of the notch 40 may be a V-shape. The notch 40 may include a first inclined surface 42, a second inclined surface 43 which faces the first inclined surface 42 and may be connected to the lower end of the first inclined surface 42, and a bottom line 41 defined by connecting the first inclined surface 42 and the second inclined surface 43.

A separation distance between the first inclined surface 42 and the second inclined surface 43 may increase as the separation distance progresses upward. The separation distance between the first inclined surface 42 and the second inclined surface 43 may gradually increase or may increase in a stepwise manner. The first inclined surface 42 and the second inclined surface 43 may be flat or curved. The first inclined surface 42 and the second inclined surface 43 may have a triangular shape.

The bottom line 41 may extend in a tangential direction of an arbitrary circumference centered on the rotation axis Ax. As another example, the bottom line 41 may extend along an arbitrary circumference centered on the rotation axis Ax. The bottom line 41 may form an arc centered on the rotation axis Ax.

A length of bottom line 41 may be the same as the length L11 of the notch 40. A direction of the bottom line 41 may mean the direction of the notch 40. The direction of the bottom line 41 may be a direction configured to reduce flow separation occurring in the leading edge 33 and the negative pressure surface 34 and reducing air resistance.

The bottom line 41 may have an inclination of 0 degrees to 10 degrees with respect to a horizontal plane perpendicular to the rotation axis Ax. The bottom line 41 may be parallel to a horizontal plane perpendicular to the rotation axis Ax. As the blade 325 rotates, a resistance by the notch 40 may be reduced.

The length L11 of the bottom line 41 may be longer than the height H22 of the leading edge 33. If the length L11 of the bottom line 41 is too short, the flow separation occurring on the negative pressure surface 34 may not be effectively reduced, and if the length L11 of the bottom line 41 is too long, efficiency of the fan 320 may decrease.

The length L11 of the notch 40 and the bottom line 41 may be larger than the depth H11 of the notch 40 and the width W of the notch 40. For example, the length L11 of the notch 40 may be 5 mm to 6.5 mm, the depth H11 of the notch 40 may be 1.5 mm to 2.0 mm, and the width W of the notch 40 may be 2.0 mm to 2.2 mm. The length L11 of the notch 40 may be 2.5 to 4.33 times the depth H11 of the notch 40, and the length L11 of the notch 40 may be 2.272 to 3.25 times the width W of the notch 40.

One or a first end of the bottom line 41 may be located in the leading edge 33 and the other or a second end of the bottom line 41 may be located in the negative pressure surface 34. A position of a point where one end of the bottom line 41 may be located in the leading edge 33 may be an intermediate height of the leading edge 33.

A separation distance between the corner 35 and a point where the first end of the bottom line 41 is located may be smaller than a separation distance between the corner 35 and a point where the second end of the bottom line 41 may be located. A position of the point where the second end of the bottom line 41 is located may be between 1/5 point and 1/10 point in the width of the negative pressure surface 34.

The angle A11 formed by the bottom line 41 and the negative pressure surface 34 and the angle A12 formed by the bottom line 41 and the leading edge 33 may be not limited. For example, the angle A11 formed by the bottom line 41 and the negative pressure surface 34 may be smaller than the angle A12 formed by the bottom line 41 and the leading edge 33.

A plurality (e.g., three) notches 40 may be provided. The notch 40 may include a first notch 40, a second notch 40 located farther from the hub 328 than the first notch 40, and a third notch 40 located farther from the hub 328 than the second notch 40. A separation distance between respective notches 40 may be 6 mm to 10 mm. The separation distance between respective notches 40 may be greater than the depth H11 of the notch 40 and the width W of the notch 40.

The leading edge 33 may be divided into a first area S1 adjacent to the hub 328 based on the center and a second area S2 adjacent to the shroud 32. Two of the three notches 40 may be located in the first area S1, and the remaining notch 40 may be located in the second area S2.

The first notch 40 and the second notch 40 may be located in the first area S1, and the third notch 40 may be located in the second area S2. The separation distance from the hub 328 of the first notch 40 may be 19% to 23% of the length of the leading edge 33, the separation distance from the hub 328 of the second notch 40 may be 40% to 44% of the length of the leading edge 33, and the separation distance from the hub 328 of the first notch 40 may be 65% to 69% of the length of the leading edge 33.

Among the plurality of notches 40, the notch 40 spaced farthest from the hub 328 may have the longest length. The length L11 of the third notch 40 may be greater than the length L11 of the second notch 40, and the length L11 of the second notch 40 may be greater than the length L11 of the first notch 40. The flow separation occurring in the blade 325 of the fan may be reduced through the shape, disposition, and number of the notch 40, and as a result, noise generated in the fan 320 may be reduced.

Figure 33:
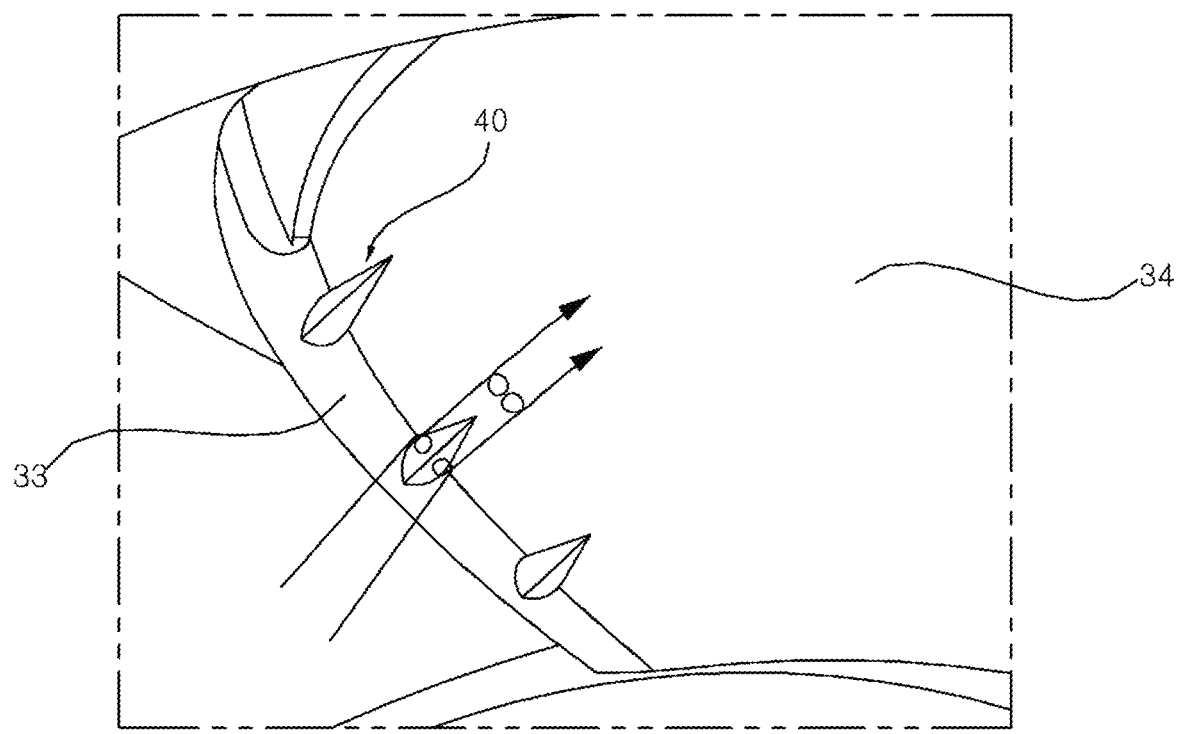
FIG. 33 is a view illustrating a flow of air passing through a notch portion of the leading edge in FIG. 30.
Figure 34:
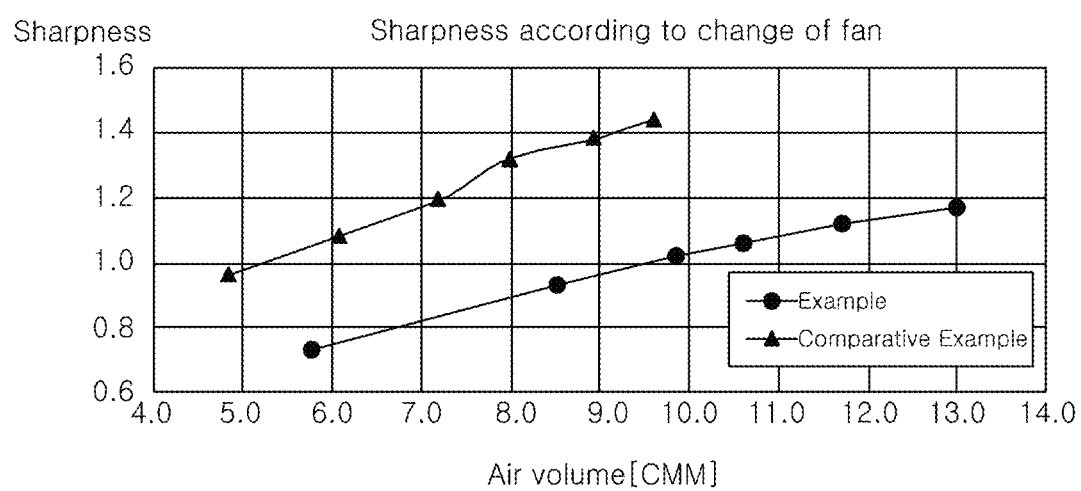
FIG. 34 is an experimental data comparing sharpness according to an air volume in an example and a comparative example.
Figure 35:
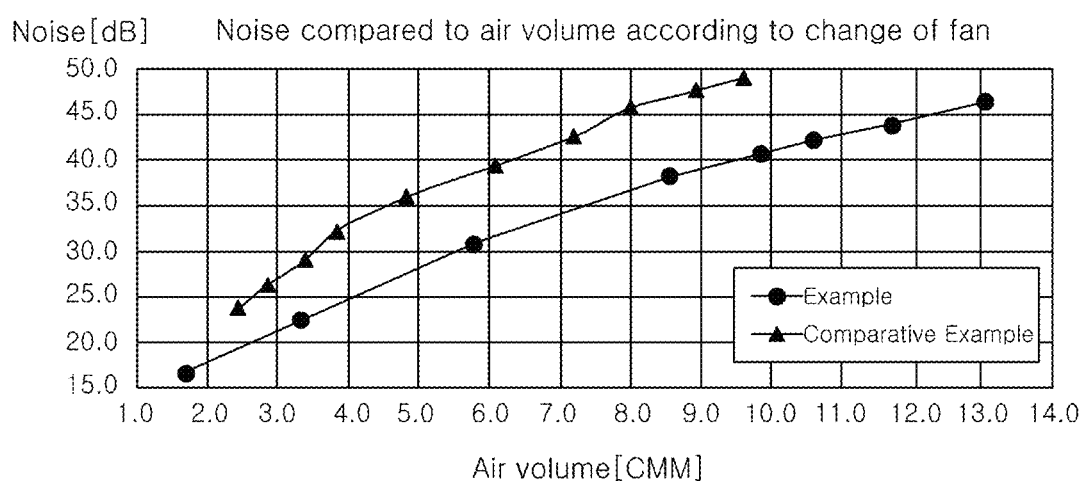
FIG. 35 is an experimental data comparing noises according to an air volume in an example and a comparative example.
Figure 36:
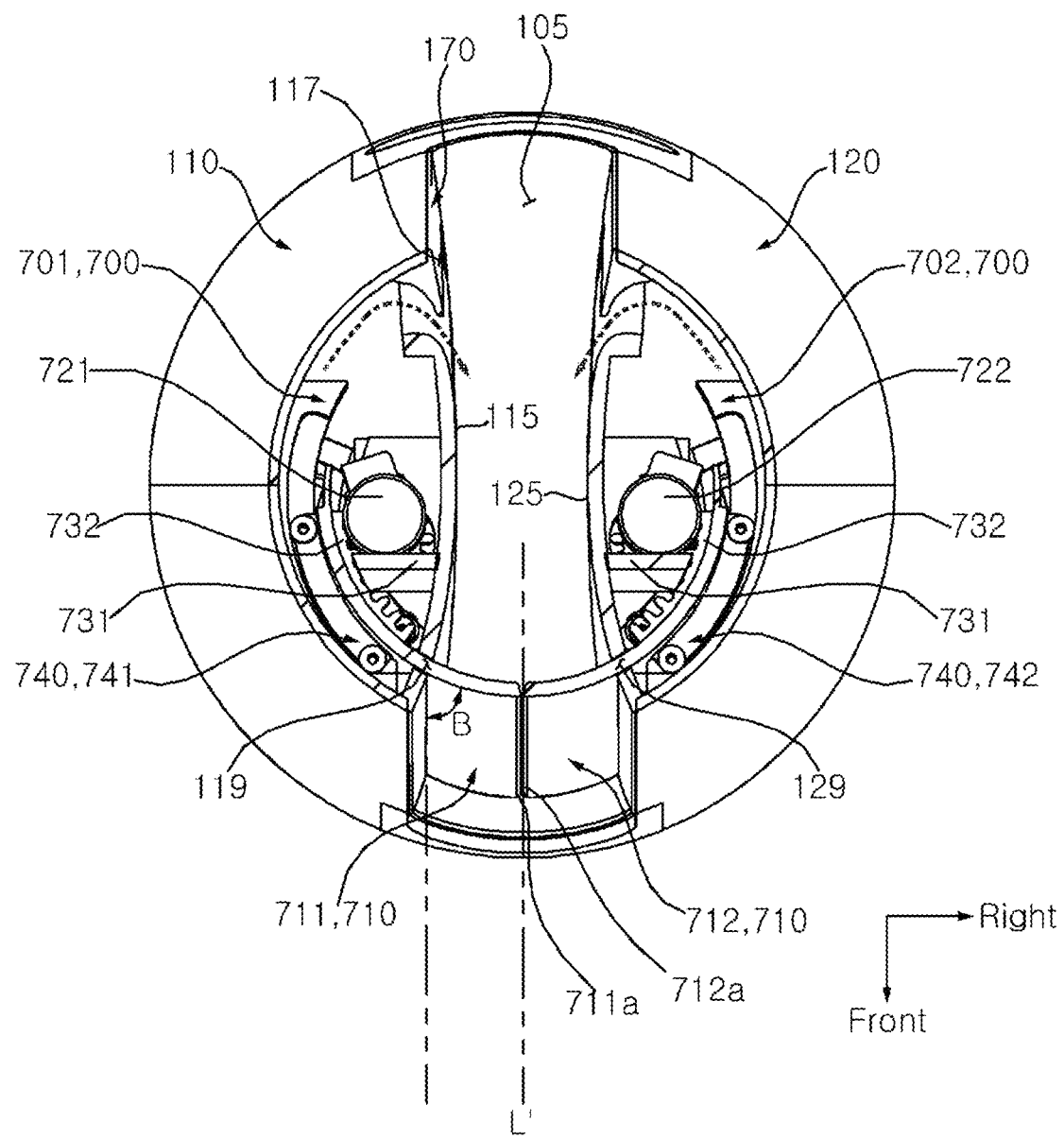
FIG. 36 is a plan cross-sectional view illustrating an airflow converter according to another embodiment.
Figure 37:
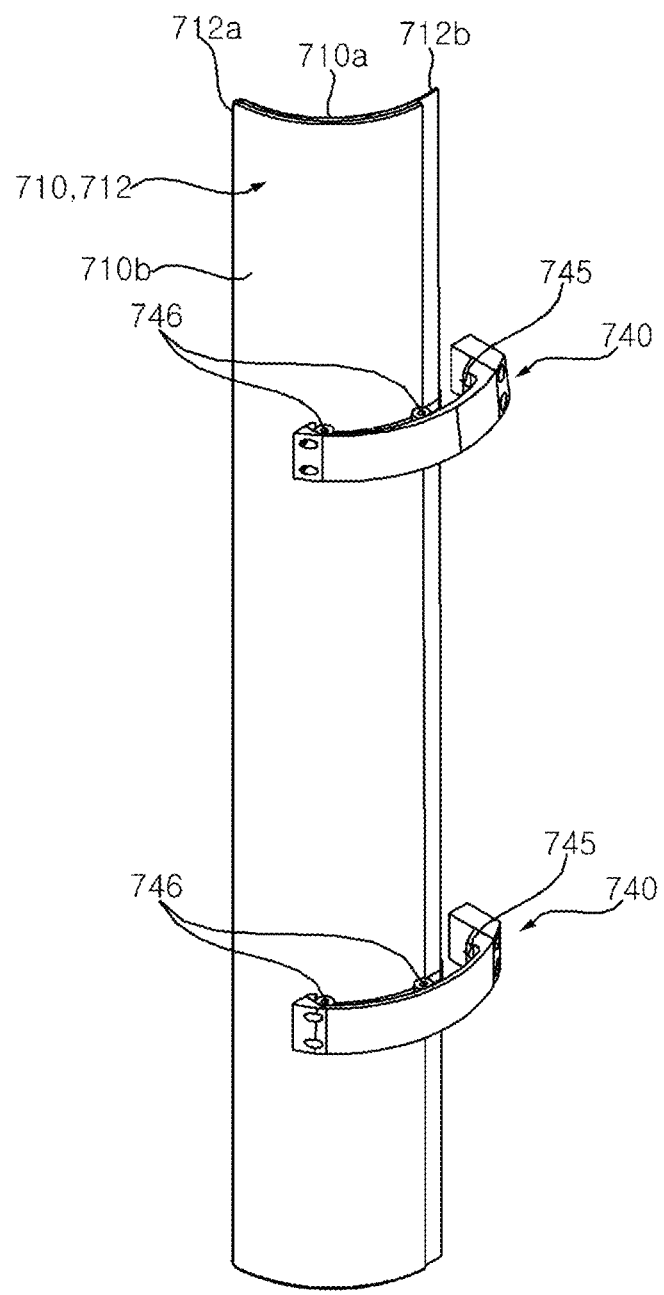
FIG. 37 is a perspective view of the airflow converter illustrated in FIG. 36.
Figure 38:
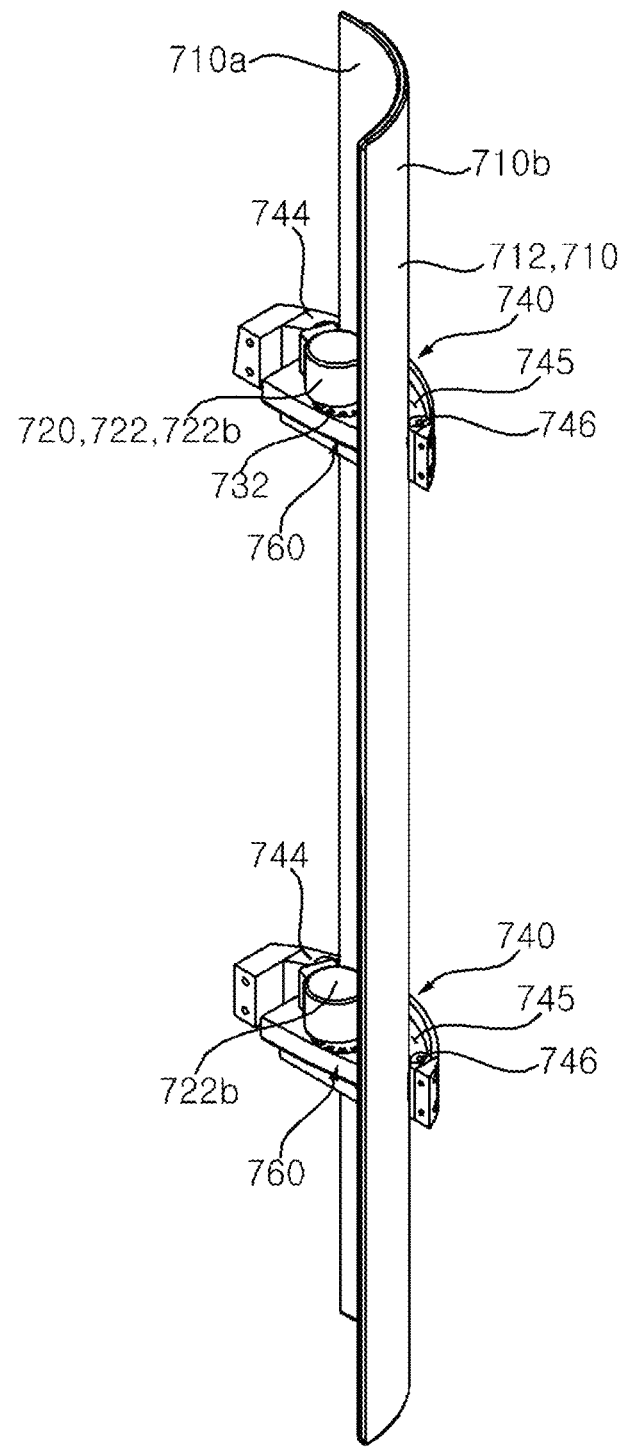
FIG. 38 is a perspective view when the airflow converter is viewed from a side opposite to FIG. 37.
Figure 39:
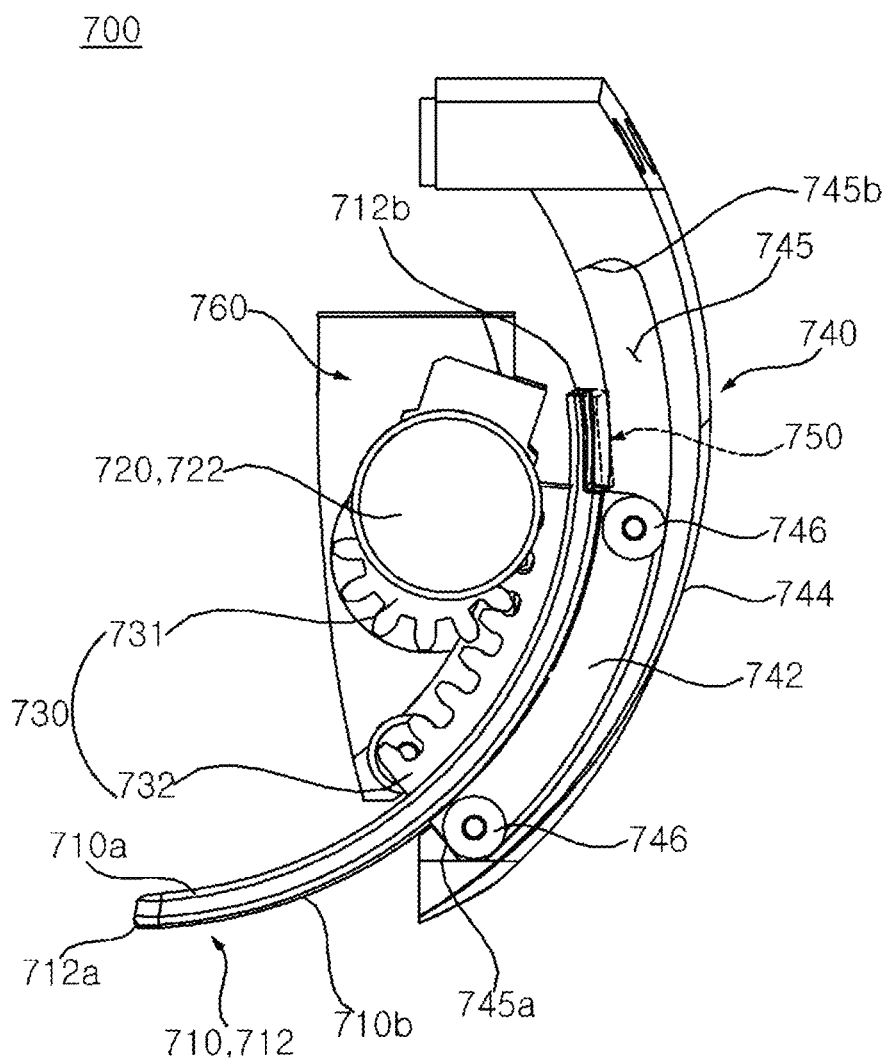
FIG. 39 is a plan view of FIG. 37.
Figure 40:
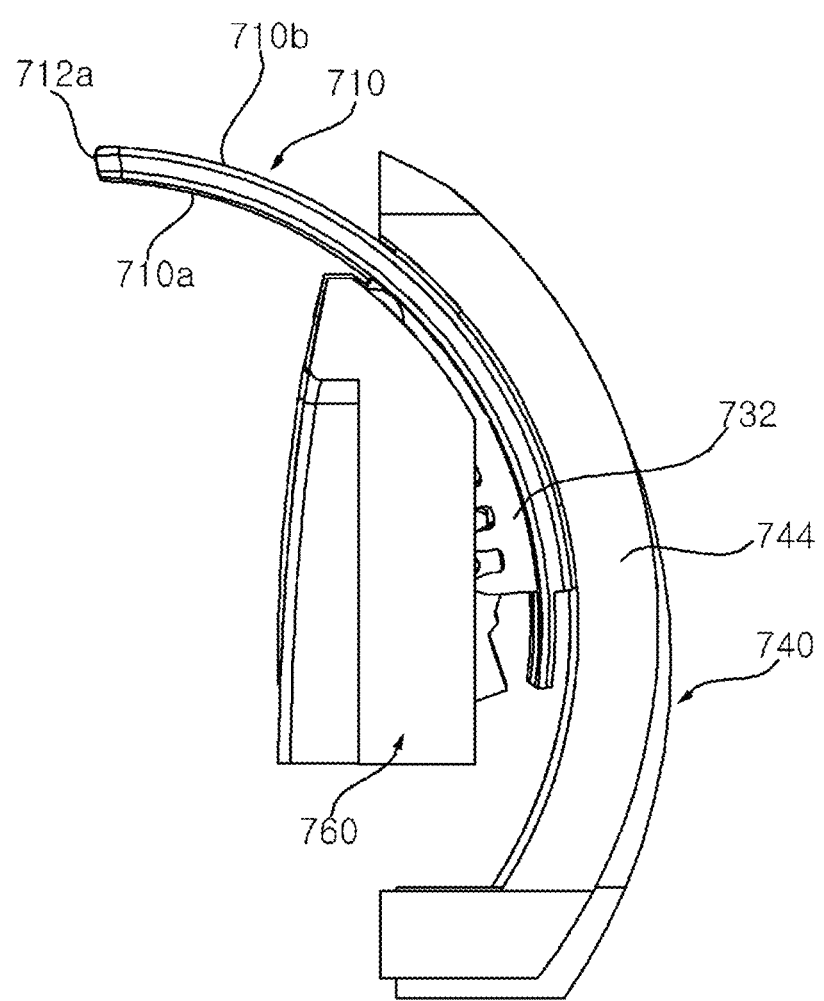
FIG. 40 is a bottom view of FIG. 37.

Referring to FIG. 33, some of the fluid passing through the leading edge 33 may cause turbulent flow due to a flow that passed through the notch 40 and flow along the surface of the blade 325, and then may be mixed with the fluid that has passed through the leading edge 33. Flow separation may not occur on the surface of the blade 325, and noise may be reduced by a flow flowing along the surface. Referring to FIGS. 34 and 35, noise and sharpness may be significantly reduced when the noise and sharpness of a general fan (comparative example) and the embodiment are tested in the same environment. Sharpness may correspond to a high frequency amount in the noise.

An airflow guide or converter 700 of another embodiment capable of facilitating an ascending airflow will be described with reference to FIGS. 36 to 40. In the present embodiment, the airflow converter 700 may be mainly described based on differences from the air flow converter 400 of FIGS. 16 to 22, and configurations having no special description may be regarded as the same as those of the embodiment of FIGS. 16 to 22.

Referring to FIGS. 36-40, the airflow converter 700 may convert a horizontal airflow flowing through the blowing space 105 into an ascending airflow. The airflow converter 700 may include a first airflow converter 701 provided in the first tower 110 and a second airflow converter 702 provided in the second tower 120. The first airflow converter 701 and the second airflow converter 702 may be symmetrical in the left-right direction and have a same or similar configuration.

The airflow converter 700 may include a gate 710 provided in the tower case 740 and configured to protrude to the blowing space 105, a guide motor 720 which provides a driving force for the movement of the gate 710, a power transmission member 730 which provides a driving force of the guide motor 720 to the gate 710, and a board guider 740 which may be provided inside the tower case 140 and guide the movement of the gate 710.

The gate 710 may be concealed inside the tower case 140 and may protrude to the blowing space 105 when the guide motor 720 is operated. The gate 710 may include a first gate 711 provided in the first tower 110 and a second gate 712 provided in the second tower 120.

The first gate 711 may be provided inside the first tower 110 and may selectively protrude to the blowing space 105. The second gate 712 may be provided inside the second tower 120 and may selectively protrude to the blowing space 105.

A board slit 119 penetrating the inner wall 115 of the first tower 110 may be formed, and a board slit 129 penetrating the inner wall 125 of the second tower 120 may be formed. The board slit 119 formed in the first tower 110 may be referred to as a first board slit 119, and the board slit formed in the second tower 120 may be referred to as a second board slit 129.

The first board slit 119 and the second board slit 129 may be symmetrical with each other in the left-right direction. The first board slit 119 and the second board slit 129 may extend in the vertical direction and be inclined with respect to the vertical direction V.

The inner end 711*a* of the first gate 711 may be exposed to the first board slit 119, and the inner end 712*a* of the second gate 712 may be exposed to the second board slit 129. The inner ends 711*a* and 712*a* may not protrude from the inner walls 115 and 125. When the inner ends 711*a* and 712*a* protrude from the inner walls 115 and 125, an additional Coanda effect may be induced.

Assuming that the vertical direction may be 0 degrees, the front end 112 of the first tower 110 may be formed with a first inclination, and the first board slit 119 may be formed with a second inclination. The front end 122 of the second tower 120 may be also formed with a first inclination, and the second board slit 129 may be formed with a second inclination.

The first inclination may be formed between the vertical direction and the second inclination, and the second inclination may be greater than the horizontal direction. The first inclination and the second inclination may be the same, or the second inclination may be greater than the first inclination.

The board slits 119 and 129 may be provided to be more inclined than the front ends 112 and 122 based on the vertical direction. The first gate 711 may be provided parallel to the first board slit 119, and the second gate 712 may be provided parallel to the second board slit 129.

The gate 710 may be formed in a flat or curved plate or board shape. The gate 710 may be formed to extend in the vertical direction and may be provided in front of the blowing space 105. The gate 710 may block horizontal airflow flowing into the blowing space 105 and change the airflow direction to an upward direction.

The inner end 711*a* of the first gate 711 and the inner end 712*a* of the second gate 712 may be in contact with each other or close to each other to form an ascending airflow. Alternatively, one gate 710 may be in close contact with the opposite tower 110 or 120 to form an ascending airflow.

When the airflow converter 700 is not operated, the inner end 711*a* of the first gate 711 may close the first board slit 119, and the inner end 712*a* of the second gate 712 may close the second board slit 129. When the airflow converter 700 is operated, the inner end 711*a* of the first gate 711 may penetrate through the first board slit 119 and protrude into the blowing space 105, and the inner end 712*a* of the second gate 712 may penetrate through the second board slit 129 and protrude into the blowing space 105.

As the first gate 711 closes the first board slit 119, air in the first discharge space 103*a* may not escape to an outside. As the second gate 712 closes the second board slit 129, in the second discharge space 103*b* may not escape to an outside.

The first gate 711 and the second gate 712 may protrude into the blowing space 105 due to a rotating operation. Alternatively, at least one of the first gate 711 and the second gate 712 may be linearly moved in a slide manner to protrude into the blowing space 105.

When viewed from a top view, the first gate 711 and the second gate 712 may be formed in an arc shape. The first gate 711 and the second gate 712 may have a certain curvature radius, and a center of curvature may be located in the blowing space 105.

When the gate 710 is concealed inside the tower case 140 an inside volume of the gate 710 in the radial direction may be larger than an outside volume of the gate 710 in the radial direction. The gate 710 may be formed of a transparent material. A light emitting member 750 such as a light emitting diode (LED) may be provided in the gate 710, and the entire gate 710 may emit light through light generated from the light emitting member 750. The light emitting member 750 may be provided in the discharge space 103 inside the tower case 140 and may be provided in the outer end 712b of the gate 710. A plurality of light emitting members 750 may be provided along the length direction of the gate 710.

The guide motor 720 may include a first guide motor 721 providing rotational force to the first gate 711 and a second guide motor 722 providing rotational force to the second gate 712. The first guide motor 721 may be provided in the upper side and the lower side of the first tower 110. The first guide motor 721 may be divided into or provided as an upper first guide motor and a lower first guide motor. The upper first guide motor may be provided lower than the upper end 111 of the first tower 110, and the lower first guide motor may be provided higher than the fan 320.

The second guide motor 722 may also be provided in the upper side and the lower side of the second tower. The second guide motor 722 may be divided into or provided as an upper second guide motor 722a and a lower second guide motor 722b. The upper second guide motor 722a may be provided lower than the upper end 121 of the second tower 120, and the lower second guide motor 722b may be provided higher than the fan 320.

Rotation shafts of the first guide motor 721 and the second guide motor 722 may be provided in a vertical direction, and a rack-pinion structure may be used to transmit a driving force. The power transmission member 730 may include a driving gear 731 coupled to the shaft of the guide motor 720 and a rack 732 coupled to the gate 710.

The driving gear 731 may be a pinion gear and may be rotated in the horizontal direction. The rack 732 may be coupled to the inner surface of the gate 710. The rack 732 may be formed in a shape corresponding to the gate 710. The rack 732 may be formed in an arc shape. The teeth of the rack 732 may extend toward the inner wall of the tower case 140. The rack 732 may be provided in the discharge space 103 and may turn together with the gate 710.

The board guider 740 may guide a turning movement of the gate 710 and support the gate 710 as the gate 710 turns. The board guider 740 may be provided in the opposite side of the rack 732 based on the gate 710. The board guider 740 may support a force applied from the rack 732. Alternatively, a groove corresponding to a turning radius of the gate 710 may be formed in the board guide 740, and the gate 710 may be moved along the groove.

The board guider 740 may be assembled to the outer walls 114 and 124 of the first and second towers 710 and 720. The board guider 740 may be provided outside a radial direction based on the gate 710, reducing or minimizing contact with air flowing through the discharge space 103.

The board guider 740 may include a movement guider 742, a fixed guider 744, and a friction reducing member 746. The movement guider 742 may be coupled to a structure that may be moved together with the gate. The movement guider 742 may be coupled to and rotated together with the rack 732 or the gate 710.

The movement guider 742 may be provided on the outer surface 710b of the gate 710. When viewed from a top view, the movement guider 742 may be formed in an arc shape and have a same curvature as the gate 710.

A length of the movement guider 742 may be shorter than a length of the gate 710. The movement guider 742 may be provided between the gate 710 and the fixed guider 744. A radius of the movement guider 742 may be larger than a radius of the gate 710 and smaller than a radius of the fixed guider 744.

When the movement guider 742 is moved, a movement may be restricted due to mutual locking with the fixed guider 744. The fixed guider 744 may be provided radially outside the movement guider 742 and may support the movement guider 742.

The fixed guider 744 may be provided with a guide groove 745 into which the movement guider 742 may be inserted, and the movement guider 742 may move in the guide groove 745. The guide groove 745 may be formed to correspond to a rotation radius and curvature of the movement guider 742.

The guide groove 745 may be formed in an arc shape, and at least a part of the movement guider 742 may be inserted into the guide groove 745. The guide groove 745 may be formed to be concave in the downward direction. The movement guider 742 may be inserted into the guide groove 745, and the guide groove 745 may support the movement guider 742.

When the movement guider 742 rotates, the movement guider 742 may be supported by a front end 745a of the guide groove 745 so that the rotation of the movement guider 742 in a first or closing direction guiding the gate 710 into the blowing space 105 may be limited. When the movement guider 742 rotates, the movement guider 742 may be supported by a rear end 745b of the guide groove 745 so that the rotation of the movement guider 742 in a second or opening direction guiding the gate 710 into the tower case 140 may be limited.

The friction reducing member 746 may reduce friction between the movement guider 742 and the fixed guider 744 when the movement guider 742 moves. A roller may be used as the friction reducing member 746, and rolling friction may be provided between the movement guider 742 and the fixed guider 744. The shaft of the roller may be formed in the vertical direction and may be coupled to the movement guider 742.

Friction and operating noise may be reduced through the friction reducing member 746. At least a part of the friction reducing member 746 may protrude outward in the radial direction of the movement guider 742.

The friction reducing member 746 may be formed of an elastic material and may be elastically supported by the fixed guider 744 in the radial direction. Instead of the movement guider 742, the friction reducing member 746 may elastically support the fixed guider 744 and may reduce friction and operating noise when the gate 710 rotates. The friction reducing member 746 may be in contact with the front end 745a and the rear end 745b of the guide groove 745.

A motor mount 760 to support the guide motor 720 and to fix the guide motor 720 to the first and/or second tower 110 and 120 may be further provided. The motor mount 760 may be provided below the guide motor 720 and support the guide motor 720. The guide motor 720 may be assembled to the motor mount 760.

The motor mount 760 may be coupled to the inner walls 114 and 125 of the first and second towers 110 and 120. The motor mount 760 may be manufactured integrally with the inner walls 114 and 124.

Figure 41:
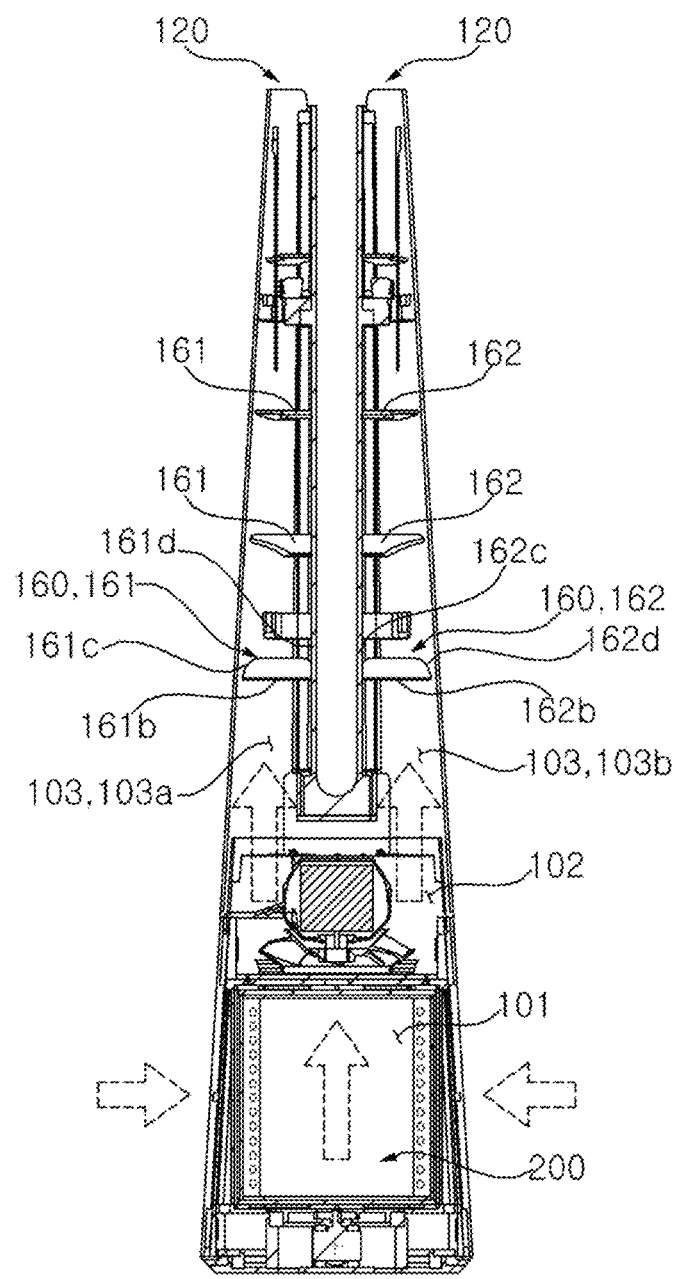
FIG. 41 is a front cross-sectional view of FIG. 2 for explaining another air guide according to another embodiment.
Figure 42:
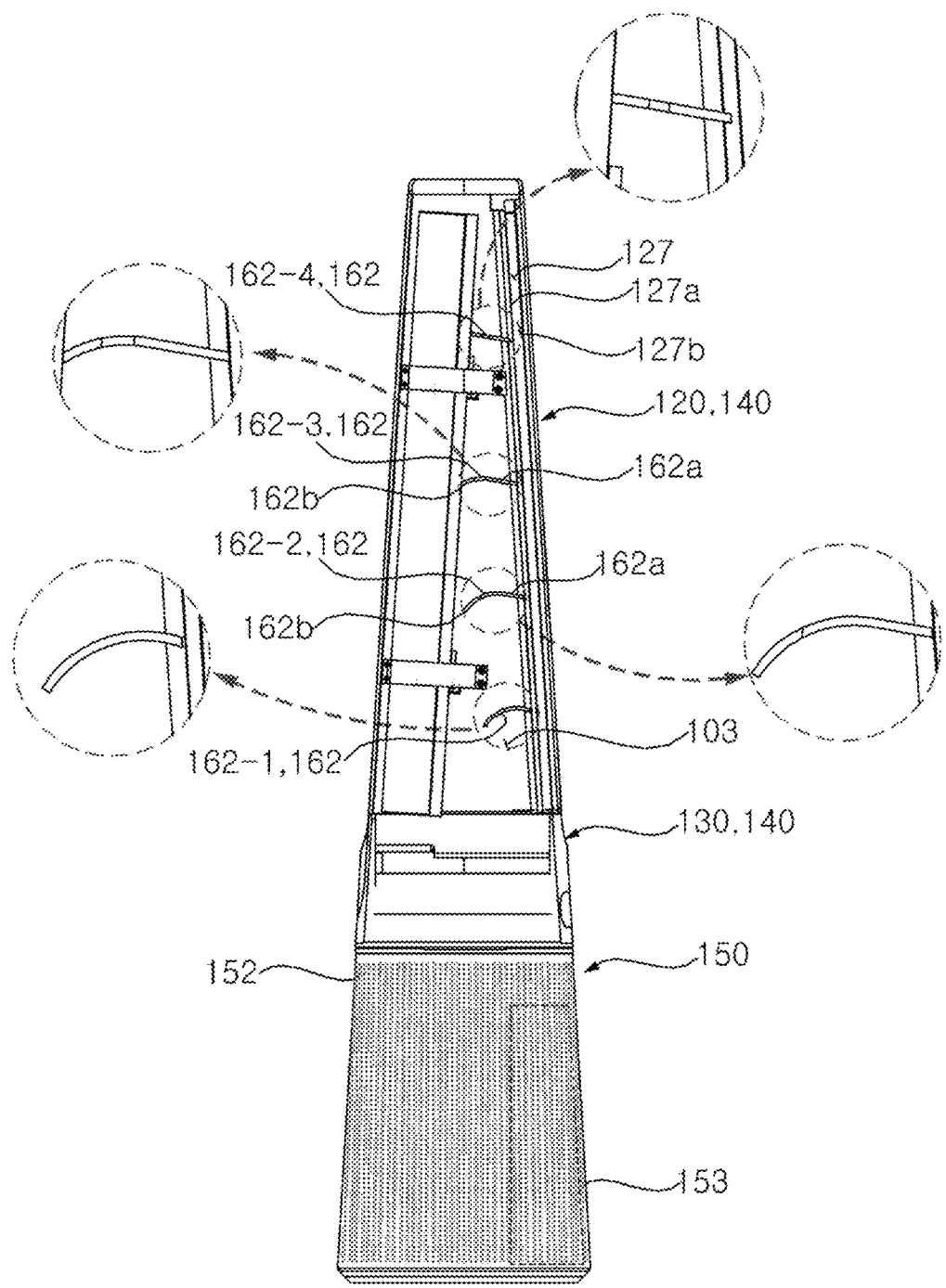
FIG. 42 is a view for explaining the air guide of FIG. 41.

Referring to FIGS. 41 and 42, an air guide 160 according to another embodiment to convert a flow direction of air into a horizontal direction may be provided in the discharge space 103. A plurality of air guides 160 may be provided. The air guide 160 may convert or change the direction of the air flowing upward inside of the tower case 140 to flow in a horizontal direction, and the direction-converted air may flow to the discharge ports 117 and 127. Similar to the previous embodiment, the air guide 160 may include a first air guide 161 provided in the first tower 110 and a second air guide 162 provided in the second tower 120.

A plurality of first air guides 161 may be provided in the vertical direction. A plurality of second air guides 162 may also be provided in the vertical direction.

When viewed from the front, the first air guide 161 may be coupled to the inner wall 115 and/or the outer wall 114 of the first tower 110. When viewed from the side, the rear end 161a of the first air guide 161 may be adjacent to the first discharge port 117, and the front end 161b may be spaced apart from the front end of the first tower 110.

To guide the air flowing in the lower side to the first discharge port 117, at least one of the plurality of first air guides 161 may be formed in a curved surface that may be convex from the lower side to the upper side. At least one of the plurality of first air guides 161 may have a front end 161b provided lower than a rear end 161a to guide air to the first discharge port 117 while reducing or minimizing resistance to air flowing in the lower side.

At least a portion of a left end 161c of the first air guide 161 may be in close contact with or coupled to a left wall of the first tower 110. At least a portion of a right end 161d of the first air guide 161 may be in close contact with or coupled to a right wall of the first tower 110.

Air moving upward along the discharge space 103 may flow from the front end to the rear end of the first air guide 161. The second air guide 162 may be symmetrical with the first air guide 161 with respect to the left-right direction.

When viewed from the front, the second air guide 162 may be coupled to an inner wall 125 and/or an outer wall 124 of the second tower 110. When viewed from the side, a rear end 162a of the second air guide 162 may be adjacent to the second discharge port 127, and a front end 162b may be spaced apart from the front end of the second tower 120.

To guide the air flowing in the lower side to the second discharge port 127, at least one of the plurality of second air guides 162 may have a curved surface that may be convex from the lower side to the upper side. At least one of the plurality of second air guides 162 may have a front end 162b provided lower than a rear end 162a to guide air to the second discharge port 127 while reducing or minimizing resistance to the air flowed in the lower side.

At least a portion of a left end 162c of the second air guide 162 may be in close contact with or coupled to a left wall of the second tower 120. At least a portion of a right end 162d of the second air guide 162 may be in close contact with or coupled to a right wall of the first tower 110.

As an example, four second air guides 162 may be provided and referred to as a second-first air guide 162-1, a second-second air guide 162-2, a second-third air guide 162-3, and a second-fourth air guide 162-4. The second-first air guide 162-1 and the second-second air guide 162-2 may have a front end 162b provided lower than a rear end 162a to guide air toward the rear-upper side. The second-third air guide 162-3 and the second-fourth air guide 162-4 may have a rear end 162a provided lower than a front end 162b to guide the air toward the rear-lower side. Such a disposition of the air guides 160 may be configured to allow the discharged air to converge to a middle, height-wise, of the blowing space 105 to increase a reach of the discharged air.

The second-first air guide 162-1 and the second-second air guide 162-2 may be formed respectively in an upwardly convex curved surface. The second-first air guide 162-1 may be lower than and formed to be more convex than the second-second air guide 162-2. The second-third air guide 162-3, which may be provided lower than the second-fourth air guide 162-4, may have an upwardly convex shape. The second-fourth air guide 162-4 may be formed in a flat plate shape.

The second-second air guide 162-2 may be provided lower than and have a more convex curved surface than the second-third air guide 162-3. The curved surface of the air guides 160 may be progressively and gradually flattened in the upward direction.

The second-fourth air guide 162-4 may be the highest among the second air guides 162 and have a rear end 162a which is lower than a front end 162b. The second-fourth air guide 162-4 may have a relatively flat shape. A configuration of the first air guides 161 may be symmetrical to the configuration of the second air guides 162, so a detailed description of the first air guides 161 will be omitted.

Figure 43:
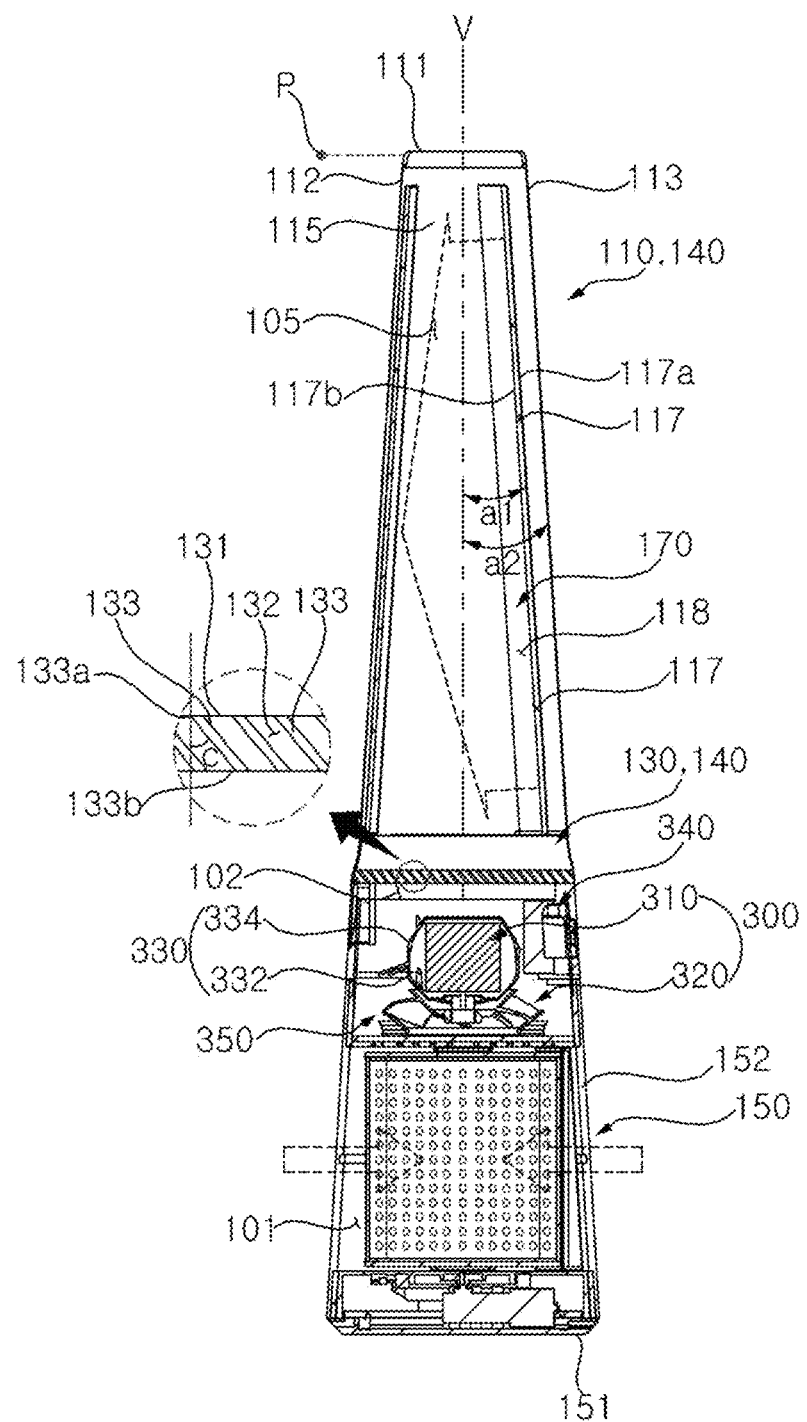
FIG. 43 is a right cross-sectional view of an air conditioner according to another embodiment.

FIG. 43 shows an air conditioner according to another embodiment. Referring to FIG. 43, a third discharge port 132 penetrating the upper side surface 131 of the tower base 130 in the vertical direction may be formed. A third air guide 133 to guide the filtered air may be further provided in the third discharge port 132.

The third air guide 133 may be provided to be inclined with respect to the vertical direction. An upper end 133a of the third air guide 144 may be provided in front of a lower end 133b. The third air guide 133 may include a plurality of vanes provided in the front-rear direction.

The third air guide 133 may be provided between the first tower 110 and the second tower 120 and below the blowing space 105 to discharge air toward the blowing space 105. An inclination of the third air guide 133 with respect to the vertical direction may be defined as an air guide angle C.

Referring to Figured 44-47, the suction grill 350 may be configured to be provided in a flow path through which air flows. The suction grill 350 may include a bell mouth 353 to assist air suction from a suction end of the fan 320, a bell mouth support member 351 to support the bell mouth 353, and a grill wire 355 which may be provided in the opening of the bell mouth 353 and prevent an inflow of foreign substances.

Figure 44:
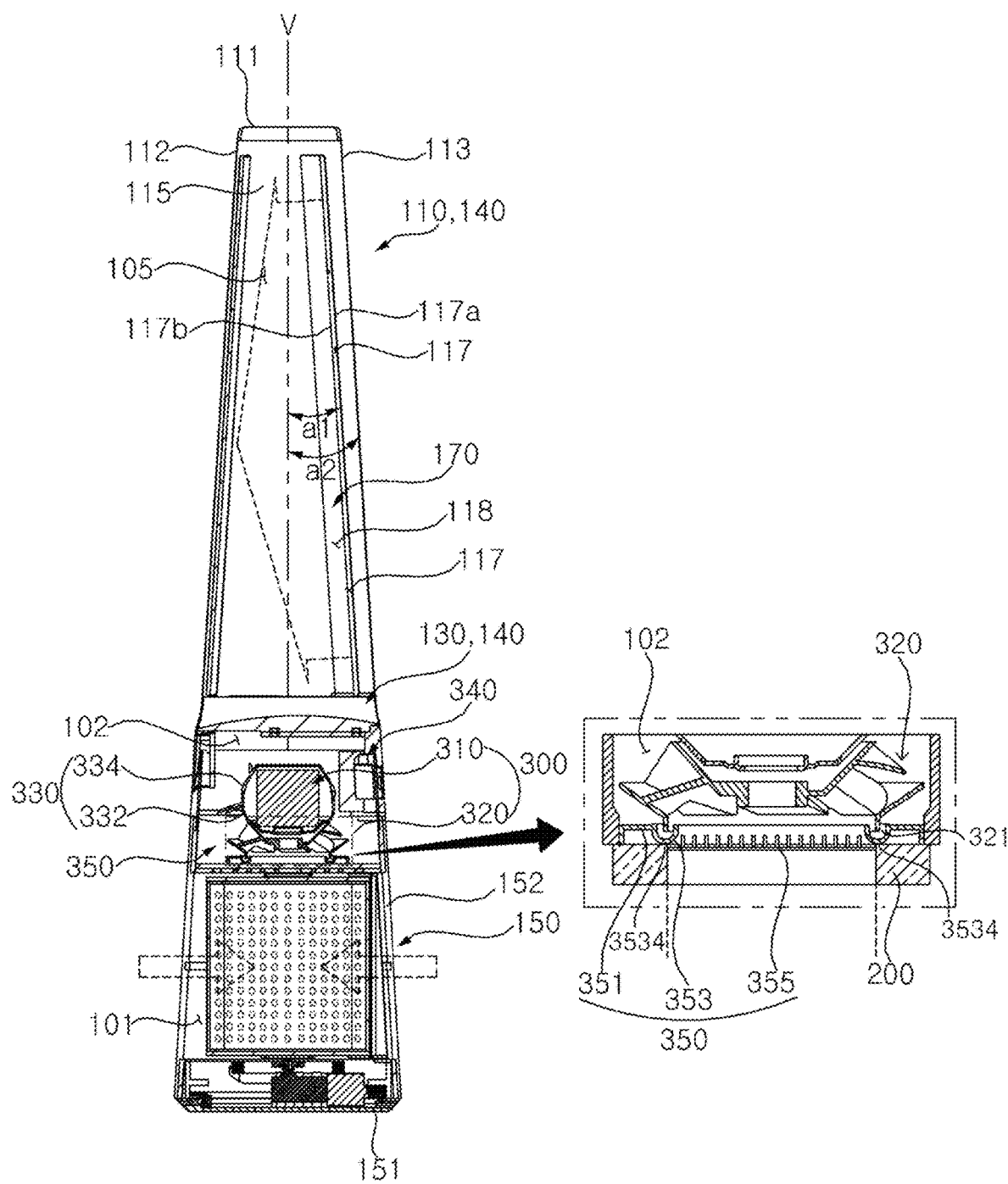
FIG. 44 is a right cross-sectional view of an air conditioner according to another embodiment.

The bell mouth 353 and the bell mouth support member 351 may be integrally formed or alternatively may be manufactured separately and then later combined. Referring to FIG. 44, the bell mouth 353 and the bell mouth support member 351 may be integrally formed.

The bell mouth 353 and the bell mouth support member 351 may be an injection product formed integrally by an injection process. For example, the bell mouth 353 and the bell mouth support member 351 may be formed of acrylonitrile butadiene styrene (ABS) resin. The ABS resin may facilitate easy processing and have high impact resistance and good heat resistance. A material of the bell mouth support member 351 may be not limited to the above description, and may be made of other material that can be easily adopted by a person skilled in the art. The bell mouth 353 may be manufactured by an injection process integrally with the bell mouth support member 351 to be easily manufactured by reducing or minimizing the space occupancy by reducing or minimizing the vertical height.

The grill wire 355 may be formed separately from the bell mouth 353 or the bell mouth support member 351. The grill wire 355 may be formed of a metal material, whereas the bell mouth 353 or the bell mouth support member 351 may be made of a plastic material such as ABS resin. Since the grill wire 355 may be formed of a metal material, a thickness of the grill wire 355 may be made thinner than in the case where the grill wire 355 is manufactured by an injection process.

For example, when the grill wire 355 is injection-formed with ABS resin, the grill wire 355 may require a thickness of at least 2 mm or more to prevent a defect. On the other hand, a metal grill wire 355 may have a diameter of 1.5 mm. A thinner diameter of the grill wire 355 may reduce air resistance during air flow and reduce noise that may be generated when the flowing air collides with the grill wire 355.

The grill wire 355 may be provided upstream of the bell mouth 353 with respect to an air flow direction during operation of the fan assembly 300. The suction port 155 may be provided below the grill wire 355, and the grill wire 355 may be provided in a lower portion of the bell mouth 353.

When the grill wire 355 is provided in the lower portion of the bell mouth 353, there may be a risk of interfering with the filter installation space 101 and/or the filter 200 may be provided. The bell mouth 353 may have a wire groove 3533 formed in a portion overlapping with the grill wire 355, and the wires of the grill wire 355 may be inserted into the wire groove 3533 to lower a height of the suction grill 350. Since the suction grill 350 may not penetrate the filter installation space 101, space may be used more efficiently.

The wire groove 3533 may be formed in a lower end of the bell mouth 353. The wire groove 3533 may be formed by recessing the bell mouth 353 upward in a position vertically overlapping the grill wire 355. The wire groove 3533 may be formed by recessing a position where a vertical wire 3552 and the bell mouth 353 overlap vertically. The wire groove 3533 may be formed recessing the bell mouth 353 in a direction in which the vertical wire 3552 extends so that the vertical wire 3552 may be inserted.

The wire groove 3533 may be recessed by a diameter of the grill wire 355. The grill wire 355 may be formed to have a diameter of 1.5 mm, and the wire groove 3533 may be formed by recessing at least 1.5 mm or more of the bell mouth 353 Even when the bell mouth 353 and the grill wire 355 are separately manufactured, the vertical height of the suction grill 350 may be not changed, and the filter installation space 101 may be secured and protected from interference.

The grill wire 355 may be provided in an opening of the bell mouth 353 to prevent the user's finger from penetrating into the fan 320 and being injured when the filter 200 is attached or detached. The grill wire 355 may be provided upstream of the bell mouth 353 and may be fastened to the bell mouth support member 351.

Figure 48:
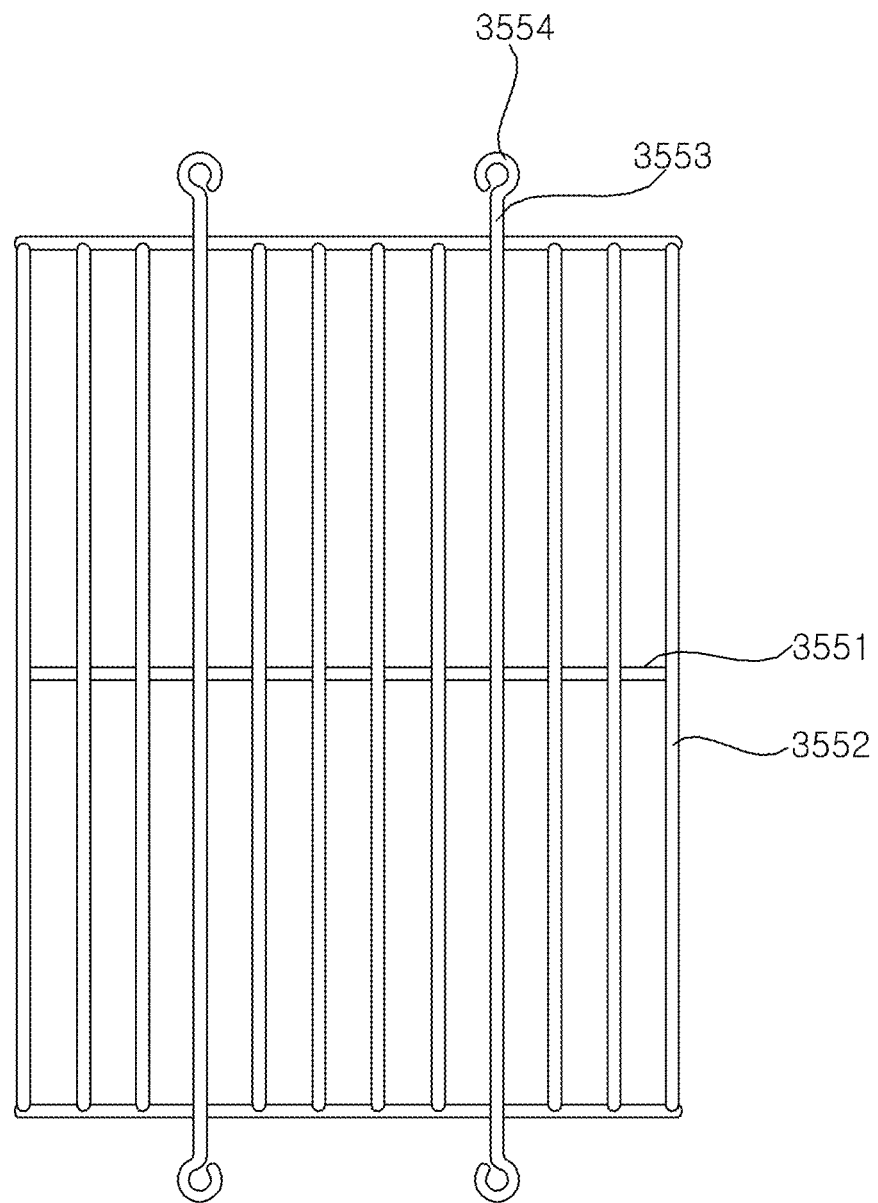
FIG. 48 is a plan view of a grill wire of FIG. 46.

Referring to FIG. 48, the grill wire 355 may be composed of a plurality of wires. The grill wire 355 may include a horizontal or first wire 3551 extending in a first direction and a vertical or second wire 3552 extending in a second direction perpendicular to the first direction. At least one of the horizontal wire 3551 or the vertical wire 3552 may be formed of a metal material. The vertical wire 3552 may be vertically overlapped with the bell mouth 353.

The horizontal wire 3551 may extend in the left-right direction. The horizontal wire 3551 may intersect the vertical wire 3552 at least once. At least one of the horizontal wires 3551 may be provided at both ends of the vertical wire 3552. At least one of the horizontal wires 3551 may be provided in the middle of the vertical wire 3552.

The vertical wire 3552 may extend in the front-rear direction. The vertical wire 3552 may intersect the horizontal wire 3551 at least once. A number of vertical wires 3552 may be greater than a number of horizontal wires 3551. At least one of the vertical wires 3552 may extend to be longer than the other vertical wires 3552 to form a bridge wire 3553.

Figure 47:
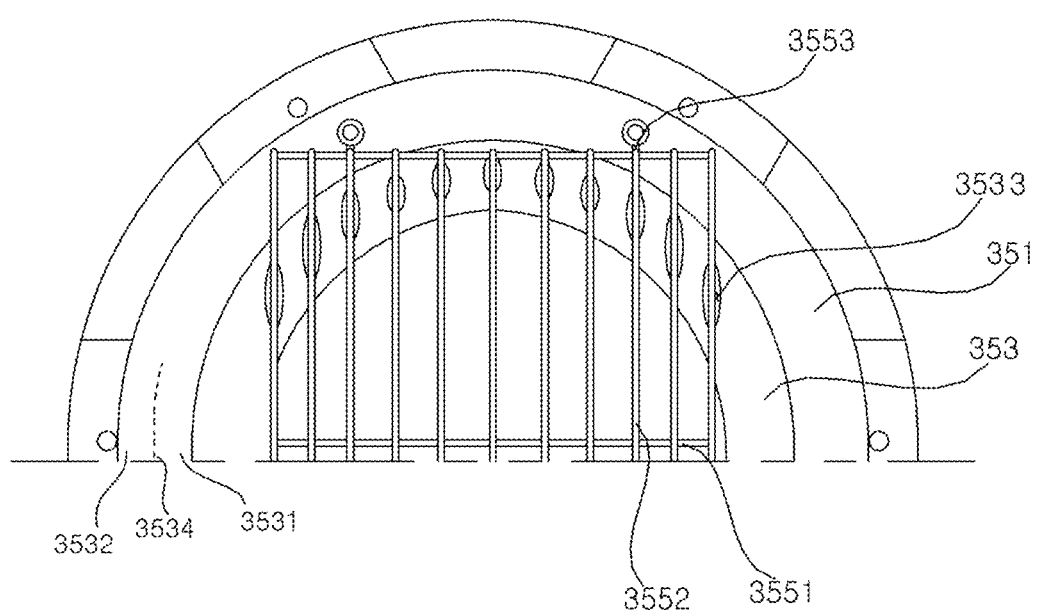
FIG. 47 is a plan view of FIG. 46.

Referring to FIG. 47, a wire groove 3533 may be formed in the bell mouth 353 provided to overlap the vertical wire 3552. The vertical wire 3552 of the grill wire 355 may be inserted into the wire groove 3533.

The bridge wire 3553 may be formed to further extend from a part of the vertical wires 3552. The bridge wire 3553 may be bent upward from the end of the vertical wire 3552. In the bent portion, the bridge wire 3553 may extend upward. A ring may be formed at an upper end of the bridge wire 3553, and the ring may be located in a fastening part 3511 of the bell mouth support member 351 and may be installed in the bell mouth support member 351.

Figure 45:
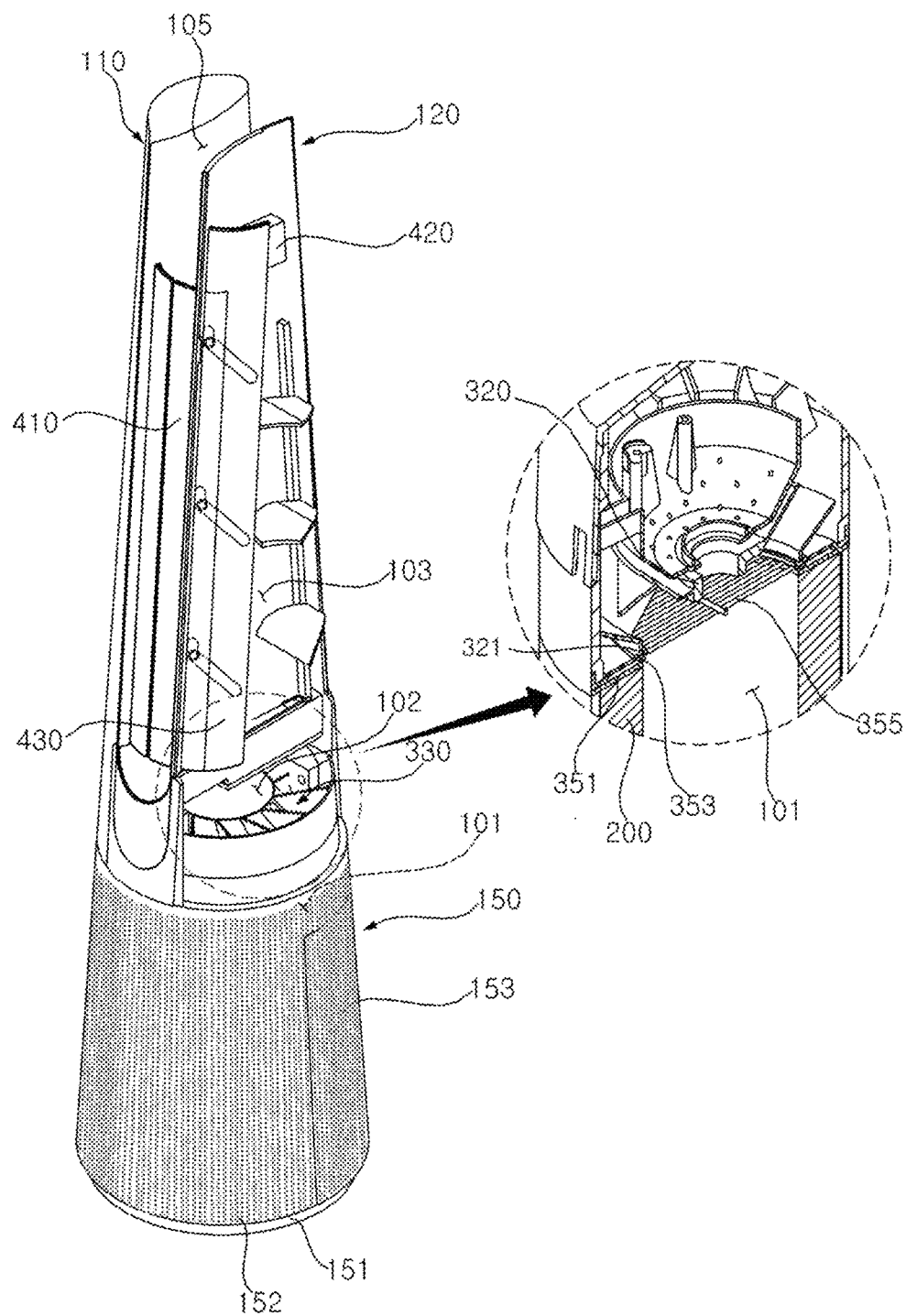
FIG. 45 is a partially exploded perspective view illustrating the inside of the second tower of FIG. 44.

The grill wire 355 may be provided above the lower end 3534 of the bell mouth 353. Referring to FIG. 45, the grill wire 355 may be provided in a lower portion of the bell mouth 353. The wire groove 3533 may be formed in the lower end 3534 of the bell mouth 353 to receive the grill wire 355. The wire groove 3533 may be formed by being recessed upward from the lower end 3534 of the bell mouth.

The grill wire 355 may be inserted into the wire groove 3533 from the lower portion of the bell mouth 353. The grill wire 355 may be provided above the lower end 3534 of the bell mouth 353. The lower end 3555 of the grill wire 355 may be provided at least at the same height as or higher than the lower end 3534 of the bell mouth 353.

Figure 46:
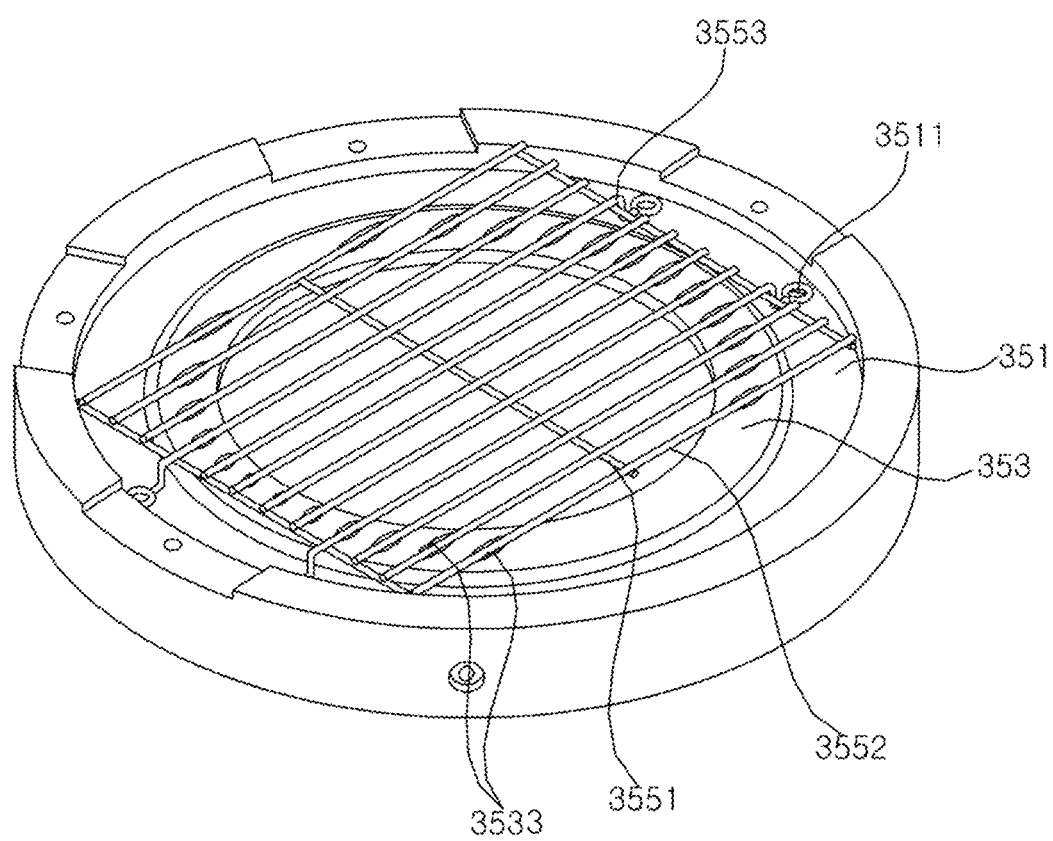
FIG. 46 is a perspective view of a suction grill according to an embodiment.

The bell mouth 353 may assist air suction at a suction end of the fan 320. Referring to FIG. 46, the bell mouth 353 may have an opening formed at a center thereof, and a downstream diameter of the opening may be formed smaller than the upstream diameter.

Referring to FIGS. 45 and 46, the bell mouth 353 may be formed in a ring shape having an opening formed at a center thereof. An opening formed in the center of the bell mouth 353 may be provided in the airflow path, and air may flow through the opening. The bell mouth 353 may have a diameter that becomes smaller as it progresses from the upstream to the downstream. Air may easily flow into the fan 320.

The bell mouth 353 may be connected to the bell mouth support member 351. The bell mouth 353 may be formed in a ring shape, and the bell mouth support member 351 may be connected to the outer circumferential surface of the bell mouth 353. The bell mouth support member 351 may extend radially outward from the outer circumferential surface of the bell mouth 353. The bell mouth support member 351 may extend to an inner circumferential surface of the tower case 140.

The bell mouth 353 may include a first extension or section 3531 and a second extension or section 3532. The bell mouth 353 may extend upward based on the lower end 353. The first extension 3531 may extend from the lower end of the bell mouth 353 to an inner upper side, and the second extension 3532 may extend from the lower end of the bell mouth 353 to an outer upper side.

Referring to FIG. 44, a cross section of the bell mouth 353 may have a U-shape having an open upper portion. Since air may be introduced from a lower side and be discharged upward, the bell mouth 353 may be formed in a U-shape that may be convex in the air inflow direction.

Referring to FIGS. 44-47, an upper end of the bell mouth 353 may be provided radially inside the lower end of the shroud 32 of the fan 320. An upper end of the first extension 3531 may be provided radially inside the lower end of the shroud of the fan 320. The fan 320 may be a four-flow fan. In the case of a four-flow fan, the shroud 32 may be formed in a lower or airflow end along an outer circumferential surface of the air flow path. The shroud 32 may have a surface that has a uniform diameter and extends vertical, and an inclined surface having an increasing diameter. The lower end of the bell mouth 353 may be provided in an extension line of the horizontal shroud 32, and an upper end of the first extension 3531 of the bell mouth 353 may be provided radially inside the lower end of the shroud 32 of the fan 320.

The upper end of the first extension 3531 may be provided radially inside the lower end of the fan 320, and the upper end of the second extension 3532 may be provided radially outside the lower end of the fan 320. Based on the lower end of the bell mouth 353, the first extension 3531 may extend to the inner upper side of the lower end of the shroud 32, and the second extension 3532 may extend to the outer upper side of the shroud 32. The first extension 3531 and the second extension 3532 may be provided to surround the lower end of the shroud of the fan 320.

Since the upper end of the first extension 3531 may be provided radially inside the lower end of the fan 320, and the first extension 3531 may extend radially inside the fan 320, inflow air may be introduced into the fan 320. The second extension 3532 may extend outward in the radial direction of the fan 320. The first extension 3531, the shroud 32 of the fan 320, and the second extension 3532 may form a labyrinth seal to prevent air from scattering to a gap between the fan 320 and the bell mouth 353.

Since the upper end of the first extension 3531 and the upper end of the second extension 3532 may be provided above the lower end of the shroud 32 of the fan 320, the flow path formed in a gap between the fan 320 and the bell mouth 353 may be bent more rapidly. A scattering of air to the gap between the fan 320 and the bell mouth 353 may be reduced or prevented.

The suction grill 350 may be provided between the fan 320 and the filter 200. The lower end of the bell mouth 353 may be provided outside the inner end of the filter 200. Assuming an imaginary vertical line formed by the inner surface of the filter 200, the lower end of the bell mouth 353 may be provided radially outside the imaginary vertical line. Air that passed through the filter 200 may pass through the lower end of the bell mouth 353 and may be introduced into the fan a320 long the first extension part 3531.

A cross-sectional shape of the wire groove 3533 may coincide with the cross-sectional shape of the grill wire 355. For example, when the cross-sectional shape of the grill wire 355 is circular, the cross-sectional shape of the wire groove 3533 may be formed in a U shape.

As the vertical wire 3552 may be coupled to the wire groove 3533, the lower end of the grill wire 355 may not protrude below the lower end of the bell mouth 353. A total height of the suction grill 350 may be not changed, thereby securing the filter installation space 101.

The bell mouth support member 351 may support the bell mouth 353. Referring to FIG. 45, the bell mouth support member 351 may be coupled to the outer circumferential surface of the bell mouth 353 and extend outside in the radial direction. The bell mouth support member 351 may extend to the tower case 140.

The bell mouth support member 351 may form a coupling portion at the outer end so as to be coupled to the tower case 140 or the base case 150. The bell mouth support member 351 may have a groove formed at the upper end of the outer circumferential surface so as to load the tower case 140. Referring to FIG. 46, the bell mouth support member 351 may have a fastening hole or groove for coupling with the base case 150 at the lower end of the outer circumferential surface.

The bell mouth support member 351 may be connected to an upper part or portion of the bell mouth 353. The bell mouth support member 351 may be provided above an imaginary horizontal line passing through the center of the bell mouth 353. The bell mouth support member 351 may be provided to be biased above the bell mouth 353. Since a gap between the bell mouth support member 351 and the upper end of the filter 200 may be much larger than a gap between the bell mouth 353 and the upper end of the filter 200, a space may be formed between the bell mouth support member 351 and the upper end of the filter 200. The formed space may form a trap and prevent air from escaping through the gap between the suction grill 350 and the filter 200.

The bell mouth support member 351 may be connected to the outer circumferential surface of the second extension 3532 of the bell mouth 353. The bell mouth support member 351 may be integrally formed with the bell mouth 353, and the bell mouth support member 351 may extend radially outward from the outer circumferential surface of the second extension 3532.

The distance between the bell mouth support member 351 and the lower end of the bell mouth 353 may be equal to or longer than a length of the bridge wire 3553 of the grill wire 355. The bell mouth support member 351 may form a sufficient distance between the lower end of the bell mouth 353 and may secure a sufficient space for fastening the grill wire 355.

The connection part between the bell mouth support member 351 and the second extension 3532 may be provided below the upper end of the second extension 3532. Referring to FIG. 44, the bell mouth support member 351 may extend radially outward below the upper end of the second extension part 3532. A protrusion protruding upward in an annular shape may be formed in the inner end of the bell mouth support member 351. The protrusion formed in the upper end of the second extension 3532 may be discharged from the fan 320, but may block air returned due to negative pressure from the outside of the fan 320. The upper end of the second extension 3532 3532 may improve efficiency by blocking the feed-back air, together with the labyrinth seal structure.

The bell mouth support member 351 may include a fastening part 3511 formed on a lower surface to which the grill wire 355 may be fastened. Referring to FIG. 47, the fastening part 3511 may fasten with a fastening ring 3554 of the grill wire 355. The fastening part 3511 may form a hole and may be fastened by a screw together with the fastening ring 3554 of the grill wire 355.

The upper graph of FIG. 49 illustrates a discharged air volume compared to a rotation speed of fan according to a shape of suction grill. There may be no significant difference between the present disclosure and the related art when a rotation speed of fan is relatively low, but when the rotation speed of the fan 320 increases, there may be a difference in the discharged air volume. For example, when the rotation speed of fan is 2500 RPM, the flow rate discharged from the air purifier or conditioner according to the related art may be about 13 CMM, but the flow rate discharged from the air conditioner 1 having the suction grill 350 according to the present disclosure may be about 13.97 CMM. When the fan has the same RPM, according to the present disclosure, air volume may be increased by about 7.5% in comparison with the related art.

The lower graph of FIG. 49 illustrates generated noise compared to the air volume of a fan according to a type of the suction grill. When the discharged air volume is relatively low, there may be no significant difference between the present disclosure and the related art, but when the air volume increases, there may be a difference in the generated noise. For example, when the air volume is 13 CMM, the noise generated in the air purifier or conditioner according to the related art may be about 48 dB, but the noise generated in the air conditioner 1 having the suction grill 350 according to the present disclosure may be about 45.2 dB. Based on the same air volume, generated noise may be reduced by about 2.8 dB in comparison with the related art.

Embodiments disclosed herein may allow a cover and a main body to be tightly coupled without gap so that an esthetic sense may be satisfied when the cover and the main body are coupled. Embodiments disclosed herein may apply an external force to a cover separation unit so that the main body and the cover may be easily separated when the cover and the main body may be separated.

Embodiments disclosed herein may provide a cover with two pieces and separate one of the two covers of one cover separation unit when separating the cover from the main body. Embodiments disclosed herein may allow a user to separate the other cover through a gap that may be revealed as one of the two covers may be separated so that a cylindrical cover may be easily separated and the user may separate the cover using only one hand.

To separate one cover by a lever and separate the cover through a gap of the other cover, the cylindrical cover may be manufactured in two pieces, and it may be easy to manufacture the cover. Only the lever may be exposed to an outer surface of the main body and slide along the outer surface of the main body, so that even when the lever may be moved, it does not protrude to the outside of the main body. A pusher connected to the lever may be guided to the main body and push the cover between the main body and the cover. Hence, the pusher may be hidden by the cover and may be invisible. Two pushers to separate the cover from the main body may be provided vertically so that the cover can be stably separated from the main body. Since the lever to operate the pusher may be located only on a rear surface of a case, the pusher may be located inside the main body, and may be covered by the cover, improving aesthetics.

Since a lower end of the heater may be provided with an inclination biased toward arear air discharge port, ae flow rate of the discharged air may be increased or maximized, and air having a uniform flow rate may flow to the air discharge port. Each fin provided in the heater may serve as a guide to horizontally guide an ascending air flow, thereby miniaturizing or reducing the product by efficiently utilizing the space. A flow path shielding member may be provided in the lower end of the heater to shield the air flow directly discharged without passing through the heater, thereby improving the efficiency.

Embodiments disclosed herein may suction indoor air, filter it through a filter provided therein, and then discharge filtered air to a user using the Coanda effect. Embodiments disclosed herein may induce a Coanda effect for the air discharged from a first tower and the air discharged from a second tower, and then join the discharged air in the blowing space, thereby increasing a straightness or concentration and reach of the discharged air.

Since a suction grill according to the present disclosure may include a wire made of a metal material, the thickness may be reduced, thereby reducing or minimizing air resistance and reducing or minimizing noise generation. The suction grill may have an advantage of efficiently utilizing the space by securing a space in which the grill wire may be installed and reducing or minimizing a vertical dimension of the suction grill, as a support member may be provided in the upper end of the bell mouth. The suction grill may prevent or reduce noise from being generated and efficiently utilize space by forming a groove in the bell mouth in which the grill wire may be installed.

Embodiments disclosed herein may provide a fan apparatus or assembly for air an conditioner capable of providing air to a user through the Coanda effect. The fan apparatus may provide a heating mode by providing a heater in an air flow path. A cover separation unit may be installed in a base case, moved by an external force, and guided by the base case to push the cover.

Embodiments disclosed herein may include a base case in which an air suction part or port through which air may be suctioned may be formed, a tower case which may be provided above the base case, and has an air flow path therein and discharges air to the outside, a cover which may be coupled to an outer surface of the base case and cover at least a portion of the suction part, and a cover separation unit which separates the cover from the base case. The cover separation unit may include a lever which may be installed in the tower case and slides along an outer surface of the tower case, an upper cover pusher which may be rotatably coupled to the lever, and rotates to push the cover, and an upper rotation guide which guides the upper cover pusher to rotate in one direction when the upper cover pusher may be moved along the outer surface of the base case.

Embodiments disclosed herein may include a case in which a suction part or port through which air may be suctioned and a discharge port through which the suctioned air may be discharged may be formed, a cover which may be coupled to an outer surface of the case and covers at least a portion of the suction part, and a cover separation unit which may be installed in the case and separates the cover. The cover separation unit may include a lever which may be installed in the case and slides along the outer surface of the case and an upper cover pusher which may be rotatably coupled to the lever and guided to the outer surface of the case to push the cover.

The cover separation unit may include a slider which may be spaced apart from the upper cover pusher and installed in the base case to be slid, a connection link which connects the slider and the lever, a lower cover pusher which may be rotatably coupled to the slider and rotates to push the cover, and a lower rotation guide which guides the lower cover pusher to rotate in one direction when the lower cover pusher may be moved along the outer surface of the base case.

At least a portion of the lever may be exposed on the outer surface of the tower case. The lever may be provided above the cover. The upper cover pusher may be provided in a coupling region of the base case in which the cover may be coupled to the base case.

The upper cover pusher may be located between the cover and the base case. The upper cover pusher may be hinged to a lower end of the lever. The upper rotation guide may include an upper guide surface which has an inclination with respect to the outer surface of the base case and guides the upper cover pusher.

The upper rotation guide further may include an upper pusher receiving groove to receive the upper cover pusher. The upper rotation guide may be formed in the base case. The lower cover pusher and the slider may be located below the upper cover pusher.

The lower cover pusher and the slider may be located between the base case and the cover. The lower rotation guide may include a lower pusher receiving groove to receive the slider and the lower cover pusher. The lower rotation guide may include a lower guide surface which has an inclination with respect to the outer surface of the base case and guides the lower cover pusher.

The tower case may include a first tower and a second tower that have an airflow path therein, and further may include a blowing space formed between the first tower and the second tower, a first discharge port which may be formed in the first tower and discharges the suctioned air into the blowing space, and a second discharge port which may be formed in the second tower and discharges the sucked air to the blowing space.

Embodiments disclosed herein may further include a fan which may be provided inside the base case and forms an air flow and a filter which may be provided inside the base case and filters the air sucked by the fan.

The cover separation unit further may include a return spring to provide a restoring force to the lever. The cover separation unit further may include a slider which may be spaced apart from the upper cover pusher, installed in the case to be slid, and connected to the lever, and a lower cover pusher which may be rotatably coupled to the slider and guided to the outer surface of the case to push the cover.

In the drawings, the thickness or size of each layer may be exaggerated, omitted, or schematically illustrated for convenience of description and clarity. Also, the size or area of each constituent element may not entirely reflect the actual size thereof.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

This application is related to co-pending U.S. application Ser. No. 17/190,692 filed Mar. 3, 2021, U.S. application Ser. No. 17/191,873 filed Mar. 4, 2021, U.S. application Ser. No. 17/197,918 filed Mar. 10, 2021, U.S. application Ser. No. 17/318,222 filed May 12, 2021, U.S. application Ser. No. 17/332,681 filed May 27, 2021, U.S. application Ser. No. 17/318,242 filed May 12, 2021, U.S. application Ser. No. 17/318,274 filed May 12, 2021, U.S. application Ser. No. 17/335,810 filed Jun. 1, 2021, U.S. application Ser. No. 17/336,902 filed Jun. 2, 2021, and U.S. application Ser. No. 17/335,902 filed Jun. 1, 2021, whose entire disclosures are incorporated by reference herein.

What is claimed is:

1. An air conditioner, comprising:
a first case having a suction port;
a second case provided above the first case and having a discharge port;
a cover configured to be coupled to an outer surface of the first case to cover the suction port; and
a cover separation assembly configured to separate the cover from the first case, wherein the cover separation assembly includes:
- a lever configured to slide along an outer surface of the second case;
- a first pusher coupled to the lever and configured such that, upon a sliding movement of the lever, the first pusher is moved to protrude away from the first case to push the cover away from the first case; and
- a first guide provided at an outer surface of the first case and configured to guide a movement of the first pusher.

2. The air conditioner of claim 1, wherein the cover separation assembly further includes:
- a slider configured to slide along an outer surface of the first case;
- a connection link connecting the slider and the lever;
- a second pusher coupled to the slider and configured such that, upon a sliding movement of the slider, the second pusher is moved to protrude away from the first case to push the cover away from the first case; and
- a second guide provided at an outer surface of the first case and configured to guide a movement of the second pusher.

3. The air conditioner of claim 2, wherein the second pusher and the slider are provided below the first pusher.

4. The air conditioner of claim 2, wherein the second pusher and the slider are positioned such that, when the cover is coupled to the first case, the second pusher and the slider are provided between the first case and the cover.

5. The air conditioner of claim 2, wherein the second guide includes a groove to receive the slider and the second pusher.

6. The air conditioner of claim 2, wherein the second guide includes a surface which has an inclination with respect to the outer surface of the first case to guide the movement of the second pusher.

7. The air conditioner of claim 1, wherein at least a portion of the lever is exposed to an outside of the second case.

8. The air conditioner of claim 1, wherein the lever is provided above the cover so as not to be covered by the cover.

9. The air conditioner of claim 1, wherein the first pusher is positioned such that, when the cover is coupled to the first case, the first pusher is provided at an inner side of the cover.

10. The air conditioner of claim 1, wherein the first pusher is positioned such that, when the cover is coupled to the first case, the first pusher is provided between the cover and the first case.

11. The air conditioner of claim 1, wherein a lower surface of the first pusher has an inclination angle with respect to a vertical direction.

12. The air conditioner of claim 1, wherein the first pusher is hinged to a lower end of the lever.

13. The air conditioner of claim 1, wherein the first guide includes a surface which has an inclination with respect to the outer surface of the first case to guide the movement of the first pusher.

14. The air conditioner of claim 1, wherein the first guide includes a groove configured to receive the first pusher.

15. The air conditioner of claim 1, wherein the first guide has a groove formed in the outer surface of the first case to receive the first pusher, and a bottom of the groove has an inclined surface such that, when a downward force is applied to a top of the first pusher, a bottom of the first pusher slides along the inclined surface toward the cover to push the cover away from the first case.

16. The air conditioner of claim 1, further comprising:
- a fan provided inside of the first case and configured to suction air through the suction port and discharge air out of the discharge port;
- a filter provided inside the first case to filter the air suctioned by the fan.

17. The air conditioner of claim 16, wherein the filter is configured to fit through the suction port which is covered by the cover.

18. The air conditioner of claim 1, wherein the cover separation assembly further comprises a return spring configured to provide a restoring force to the lever.

19. An air conditioner, comprising:
- a case including a suction port through which air is suctioned and a discharge port through which the suctioned air is discharged;
- a cover coupled to an outer surface of the case; and
- a cover separation assembly configured to remove the cover from the case, wherein the cover separation assembly includes:
  - a lever configured to slide along the outer surface of the case;
  - a pusher rotatably coupled to the lever; and
  - a guide configured to receive the pusher and configured such that, upon a sliding movement of the lever, the pusher is rotated away from the outer surface of the case to push the cover away from the case.

20. The air conditioner of claim 19, wherein the cover separation assembly further includes:
- a slider connected to the lever and configured to slide along the outer surface of the case at a position below and spaced apart from the first pusher; and
- a second pusher rotatably coupled to the slider and guided along the outer surface of the case to push the cover.

* * * * *